United States Patent
Kim et al.

(10) Patent No.: US 11,375,423 B2
(45) Date of Patent: Jun. 28, 2022

(54) METHOD AND APPARATUS FOR CONFIGURING FALLBACK FOR EACH BEARER WHEN DAPS HANDOVER FAILS IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/141,629

(22) Filed: Jan. 5, 2021

(65) Prior Publication Data
US 2021/0211956 A1 Jul. 8, 2021

(30) Foreign Application Priority Data

Jan. 6, 2020 (KR) .................. 10-2020-0001601
Jan. 30, 2020 (KR) .................. 10-2020-0010919
(Continued)

(51) Int. Cl.
*H04W 36/08* (2009.01)
*H04W 12/043* (2021.01)
(Continued)

(52) U.S. Cl.
CPC ......... *H04W 36/08* (2013.01); *H04W 12/043* (2021.01); *H04W 36/0079* (2018.08); *H04W 80/02* (2013.01); *H04W 36/00* (2013.01)

(58) Field of Classification Search
CPC . H04W 36/08; H04W 36/0079; H04W 36/00; H04W 12/043; H04W 12/04; H04W 80/02
(Continued)

(56) References Cited

U.S. PATENT DOCUMENTS

| 2017/0353992 | A1 | 12/2017 | Quan et al. | |
| 2018/0083688 | A1* | 3/2018 | Agiwal | ............... H04M 3/537 |
| 2020/0314714 | A1* | 10/2020 | Jung | ..................... H04W 76/27 |

FOREIGN PATENT DOCUMENTS

JP 2021078072 A * 5/2021

OTHER PUBLICATIONS

Intel Corporation, 'RRC running CR for NR mobility on DAPS HO ([107bis#54])', R2-1914833, 3GPP TSG-RAN WG2 Meeting #108, Reno, USA, sections 5.3.5.1-5.3.5.11; and figures 5.3.5.1-1-5.3.5.1-2, Nov. 17, 2019.
(Continued)

Primary Examiner — Rownak Islam
(74) Attorney, Agent, or Firm — Jefferson IP Law, LLP

(57) ABSTRACT

The disclosure relates to a communication method and system for converging a 5$^{th}$-Generation (5G) communication system for supporting higher data rates beyond a 4$^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure relates to a method and an apparatus for performing fallback when handover fails in a case where efficient handover without interruption of transmission or reception of data during handover is performed.

20 Claims, 23 Drawing Sheets

(30) Foreign Application Priority Data

Feb. 13, 2020 (KR) .......................... 10-2020-0017747
Feb. 27, 2020 (KR) .......................... 10-2020-0024575

(51) Int. Cl.
*H04W 80/02* (2009.01)
*H04W 36/00* (2009.01)

(58) Field of Classification Search
USPC ......................................................... 370/331
See application file for complete search history.

(56) References Cited

OTHER PUBLICATIONS

Ericsson, 'Release of source cell at DAPS handover', R2-1914622, 3GPP TSG-RAN WG2#108, Reno, Nevada, US, sections 2-2.3.1, Nov. 17, 2019.
Ericsson, 'Fallback to source cell during DAPS handover', R2-1914623, 3GPP TSG-RAN WG2 #108, Reno, USA, sections 2-2.5, Nov. 17, 2019.
Vivo, 'SRB handling of DAPS failure', R2-1914706, 3GPP TSG-RAN WG2 Meeting #108, Reno, USA, sections 2-3, Nov. 17, 2019.
International Search Report dated Apr. 5, 2021, issued in International Application No. PCT/KR2021/000057.

* cited by examiner

METHOD AND APPARATUS FOR CONFIGURING FALLBACK FOR EACH BEARER WHEN DAPS HANDOVER FAILS IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2020-0001601, filed on Jan. 6, 2020, of a Korean patent application number 10-2020-0010919, filed on Jan. 30, 2020, of a Korean patent application number 10-2020-0017747, filed on Feb. 13, 2020, and of a Korean patent application number 10-2020-0024575, filed on Feb. 27, 2020, in the Korean Intellectual Property Office, the disclosure of each of which is incorporated by reference herein in its entirety.

BACKGROUND

1. Field

The disclosure relates to a mobile communication system and a wireless communication system. More particularly, the disclosure relates to a method and an apparatus for performing fallback, when a handover fails, in a case where an efficient handover method without data transmission/reception interruption during handover is performed in a next-generation mobile communication system.

2. Description of Related Art

To meet the demand for wireless data traffic having increased since deployment of forth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, recent development of communication systems has been followed by various researches on handovers. In particular, there have been extensive researches about performing efficient handovers having no transmission/reception interruption.

The above information is presented as background information only to assist with an understanding of the disclosure. No determination has been made, and no assertion is made, as to whether any of the above might be applicable as prior art with regard to the disclosure.

SUMMARY

An efficient handover method is necessary in a next-generation mobile communication system such that, together with a low transmission latency, a service having no data interruption can be supported. In addition, there is a need for a method wherein, if a handover fails, a fallback can be performed while minimizing the data interruption time.

Aspects of the disclosure are to address at least the above-mentioned problems and/or disadvantages and to provide at least the advantages described below. Accordingly, an aspect of the disclosure is to provide various efficient handover methods wherein, when a handover is performed in a next-generation mobile communication system, no data interruption time occurs due to the handover, thereby supporting a service having no data interruption.

Another aspect of the disclosure is to provide an efficient method wherein, if the handover fails, the terminal or user equipment (UE) can quickly fall back to the source base station.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station, information for a reconfiguration with synchronization (sync), the information configuring at least one dual active protocol stack (DAPS) bearer, establishing a signaling radio bearer (SRB) for a target cell group with a same configuration for a source cell group based on the information, wherein an SRB for the source cell group is suspended, and configuring an initial value of a state variable for a packet data convergence protocol (PDCP) layer device for the target cell group with a value stored in a PDCP layer device for a source cell group, in case that a security key is maintained for the SRB for the target cell group.

In accordance with another aspect of the disclosure, a method performed by a base station in a wireless communication system is provided. The method includes generating information for a reconfiguration with sync for a terminal, the information configuring at least one DAPS bearer, and transmitting, to the terminal, the information. An SRB for a target cell group is established with a same configuration for a source cell group based on the information, an SRB for the source cell group being suspended, and an initial value of a state variable for a PDCP layer device for the target cell group is configured with a value of a PDCP layer device for a source cell group, in case that a security key is maintained for the SRB for the target cell group.

In accordance with another aspect of the disclosure, a terminal in a wireless communication system is provided. The terminal includes a transceiver configured to transmit and receive a signal, and a controller. The controller is configured to receive, from a base station, information for a reconfiguration with sync, the information configuring at least one DAPS bearer, establish an SRB for a target cell group with a same configuration for a source cell group based on the information, wherein an SRB for the source cell group is suspended, and configure an initial value of a state variable for a PDCP layer device for the target cell group with a value stored in a PDCP layer device for a source cell group, in case that a security key is maintained for the SRB for the target cell group.

In accordance with another aspect of the disclosure, a base station in a wireless communication system is provided. The base station includes a transceiver configured to transmit and receive a signal, and a controller. The controller is configured to generate information for a reconfiguration with sync for a terminal, the information configuring at least one DAPS bearer, and transmit, to the terminal, the information. An SRB for a target cell group is established with a same configuration for a source cell group based on the information, an SRB for the source cell group being suspended, and an initial value of a state variable for a PDCP layer device for the target cell group is configured with a value of a PDCP layer device for a source cell group, in case that a security key is maintained for the SRB for the target cell group.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
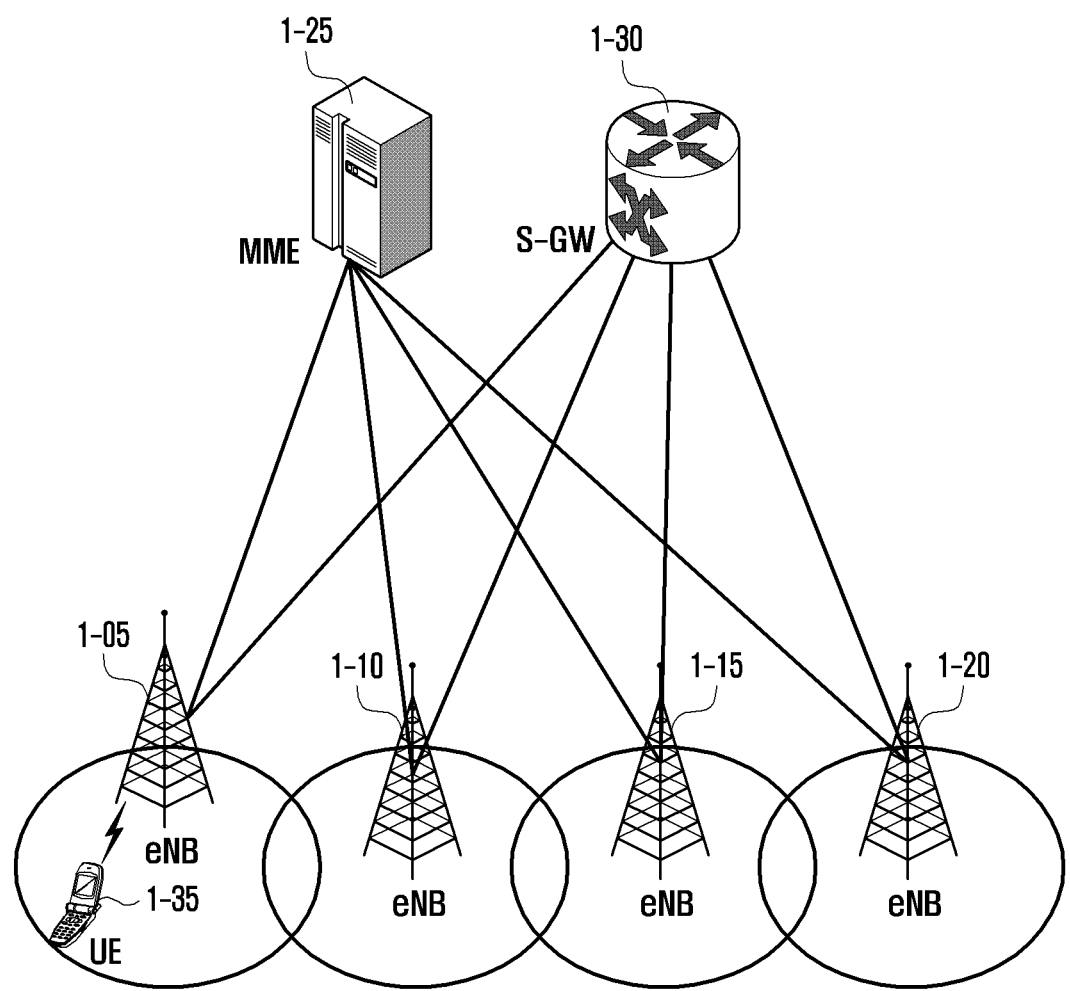
FIG. 1 illustrates the structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

The disclosure proposes seamless handover methods capable of minimizing a data interruption time due to handover or reducing the same to 0 ms in a next-generation mobile communication system.

Specifically, efficient handover methods of the disclosure may include one or more of a plurality of features as follows. In addition, with regard to the efficient handover methods of the disclosure, different handover methods may be applied to different bearers. In addition, the efficient handover methods of the disclosure may include features derived by combining some or all of the following features with each other.

When a UE, which performs data transmission or reception (uplink or downlink data transmission or reception) to or from a source base station through respective protocol layer devices (physical (PHY) layer devices, medium access control (MAC) layer devices, radio link control (RLC) layer devices, or PDCP layer devices) of a plurality of first bearers, may receive a handover command message (or an RRC Reconfiguration message) from the source base station. The UE having received the handover command message may configure new protocol layer devices of a plurality of second bearers corresponding to the protocol layer devices of the plurality of first bearers (for example, having the same bearer identifier as that of the protocol layer devices of the plurality of first bearers), and may maintain and perform the data transmission or reception (uplink or downlink data transmission or reception) to or from the source base station through the plurality of first bearers without interruption.

After receiving the handover command message as described above, the newly configured protocol layer devices of the plurality of second bearers (PHY layer devices, MAC layer devices, RLC layer devices, or PDCP layer devices) are configured for data transmission or reception to or from a target base station, based on bearer configuration information or protocol layer device information included in the handover command message.

In the above, the UE performs a procedure of random access to a target base station through the protocol layer devices of the plurality of second bearers (for example, MAC layer devices) while performing data transmission or reception (uplink or downlink data transmission or reception) to or from the source base station through the protocol layer devices of the plurality of first bearers. In this case, the random access procedure may include transmission of a preamble, reception of a random access response, transmission of message 3, or reception of message 4 (for example, contention resolution MAC control element (CE) or reception of uplink transmission resource).

In the above, the UE completes a procedure of random access to the target base station through the protocol layer devices of the plurality of second bearers (for example, the MAC layer devices) while performing data transmission or reception to or from the source base station through the protocol layer devices of the plurality of first bearers, and then transmits a handover complete message to the target base station through the protocol layer devices of the plurality of second bearers.

In the above, the UE completes the procedure of random access to the target base station through the protocol layer devices of the plurality of second bearers (for example, the MAC layer devices) while performing data transmission or reception to or from the source base station through the protocol layer devices of the plurality of first bearers, and then transmits a handover complete message to the target base station through the protocol layer devices of the plurality of second bearers and performs data transmission or reception (uplink or downlink).

In the above, when the UE successfully completes the procedure of random access to the target base station or when the UE receives an uplink transmission resource from the target base station for the first time, the UE stops transmission of the uplink data to the source base station through the protocol layer devices of the plurality of first bearers and switches the uplink transmission to thereby transmit the uplink data to the target base station through the plurality of second bearers.

In the above, when the handover command message is received, the UE may continue data transmission or reception (uplink or downlink data transmission or reception) to or from the source base station through the protocol layer devices of the plurality of first bearers, and may perform a procedure of random access to the target base station through the protocol layer devices of the plurality of second bearers. In addition, when the UE successfully completes the random access procedure or when the UE receives an uplink transmission resource from the target base station for the first time, the UE may stop transmission of the uplink data to the source base station through the protocol layer devices of the plurality of first bearers and transmit the uplink data to the target base station only through the protocol layer devices of the plurality of second bearers. In addition, the UE may continuously receive downlink data from the source base station only through the protocol layer devices of the plurality of first bearers and continuously receive downlink data from the target base station through the protocol layer devices of the plurality of second bearers.

In the above, the first bearer and the second bearer may be configured as the structure of a second PDCP layer device, and the second PDCP layer device structure may be configured such that both a first bearer (for example, RLC layer device, MAC layer device, or PHY layer device) for a source base station and a second bearer (for example, RLC layer device, MAC layer device, or PHY layer device) for the target base station are connected to one PDCP layer device. Here, the uplink data may be transmitted through one of the first bearer or the second bearer through the PDCP layer device. That is, the UE transmits uplink data through the first bearer before the procedure of random access to the target base station is completed and the random access procedure is successfully completed or before the uplink transmission resource is initially received from the target base station; if the procedure of random access to the target base station is performed, the random access procedure is successfully completed, and then the uplink transmission resource is received from the target base station for the first time, the UE may stop data transmission through the first bearer and performs switching to thereby transmit uplink data to the target through the second bearer. However, in the second PDCP layer device structure, the UE may receive downlink data from the source base station or the target base station through the first bearer or the second bearer.

In the following, the disclosure suggests efficient handover procedures in which a data interruption time does not occur, based on the above features.

Further, in the following, in a case where the UE performs the efficient handover method in which a data interruption time does not occur of the disclosure, if the UE fails to handover, a method for configuring a connection again by quickly falling back to the source base station by using the features of the efficient handover method of the disclosure is provided. As described above, the efficient handover method of the disclosure specifically refers to maintaining a connection to the source base station even when performing a handover procedure, and to performing fallback using a wireless connection connected to the existing source base station even if the handover fails.

FIG. 1 illustrates the structure of a long term evolution (LTE) system according to an embodiment of the disclosure.

Referring to FIG. 1, a radio access network of an LTE system includes next-generation base stations (also referred to as evolved node Bs, hereinafter eNBs, node Bs, or base stations) 1-05, 1-10, 1-15, and 1-20, a mobility management entity (MME) 1-25, and a serving gateway (S-GW) 1-30. A user equipment (hereinafter UE or terminal) 1-35 accesses an external network through the eNBs 1-05 to 1-20 and S-GW 1-30.

In FIG. 1, the eNBs 1-05 to 1-20 correspond to an existing node B of an UMTS system. The eNBs are connected to the UE 1-35 through a radio channel, and perform a more complicated role than the existing node B. In the LTE system, since all user traffic pertaining to real-time service, such as voice over IP (VoIP), via the Internet protocol, is serviced through a shared channel, a device that performs scheduling by collecting state information, such as buffer states, available transmit power states, and channel states of UEs, is required, and eNBs 1-05 to 1-20 are in charge of this function of the device. In general, one eNB controls a plurality of cells. For example, in order to implement a transmission rate of 100 Mbps, the LTE system uses orthogonal frequency division multiplexing (OFDM) as a radio access technology in the bandwidth of 20 MHz. In addition, the LTE system adopts an adaptive modulation & coding (hereinafter referred to as AMC) scheme for determining a modulation scheme and a channel coding rate based on the channel state of the UE. The S-GW 1-30 is a device for providing a data bearer and generating or removing a data bearer under the control of the MME 1-25. The MME is in charge of various control functions in addition to a mobility management function for the UE, and is connected to a plurality of base stations.

Figure 2:
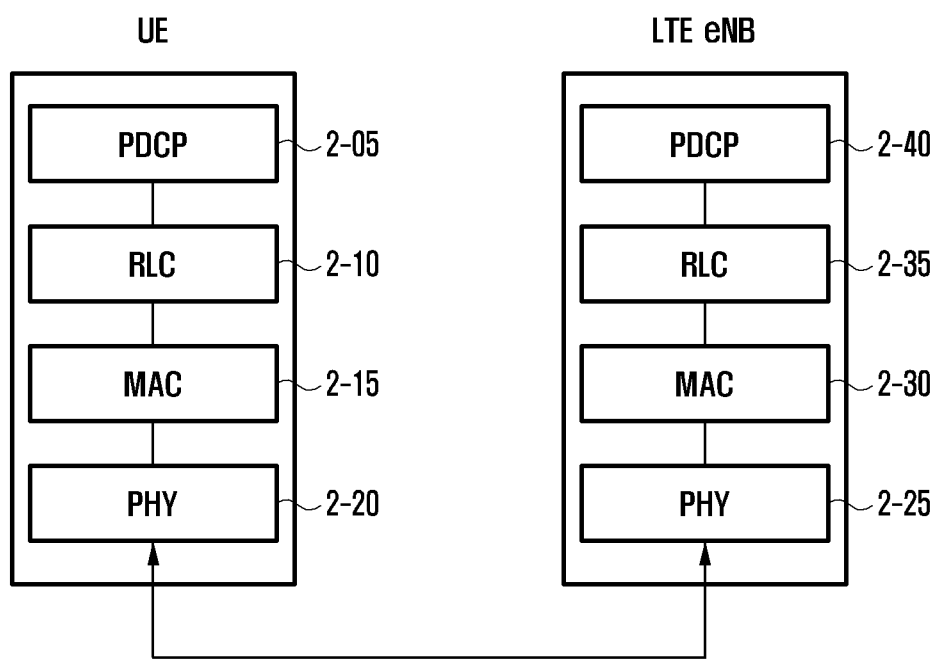
FIG. 2 illustrates a radio protocol structure in an LTE system according to an embodiment of the disclosure.

FIG. 2 illustrates a radio protocol structure in an LTE system according to an embodiment of the disclosure.

Referring to FIG. 2, the radio protocol of the LTE system includes PDCPs 2-05 and 2-40, RLCs 2-10 and 2-35, and MACs 2-15 and 2-30, in a UE and an eNB, respectively. The PDCPs 2-05 and 2-40 are used to perform operations, such as IP header compression/restoration. The main functions of PDCPs are summarized as follows.

Header compression and decompression: ROHC only
Transfer of user data
In-sequence delivery of upper layer PDUs at PDCP re-establishment procedure for RLC acknowledged mode (AM)
Sequence reordering (for split bearers in DC (only support for RLC AM): PDCP PDU routing for transmission and PDCP PDU reordering for reception)
Duplicate detection of lower layer service data units (SDUs) in a PDCP re-establishment procedure for RLC AM
Retransmission of PDCP SDUs at handover and, for split bearers in DC, of PDCP PDUs at PDCP data-recovery procedure, for RLC AM)
Ciphering and deciphering
Timer-based SDU discard in uplink PLCs 2-10 and 2-35 may reconfigure a PDCP protocol data unit (PDU) in a suitable size and perform an ARQ operation. The main functions of RLCs are summarized as follows.

Transfer of upper layer PDUs
ARQ (Error Correction through ARQ (only for AM data transfer))
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 2-15 and 2-30 are connected to multiple RLC layer devices configured in one UE, and may perform an operation of multiplexing RLC PDUs with an MAC PDU and de-multiplexing the RLC PDUs from the MAC PDU. The main functions of the MAC are summarized as follows.

Mapping between logical channels and transport channels
Multiplexing/de-multiplexing of MAC SDUs belonging to one or different logical channels into/from transport blocks (TB) delivered to/from the physical layer on transport channels
Scheduling information reporting
Error correction through hybrid automatic repeat request (HARQ)
Priority handling between logical channels of one UE
Priority handling between UEs by means of dynamic scheduling
Multimedia broadcast multicast services (MBMS) service identification
Transport format selection
Padding Physical layers 2-20 and 2-25 may perform operations of channel coding and modulating higher layer data, forming the higher layer data into an OFDM symbol, transmitting the OFDM symbol through a radio channel, or of demodulating an OFDM symbol received through a radio channel, channel-decoding the OFDM symbol, and transmitting the OFDM symbol to a higher layer.

Figure 3:
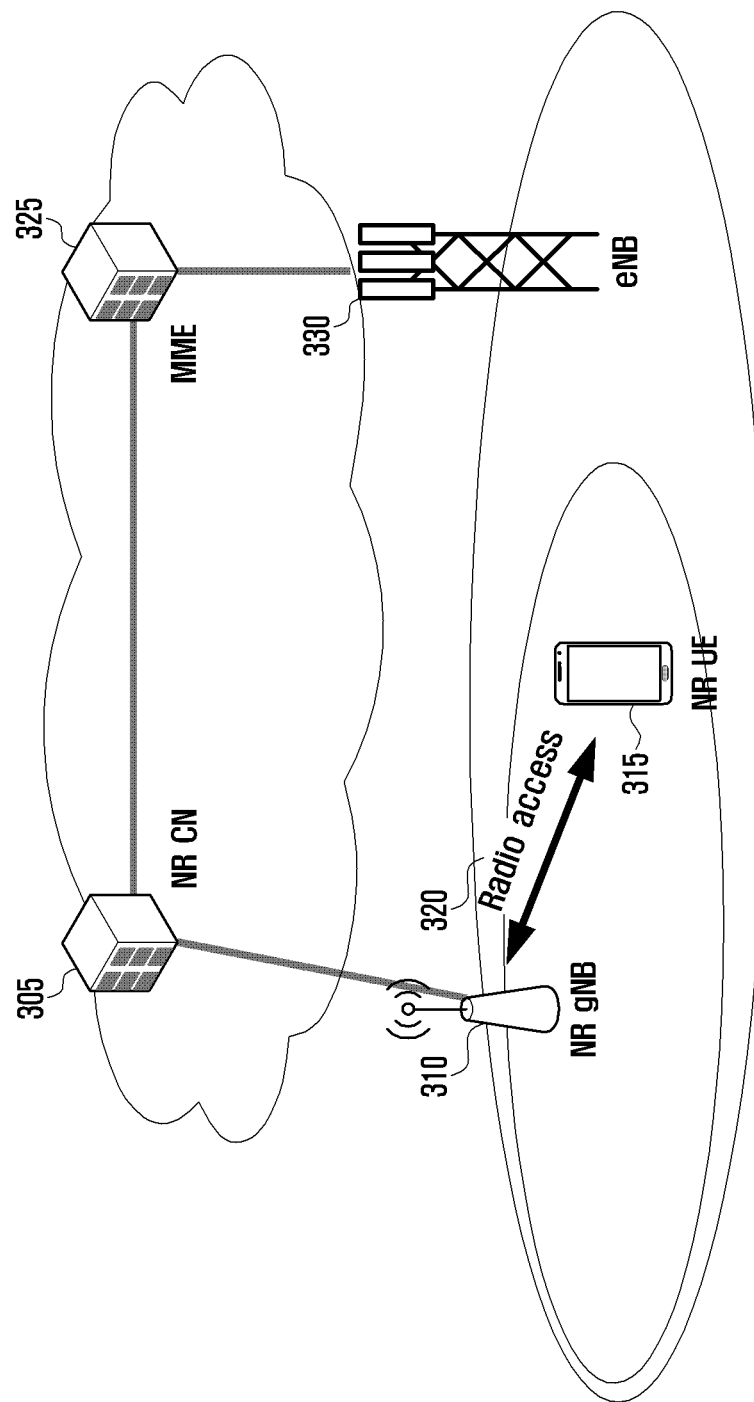
FIG. 3 illustrates the structure of a next-generation mobile communication system according to an embodiment of the disclosure.

FIG. 3 illustrates the structure of a next-generation mobile communication system according to an embodiment of the disclosure.

Referring to FIG. 3, a radio access network of a next-generation mobile communication system (hereinafter referred to as NR or 5G) includes a new radio node B (hereinafter referred to as an NR, gNB, or NR base station) 310 and a new radio core network (NR CN) 305. A user terminal (a new radio user equipment, hereinafter referred to as NR UE or a terminal) 315 accesses an external network via an NR gNB 310 and an NR CN 305.

In FIG. 3, the NR gNB 310 corresponds to an evolved node B (eNB) of the existing LTE system. The NR gNB is connected to the NR UE 315 via a radio channel, and may provide an excellent service as compared to the existing node B. In the next-generation mobile communication system, since all types of user traffics are serviced through a shared channel, there is a need for a device for performing scheduling by collecting state information, such as buffer states, available transmission power states, and channel states of UEs. Further, the NR NB 310 is in charge of this function of the device. In general, one NR gNB typically controls a plurality of cells. In order to implement ultra-high speed data transmission as compared to the existing LTE, the NR gNB may have the existing maximum bandwidth or more, and may additionally employ beamforming technology using orthogonal frequency division multiplexing (OFDM) as a radio access technology. In addition, the NR gNB adopts an adaptive modulation & coding (AMC) scheme that determines a modulation scheme and a channel coding rate based on the channel state of a UE. The NR CN 305 performs functions, such as mobility support, bearer configuration, QoS configuration, and the like. The NR CN is a device that is in charge of various control functions in addition to a mobility management function for a UE, and is connected to a plurality of base stations. In addition, the next-generation mobile communication system may also operate in conjunction with the existing LTE system, and the NR CN may be connected to an MME 325 via a network interface. The MME is connected to an eNB 330, that is, to the existing base station.

Figure 4:
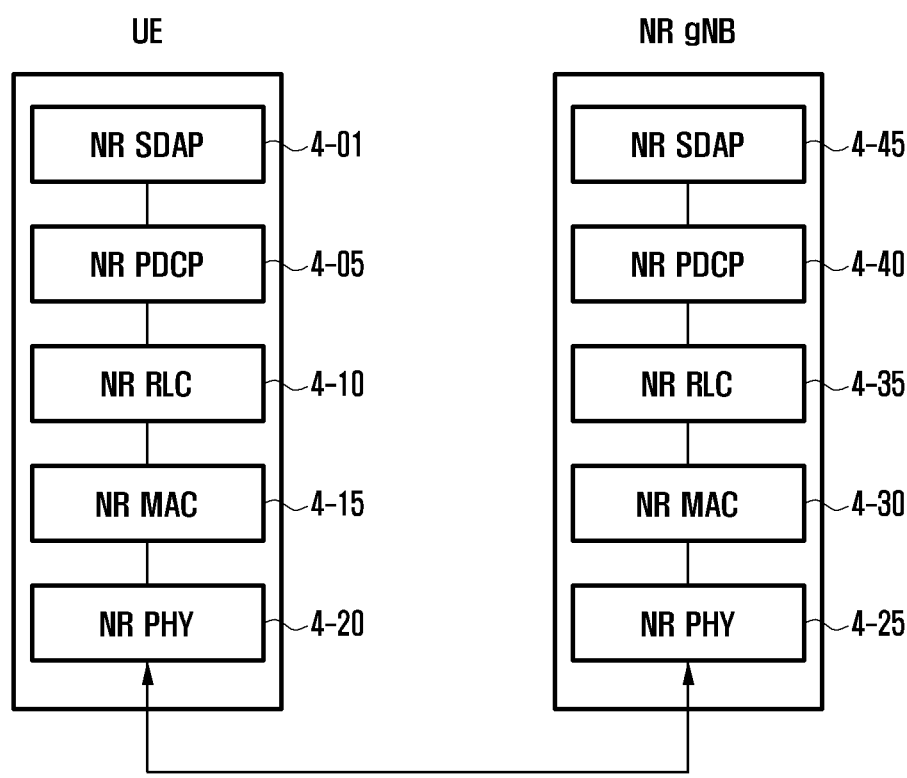
FIG. 4 illustrates a radio protocol structure of a next-generation mobile communication system according to an embodiment of the disclosure.

FIG. 4 illustrates a radio protocol structure of a next-generation mobile communication system according to an embodiment of the disclosure.

Referring to FIG. 4, the radio protocol of the next-generation mobile communication system includes NR service data adaptation protocols (SDAPs) 4-01 and 4-45, NR PDCPs 4-05 and 4-40, NR RLCs 4-10 and 4-35, and NR MACs 4-15 and 4-30, respectively, in a UE and an NR base station.

The main functions of the NR SDAPs 4-01 and 4-45 may include some of the following functions.

Transfer of user plane data
Mapping between a QoS flow and a DRB for both downlink (DL) and uplink (UL)
Marking QoS flow ID in both DL and UL packets)
Mapping reflective QoS flow to DRB for the UL SDAP PDUs For the SDAP layer device, the UE may be configured as to whether or not use the header of the SDAP layer device or the function of the SDAP layer device for each PDCP layer device, for each bearer, and for each logical channel through an RRC message. When the SDAP header is configured, an NAS reflective QoS reflective configuration 1-bit indicator (NAS reflective QoS) and an AS QoS reflective configuration 1-bit indicator (AS reflective QoS) of the SDAP header are used to instruct the UE to enable updating or reconfiguring of the mapping information for the QoS flow of uplink and downlink and mapping information for data bearer. The SDAP header may include QoS flow ID information indicating QoS. The QoS information may be used as data processing priority, scheduling information, etc. to support a smooth service.

The main functions of the NR PDCPs 4-05 and 4-40 may include some of the following functions.

Header compression and decompression (ROHC only)
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP device refers to a function of sequentially reordering PDCP PDUs, received from a lower layer, based on a PDCP sequence number (SN), and may include a function of transmitting data to a higher layer in the reordered sequence, a function of directly transmitting data to a higher layer without taking the sequence into consideration, a function of reordering the sequence and recording missing PDCP PDUs, a function of providing a state report on the missing PDCP PDUs to a transmission side, and a function of requesting retransmission of the missing PDCP PDUs.

The main functions of the NR RLCs 4-10 and 4-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC device refers to a function of transmitting RLC SDUs, received from a lower layer, to a higher layer in the order of reception, and may include, if one RLC SDU is originally segmented into multiple RLC SDUs and received, a function of reassembling and transmitting the multiple RLC SDUs. The in-sequence delivery function may include a function of reordering the received RLC PDUs based on an RLC SN or PDCP SN, reordering the sequence and recording missing RLC PDUs, providing a state report on the missing RLC PDUs to a transmission side, and requesting retransmission of the missing RLC PDUs. Alternatively, the in-sequence delivery function of the NR RLC device may include a function of sequentially transmitting only RLC SDUs prior to the missing RLC SDU to a higher layer if an RLC SDU is missing, or sequentially transmitting all the RLC SDUs received before a timer starts to a higher layer if the timer expires even if there is a missing RLC SDU, or sequentially transmitting all RLC SDUs received so far to a higher layer if a predetermined timer expires even if there is a missing RLC SDU. In addition, the RLC PDUs may be processed in the sequence in which the RLC PDUS are received (in the sequence of arrival regardless of the serial number or sequence number), and may be transmitted to a PDCP device in out-of-sequence delivery. The in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer, or may be replaced by a multiplexing function of the NR MAC layer.

The out-of-sequence delivery function of the NR RLC device refers to a function of directly transmitting the RLC SDUs, received from the lower layer, to a higher layer regardless of the order thereof, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 4-15 and 4-30 may be connected to multiple NR RLC layer devices configured in one UE, and the main function of the NR MAC may include some of the following functions.

Mapping between logical channels and transport channels
Multiplexing/de-multiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 4-20 and 4-25 may perform operations of channel-coding and modulating higher layer data, forming the higher layer data into an OFDM symbol, transmitting the OFDM symbols via a radio channel or demodulating and channel decoding of the OFDM symbols received via the radio channel, and transferring the OFDM symbol to a higher layer.

Figure 5:
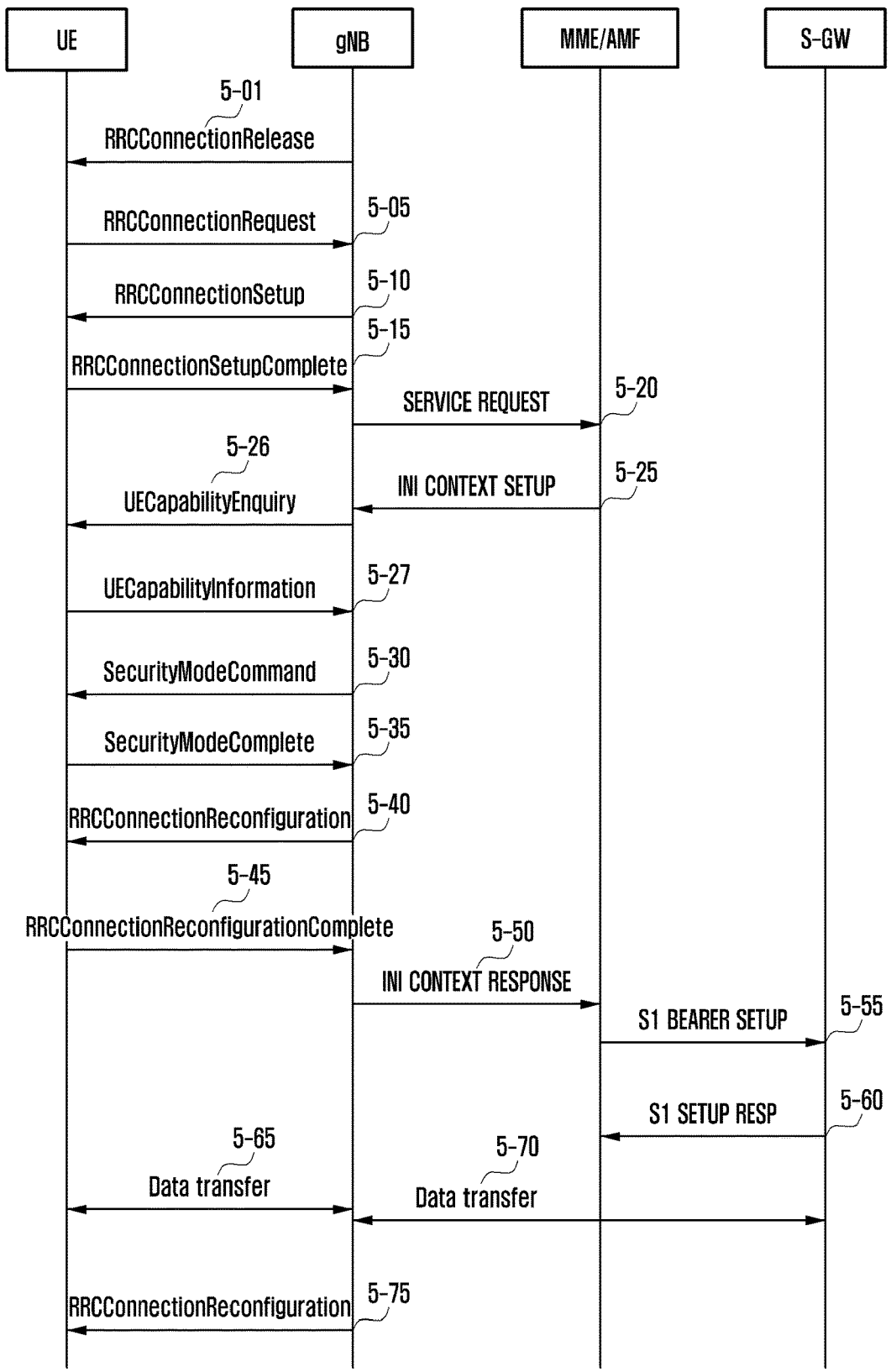
FIG. 5 illustrates a procedure for establishing a connection with a network by switching a mode of a user equipment (UE) from a radio resource control (RRC) idle mode to an RRC connected mode according to an embodiment of the disclosure.

FIG. 5 illustrates a procedure of establishing a connection with a network by switching a mode of a UE from an RRC idle mode to an RRC connected mode according to an embodiment of the disclosure.

Referring to FIG. 5, the base station may transmit an RRCConnectionRelease message to the UE, when the UE transmitting and receiving data in the RRC connected mode does not transmit or receive data for a predetermined reason or for a predetermined period of time, to switch the UE to be in the RRC idle mode (indicated by reference numeral 5-01). In the future, a UE for which a connection is not currently established (hereinafter, an idle mode UE) performs an RRC connection establishment process with the base station when data to be transmitted is generated. The UE establishes backward transmission synchronization with the base station through a random access process and transmits an RRCConnectionRequest message to the base station (indicated by reference numeral 5-05). The message includes the reason (establishmentCause) for establishing a connection with the identifier of the UE. The base station transmits an RRCConnectionSetup message so that the UE establishes an RRC connection (indicated by reference numeral 5-10).

The message includes configuration information for each service, bearer, RLC device, or logical channel, information indicating whether to use ROHC for each bearer or logical channel, ROHC configuration information (e.g., ROHC version, initial information, etc.), statusReportRequired information (information by which the base station instructs the UE to perform PDCP Status report), and drb-ContinueROHC information (configuration information which indicates maintaining and using ROHC configuration information as it is and the configuration information may be included in PDCP layer device configuration information (pdcp-config) and transmitted). In addition, the message includes RRC connection configuration information and the like. The bearer for RRC connection is also called signaling radio bearer (SRB), and is used for transmission or reception of an RRC message, which is a control message between the UE and the base station.

The UE that has established the RRC connection transmits an RRCConnetionSetupComplete message to the base station (indicated by reference numeral 5-15). The message includes a control message called SERVICE REQUEST, through which the UE requests the MME to set up a bearer for a predetermined service. The base station transmits the SERVICE REQUEST message included in the RRCConnetionSetupComplete message to the MME or access management function (AMF) (indicated by reference numeral 5-20), and the MME or AMF determines whether to provide the service requested by the UE. As a result of the determination, if the MME or AMF determines to provide the service requested by the UE, the MME or AMF transmits a message called INITIAL CONTEXT SETUP REQUEST (or INI CONTEXT SETUP) to the base station (indicated by reference numeral 5-25). The message includes information such as QoS information to be applied when setting up a data radio bearer (DRB), and security-related information (for example, security key, security algorithm) to be applied to the DRB.

In addition, when the base station does not receive the capability information of the UE from the MME or AMF, the base station may transmit a UE capability information enquiry message to the UE in order to identify capability information of the UE (indicated by reference numeral 5-26). Upon receiving the UE capability information enquiry message, the UE may configure and generate a UE capability information message and report the UE capability information message to the base station (indicated by reference numeral 5-27). The UE capability information message may include types of handover methods the UE supports. For example, the UE capability can be reported to the base station through an indicator as to whether or not the UE supports the efficient handover method (dual active protocol stack, and DAPS) of the disclosure. When the base station identifies the UE capability information, the base station may instruct the UE to perform handover through the handover command message, by defining an indicator according to each handover method in the handover command message, and transmit the indicator to the UE. For example, the base station may instruct the UE to perform the efficient handover method (DAPS handover method) of the disclosure, and may configure the DAPS handover method for each bearer (DRB or SRB) of the UE by using another method. When the base station configures the DAPS handover method for the UE, together with other handover methods (e.g., a conditional handover method (a method in which the UE performs a procedure of handover to one target cell when multiple target cells and multiple conditions are configured for the UE and the UE satisfies the above conditions in the cell selection or reselection procedure) or a random access channel-less (RACH-less) handover method), data loss or transmission delay that may occur during handover can be prevented. The UE may perform a procedure of handover to the target base station according to the handover method indicated through the handover command message.

The base station exchanges a security mode command message 5-30 and a security mode complete message 5-35 in order to configure security with the UE. When the security configuration is completed, the base station transmits an RRCConnectionReconfiguration message to the UE (indicated by reference numeral 5-40).

The message includes configuration information for each service, bearer, RLC device, or logical channel, information indicating whether to use ROHC for each bearer or logical channel, ROHC configuration information (e.g., ROHC version, initial information, etc.), statusReportRequired information (information by which the base station instructs the UE to perform PDCP Status report), and drb-ContinueROHC information (configuration information which indicates maintaining and using ROHC configuration information as it is and the configuration information may be included in PDCP layer device configuration information (pdcp-config) and transmitted). In addition, the message includes RRC connection configuration information and the like. The bearer for RRC connection is also called signaling radio bearer (SRB), and is used for transmission or reception of an RRC message, which is a control message between the UE and the base station.

In addition, the message includes configuration information of the DRB in which user data is to be processed, and the UE configures the DRB by applying the information and transmits an RRCConnectionReconfigurationComplete message to the base station (indicated by reference numeral 5-45). The base station, which has completed the DRB setup with the UE, transmits an INITIAL CONTEXT SETUP COMPLETE (INI CONTEXT RESPONSE) message to the MME or AMF (indicated by reference numeral 5-50), and the MME or AMF, which has received the INITIAL CONTEXT SETUP COMPLETE message, exchanges the S1 bearer setup message with the S1 bearer setup response messages in order to set up S1 bearer for the S-GW. (Indicated by reference numerals 5-55 and 5-60). The S1 bearer is a data transmission connection established between the S-GW and the base station, and corresponds to DRB on a one to one basis. When all of the above processes are completed, the UE transmits or receives data through the base station through the S-GW (indicated by reference numerals 5-65 and 5-70). This general data transmission process is largely configured by three stages of RRC connection setup, security setup, and DRB setup. In addition, the base station may transmit an RRC connection reconfiguration message in order to newly perform, add, or change the configuration for the UE for a predetermined reason (indicated by reference numeral 5-75).

In the disclosure, a bearer may include SRB and DRB, the SRB denotes a signaling radio bearer, and the DRB denotes a data radio bearer. The SRB is mainly used to transmit or receive RRC messages of the RRC layer device, and the DRB is mainly used to transmit or receive user layer data. In addition, a UM DRB denotes a DRB which uses an RLC layer device operating in a UM mode, and an AM DRB denotes a DRB which uses an RLC layer device operating in an AM mode.

In the disclosure, the bearer, for which the DAPS handover method is configured, may be configured such that the identifier of the bearer configured in the RRC message is included in the list of bearers for which the DAPS handover methods are configured or is not included in the list of bearers for which the DAPS handover methods are not configured. Alternatively, the bearer for which the DAPS handover method is configured may denote or indicate a bearer for which a DAPS handover method configuration indicator exists in the configuration information for each bearer, or bearer for which a DAPS handover method configuration indicator is configured in the PDCP layer device configuration information.

In the disclosure, the bearer, for which the DAPS handover method is not configured, may be configured such that the identifier of the bearer configured in the RRC message is not included in the list of bearers for which the DAPS handover methods are configured or is included in the list of bearers for which the DAPS handover methods are not configured. Alternatively, the bearer for which the DAPS handover method is not configured may denote or indicate a bearer for which a DAPS handover method configuration indicator does not exist in the configuration information for each bearer, or a bearer for which a DAPS handover method configuration indicator is not configured in the PDCP layer device configuration information.

In the disclosure, the source base station may be understood as a source cell (that may be a primary cell (Pcell), a special cell (Spcell), or a secondary cell (SCell)) or source cell group (that may be a source cell group or a master cell group). The target base station may be understood as a target cell (that may be a Pcell, Spcell, or SCell) or a target cell group (that may be a target cell group or a master cell group).

Figure 6:
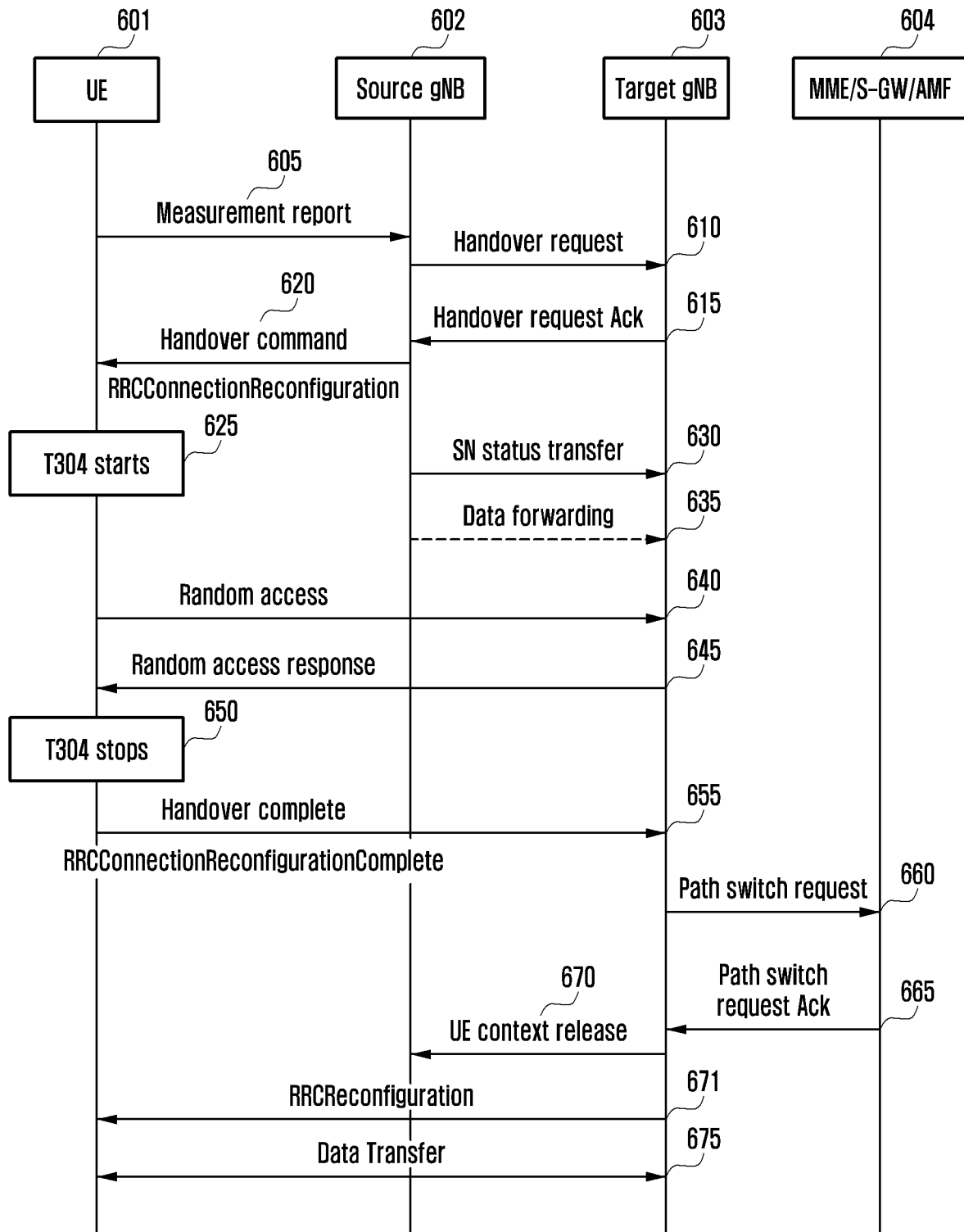
FIG. 6 illustrates signaling procedures for performing handover in a next-generation mobile communication system according to an embodiment of the disclosure.

FIG. 6 illustrates signaling procedures for performing handover in a next-generation mobile communication system according to an embodiment of the disclosure.

Referring to FIG. 6, the UE 601, which is in an RRC connected mode state, reports cell measurement information (measurement report) to the current source base station (Source eNB) 602 when a periodic or specific event is satisfied (indicated by reference numeral 605). The source base station determines whether or not the UE 601 performs handover to an adjacent cell based on the measurement information. Handover is a technique for changing a source base station, which provides a service to a UE in a connected mode state, to another base station (or another cell of the same base station). If the source base station determines the handover, the source base station transmits an HO request message (for example, a handover preparation information message) to a new base station, which will provide a service to the UE 601, that is, a target base station 603 and thus requests handover (indicated by reference numeral 610). If the target base station 603 accepts the handover request, the target base station 603 transmits an HO request acknowledgment (ACK) message (for example, a handover command message) to the source base station 602 (indicated by reference numeral 615). Upon receiving the message, the source base station 602 transmits a handover command message (HO command message, or RRCReconfiguration message included in the DCCH of the HO request ACK message) to the UE 601 (indicated by reference numeral 620). The handover command (HO command) message is extracted by the source base station 602 from the message received from the target base station 603 and transmitted to the UE 601 by using an RRCConnectionReconfiguration message (indicated by reference numeral 625).

In the present disclosure, when the source base station 602 transmits the handover preparation information message (indicated by reference numeral 610) and the target base station 603 transmits the handover command message (indicated by reference numeral 615) to the source base station 602 in response thereto, a method for determining the efficient DAPS handover method by using the two messages is provided.

A first embodiment of determining the efficient DAPS handover method of the disclosure is as follows.

In the first embodiment, the subject determining the DAPS handover method may be a source base station. Further, in the first embodiment, when the source base station requests the DAPS handover method, the target base station may always indicate or perform the DAPS handover method.

The source base station may indicate to the target base station that the source base station will perform the DAPS handover method of the disclosure by defining a new indicator in the handover preparation information message, and may request the DAPS handover method. The handover preparation information message may include current bearer configuration information, security key information, cell group configuration information, or UE capability information of the UE. In the above, the source base station may know in advance whether the target base station supports the DAPS handover method by sharing the capabilities of the target base station in advance. In addition, the source base station transmits, to the target base station, an indication that the source base station is to perform the DAPS handover method, and thus it is possible to inform the target base station that the source base station may perform fast or early data forwarding, and instruct the target base station to receive the data forwarding and prepare to process the data forwarding quickly. In the above, the source base station may perform a request for the DAPS handover method for each bearer (DRB or SRB).

In the above, the target base station receives the handover preparation information message and identifies that the indicator for requesting the DAPS handover method is included therein. Then, in a case of configuring an RRCReconfiguration message for indicating the UE to perform handover, the target base station may configure the RRCReconfiguration message by including an indicator indicating the DAPS handover method and configure the RRCReconfiguration message by including bearer configuration information, security key information, cell group configuration information, or system information, which are required when the UE performs the DAPS handover method. In addition, the target base station may include the configured RRCReconfiguration message in the DL-DCCH message of the handover command message to transmit the same to the source base station. In the above, the target base station may indicate a DAPS handover method for each bearer (DRB or SRB).

In the above, when the source base station receives the handover command message, the source base station may extract the RRCReconfiguration message included in the handover command message or transmit the RRCReconfiguration message to the UE to indicate to perform handover. In the above, the source base station may identify the indicated DAPS handover method for each bearer and perform the DAPS handover method for each bearer (DRB or SRB).

A second embodiment of determining an efficient DAPS handover method of the disclosure is as follows.

In the second embodiment, the subject determining the DAPS handover method may be a target base station. In addition, in the second embodiment, when the source base station requests the DAPS handover method from the target base station by using an indicator, the target base station may reject or accept the request, or may indicate the source base station through a handover command message indicating another handover method.

The source base station may indicate to the target base station that the source base station will perform the DAPS handover method of the disclosure by defining a new indicator in the handover preparation information message, and may request the DAPS handover method from the target base station. The handover preparation information message may include current bearer configuration information, security key information, cell group configuration information, or UE capability information of the UE. In the above, the source base station may know in advance whether the target base station supports the DAPS handover method by sharing the capabilities of the target base station in advance. In the above, the source base station transmits, to the target base station, an indication that the source base station is to perform the DAPS handover method, and thus it is possible to inform the target base station that the source base station may perform fast or early data forwarding, and instruct the target base station to receive the data forwarding and prepare to process the data forwarding quickly. In the above, the source base station may perform a request for the DAPS handover method for each bearer (DRB or SRB).

In the above, the target base station receives the handover preparation information message and identifies that the indicator for requesting the DAPS handover method is included therein. Then, the target base station may reject or accept the request for the DAPS handover according to whether the target base station is capable of supporting the DAPS handover method, the amount of current transmission resources, or scheduling, or may indicate another handover method. In the above, the target base station may include, in a handover command message, an indicator for rejecting the request for the DAPS handover request, an indicator for accepting thereof, or an indicator indicating another type of handover method, and transmit the handover command message. In the above, when the target base station configures an RRCReconfiguration message for instructing the UE to perform handover, the target base station may configure the RRCReconfiguration message to include an indicator indicating the DAPS handover method when the DAPS handover request is accepted and to include an indicator indicating another handover method when the DAPS handover request is rejected, and the target base station may configure the RRCReconfiguration message to include bearer configuration information, security key information, cell group configuration information, or system information, which are required when the UE performs the DAPS handover method or other handover method. In addition, the target base station may include the configured RRCReconfiguration message in a DL-DCCH message of the handover command message to transmit the DL-DCCH message to the source base station. In the above, the target base station may perform an indication of the DAPS handover method for each bearer (DRB or SRB).

In the above, when the source base station receives the handover command message, the source base station may identify whether the request for the DAPS handover method is accepted or rejected by identifying the indicator included in the handover command message. If the request is accepted, the source base station may also perform the DAPS handover method, and the source base station may extract the RRCReconfiguration message included in the handover command message or transmit the RRCReconfiguration message to the UE, so as to indicate to perform handover. However, if the request for the DAPS handover method is rejected when the indicator included in the handover command message is identified, or if another handover method is indicated, the source base station may also perform another handover method indicated by the target base station. In addition, the source base station may extract the RRCReconfiguration message included in the handover command message or transmit the RRCReconfiguration message to the UE, so as to indicate to perform handover. As another method, in the above, the source base station may read the RRCReconfiguration message included in the handover command message, even if there is no separate indicator in the handover command message, to identify a handover method indicated by the target base station and identify whether the request for the DAPS handover method is accepted or rejected; and the source base station may also perform the handover method (e.g., DAPS handover method or other handover method) indicated in the RRCReconfiguration message. In the above, the source base station may identify the indicated DAPS handover method for each bearer and perform the DAPS handover method for each bearer (DRB or SRB).

A third embodiment of determining an efficient DAPS handover method of the disclosure above is as follows.

In the third embodiment, the subject determining the DAPS handover method may be a target base station. In addition, in the third embodiment, the target base station identifies the capabilities of the UE and determines a handover method (e.g., DAPS handover method) according to whether the target base station is capable of supporting the DAPS handover method, or the amount of current transmission resources or scheduling.

The source base station may include, in a handover preparation information message, current bearer configuration information, security key information, cell group configuration information, or UE capability information of the UE, and may transmit the handover preparation information message to the target base station in order to request a handover. In the above, the source base station may know in advance whether the target base station supports the DAPS handover method by sharing the capabilities of the target base station in advance. If the target base station indicates to perform the DAPS handover method, the source base station may perform fast or early data forwarding.

In the above, the target base station receives the handover preparation information message, and the target base station may determine the handover method (for example, DAPS handover) according to the capability information of the UE or whether the target base station is capable of supporting the DAPS handover method, the amount of current transmission resources, or scheduling. As described above, when the DAPS handover method is determined based on the handover command message, the target base station may include an indicator indicating the DAPS handover method in the message and transmit the message. As described above, in a case where the DAPS handover method is determined, the target base station may include an indicator indicating the DAPS handover method in the RRCReconfiguration message at the time of configuring the RRCReconfiguration message instructing the UE to perform handover; in a case where another DAPS handover method rather than the DAPS handover method is determined, the target base station may include an indicator indicating the another DAPS handover method in the RRCReconfiguration message; and the target base station may configure the RRCReconfiguration message by including bearer configuration information, security key information, cell group configuration information, or system information, which are required when the UE performs the DAPS handover method or the another handover method. In addition, the target base station may include the configured RRCReconfiguration message in a DL-DCCH message of the handover command message to transmit the DL-DCCH message to the source base station. In the above, the target base station may perform an indication of the DAPS handover method for each bearer (DRB or SRB).

In the above, when the source base station receives the handover command message, the source base station may identify whether the DAPS handover is determined by identifying the indicator included in the handover command message. If the DAPS handover method is indicated, the source base station may also perform the DAPS handover method, and handover may be indicated by extracting the RRCReconfiguration message included in the handover command message or by transmitting the RRCReconfiguration message to the UE. However, if the DAPS handover method is not determined when the indicator included in the handover command message is identified, or if another handover method is indicated, the source base station may also perform another handover method indicated by the target base station. In addition, the source base station may extract the RRCReconfiguration message included in the handover command message or transmit the RRCReconfiguration message to the UE, to indicate to perform handover. As another method, the source base station may read the RRCReconfiguration message included in the handover command message, even if there is no separate indicator in the handover command message, to identify a handover method indicated by the target base station, and identify whether the determination of the DAPS handover method is established. If another handover method is indicated, the source base station may also perform the indicated handover method. The source base station may identify the indicated DAPS handover method for each bearer and perform the DAPS handover method for each bearer (DRB or SRB).

An extended new embodiment may be provided by combining the methods of the first embodiment, the second embodiment, or the third embodiment in which the efficient DAPS handover method of the disclosure is determined.

Through the RRCReconfiguration message, the base station may indicate, to the UE, an efficient handover method (DAPS handover method) of this disclosure, and may configure the DAPS handover method for each bearer (DRB or SRB) of the UE, by using another method. For example, the base station may define, in the RRC message, a new indicator indicating the efficient handover method (DAPS handover method) based on bearer configuration information, PDCP configuration information, or RLC configuration information for each bearer identifier or logical channel identifier. In addition, the base station may indicate, to the UE, the efficient handover method for each bearer or for each logical channel identifier, by using the indicator. As described above, when the base station configures the DAPS handover method for the UE, other handover methods (e.g., the conditional handover method (a method in which a plurality of target cells and a plurality of conditions are configured for the UE, and if the UE satisfies the above conditions in the procedure of cell selection or reselection procedure, the UE performs a procedure of handover to one target cell) or a handover method without a random access procedure) are indicated together with the configuration, and thus the UE can prevent data loss or transmission delay that may occur during handover. Upon receiving the message, the UE stops or continues transmission or reception of data to or from the source base station according to the configured handover method and starts a T304 timer. When the UE fails to perform handover to the target base station for a predetermined time (for example, when the T304 timer expires), the T304 timer causes the UE to return to its original configuration and switch to an RRC idle state. In addition, the UE may trigger an RRC connection re-establishment procedure, and if an efficient handover method is configured using another method and the connection with the source base station is valid, the UE may fall back to report a handover failure to the source base station. The source base station transmits the sequence number (SN) status for uplink or downlink data to each bearer (e.g., RLC UM bearer or RLC AM bearer), and if there is downlink or uplink data, the source base station transmits the downlink or uplink data to the target base station (indicated by reference numerals 630 and 635). The UE attempts random access to the target cell indicated by the source base station (indicated by reference numeral 640). The random access is performed in order to notify the target cell that the UE is moving through handover and to match uplink synchronization with the target cell. For the random access, the UE transmits, to the target cell, a preamble ID provided from the source base station or a preamble corresponding to the preamble ID that is randomly selected. After transmission of the preamble, the UE monitors whether a random access response (RAR) message is transmitted from the target cell when a specific number of subframes elapses. The time period of the monitoring is called a random access response window (RAR window). If a random access response (RAR) is received during the specific period of time (indicated by reference numeral 645), the UE transmits a handover (HO) complete message to the target base station by using an RRC reconfiguration complete message (indicated by reference numeral 655). Upon successfully receiving the random access response from the target base station, the UE interrupts or terminates the T304 timer (indicated by reference numeral 650). The target base station requests path modification from the source base station in order to modify configured paths of the bearers (indicated by reference numerals 660 and 665) and transmits a request for deleting UE context of the UE to the source base station (indicated by reference numeral 670). In addition, the target base station may transmit an RRC message (e.g., RRCReconfiguration message) 671) to the UE to instruct the UE to release the connection with the source base station by using an indicator. Alternatively, the target base station may transmit MAC control information, RLC control information, or PDCP control information to the UE to instruct the UE to release the connection with the source base station. Therefore, the UE attempts to receive data from the target base station from the start time of the RAR window, transmits an RRC reconfiguration complete message after the RAR is received, and receives a downlink transmission resource or an uplink transmission resource, thereby starting transmission or reception of data 675 to or from the target base station.

Methods, which are applicable when the base station configures or indicates, for the UE, the second embodiment (DAPS handover method) of the disclosure by using the handover command message or RRC message (for example, RRCReconfiguration message), are as follows. In the disclosure, when the base station configures the DAPS handover method for the UE, or when the UE receives a handover command message for configuring the DAPS handover method from the base station, the base station may perform a method employed by applying one method or several methods among the methods as follows.

Method 1-1: When indicating or configuring a handover to a UE, the base station (source base station, target base station, LTE base station, or NR base station) may include mobility Control Info or ReconfigurationWithSync configuration information in the RRCReconfiguration message, and may define an indicator in SRB-ToAddMod or DRB-ToAddMod of SRB-ToAddModList or DRB-ToAddModList in the bearer configuration information (Radio Resource Config Dedicated or Radio Bearer Config) of the RRCReconfiguration message to indicate the DAPS handover method for each bearer (SRB or DRB). As another method, the base station may define the indicator in pdcp-config in SRB-ToAddMod or DRB-ToAddMod to indicate the DAPS handover method for each bearer. As another method, when the LTE base station indicates or configures the handover to the UE through the LTE RRCRecofiguration message, in the case of LTE, pdcp-config is not defined in the SRB-ToAddMod and the default PDCP layer device configuration is used; and thus for SRB, an indicator is defined in the SRB-ToAddMod to configure the DAPS handover method for each bearer, and for DRBs, an indicator is defined in pdcp-config in DRB-ToAddMod to configure the DAPS handover method for each bearer. Upon receiving the handover command message (RRCReconfiguration message) configured in the above, the UE may perform the DAPS handover method for bearers for which the DAPS handover method is configured according to the configuration, and may perform a general handover method for bearers for which the DAPS handover method is not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover (CHO)), and the DAPS handover method is configured for each bearer, the UE may apply the DAPS handover method prior to the type of the other handover methods when performing a handover procedure for each bearer as described above. For example, the UE may perform a DAPS handover method for bearers for which the DAPS handover method is configured according to the configuration, and may perform a handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, for bearers for which the DAPS handover method is not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured above, when the DAPS handover method is configured for at least one bearer or a predetermined bearer for each bearer, the UE may apply the RRC layer device, SDAP layer device, MAC layer device, PHY layer device, or SRB processing method, etc. for performing the DAPS handover method of the disclosure. In addition, for bearers for which the DAPS handover method is configured for each bearer, the UE may apply a method for processing the PDCP layer device, RLC layer device, etc. for performing the DAPS handover method of the disclosure.

Method 1-2: When indicating or configuring a handover to a UE, the base station (source base station, target base station, LTE base station, or NR base station) may include mobility Control Info or ReconfigurationWithSync configuration information in the RRCReconfiguration message, and may define an indicator in DRB-ToAddMod of DRB-ToAddModList in the bearer configuration information (Radio Resource Config Dedicated or Radio Bearer Config) of the RRCReconfiguration message to indicate the DAPS handover method for each bearer (DRB); and for SRBs, the base station may not introduce a separate indicator for configuring the DAPS handover method. That is, when the UE receives the handover command message (RRCReconfiguration message) configured as described above, when the DAPS handover method is configured for at least one bearer (DRB) or a predetermined bearer (DRB) for each bearer, the UE may apply the SRB processing method for performing the DAPS handover method of this disclosure. Alternatively, by defining an indicator in pdcp-config in the DRB-ToAddMod, the base station may indicate the DAPS handover method for each bearer. When the UE receives the configured handover command message (RRCReconfiguration message), the UE can perform the DAPS handover method for bearers for which the DAPS handover method is configured according to the configuration, and may perform a general handover method for bearers for which the DAPS handover method is not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover CHO) and the DAPS handover method is configured for each bearer, the UE may apply the DAPS handover method prior to the type of the other handover methods when performing a handover procedure for each bearer as described above. For example, the UE may perform a DAPS handover method for bearers for which a DAPS handover method is configured according to the configuration, and may perform a handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, for bearers for which the DAPS handover method is not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, when the UE receives the handover command message (RRCReconfiguration message) configured as described above, if the DAPS handover method is configured for at least one bearer or a predetermined bearer for each bearer, the RRC layer device, SDAP layer device, MAC layer device, PHY layer device, or SRB processing method, etc. for performing the DAPS handover method of the disclosure can be applied; and for bearers for which the DAPS handover method is configured for each bearer, the UE may apply a method for processing the PDCP layer device, RLC layer device, etc. for performing the DAPS handover method of the disclosure.

Method 2-1: When indicating or configuring a handover to a UE, the base station (source base station, target base station, LTE base station, or NR base station) may include mobility Control Info or ReconfigurationWithSync configuration information in the RRCReconfiguration message and define and include an indicator for indicating or configuring the DAPS handover method in the mobility Control Info or ReconfigurationWithSync, thereby indicating that the DAPS handover method has been configured for at least one bearer or a predetermined bearer. In addition, the base station may define an indicator in SRB-ToAddMod or DRB-ToAddMod of SRB-ToAddModList or DRB-ToAddModList in the bearer configuration information (Radio Resource Config Dedicated or Radio Bearer Config) of the RRCReconfiguration message to indicate the DAPS handover method for each bearer (SRB or DRB). As another method, the base station may define the indicator in pdcp-config in SRB-ToAddMod or DRB-ToAddMod to indicate the DAPS handover method for each bearer. As another method, when the LTE base station indicates or configures the handover to the UE through the LTE RRCRecofiguration message, in the case of LTE, pdcp-config is not defined in the SRB-ToAddMod and the default PDCP layer device configuration is used; and thus for SRB, an indicator is defined in the SRB-ToAddMod to configure the DAPS handover method for each bearer, and for DRBs, an indicator is defined in pdcp-config in DRB-ToAddMod to configure the DAPS handover method for each bearer. The UE, having received the handover command message (RRCReconfiguration message) that is configured above, may perform the DAPS handover method for bearers for which the DAPS handover method is configured according to the configuration, and may perform a general handover method for bearers for which the DAPS handover method is not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover CHO) and the DAPS handover method is configured for each bearer, the UE may apply the DAPS handover method prior to the type of the other handover methods when performing a handover procedure for each bearer as described above. For example, a DAPS handover method may be performed for bearers for which a DAPS handover method is configured according to the configuration, and the handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, may be performed for bearers for which the DAPS handover method is not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured as described above, if an indicator for indicating or configuring a DAPS handover method is included or configured in the mobility Control Info or ReconfigurationWithSync, the UE may apply the RRC layer device, SDAP layer device, MAC layer device, PHY layer device, or SRB processing method, etc. for performing the DAPS handover method of the disclosure. In addition, the UE may apply, to bearers for which the DAPS handover method is configured for each bearer, a method for processing the PDCP layer device, RLC layer device, etc. for performing the DAPS handover method of the disclosure.

Method 2-2: When indicating or configuring a handover to a UE, the base station (source base station, target base station, LTE base station, or NR base station) may include mobility Control Info or ReconfigurationWithSync configuration information in the RRCReconfiguration message and define and include an indicator for indicating or configuring the DAPS handover method in the mobility Control Info or ReconfigurationWithSync, thereby indicating that the DAPS handover method has been configured for at least one bearer or a predetermined bearer. In addition, the base station may define an indicator in DRB-ToAddMod of DRB-ToAddModList in the bearer configuration information (Radio Resource Config Dedicated or Radio Bearer Config) of the RRCReconfiguration message to indicate the DAPS handover method for each bearer (DRB); and for SRBs, the base station may not introduce a separate indicator for configuring the DAPS handover method. That is, upon receiving the handover command message (RRCReconfiguration message) configured as described above, when the DAPS handover method is configured for at least one bearer (DRB) or a predetermined bearer (DRB) for each bearer, the UE may apply the SRB processing method for performing the DAPS handover method of this disclosure. As another method, by defining an indicator in pdcp-config in the DRB-ToAddMod, the base station may indicate the DAPS handover method for each bearer. The UE, having received the handover command message (RRCReconfiguration message) configured, may perform the DAPS handover method for a bearer for which the DAPS handover method is configured for each bearer according to the configuration, and may perform a general handover method for bearers for which the DAPS handover method is not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover CHO) and the DAPS handover method is configured for each bearer, the UE may apply the DAPS handover method prior to the type of the other handover methods when performing a handover procedure for each bearer as described above. For example, a DAPS handover method may be performed for bearers for which a DAPS handover method is configured according to the configuration, and the UE may perform the handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, for bearers for which the DAPS handover method is not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured as described above, if an indicator for indicating or configuring a DAPS handover method is included or configured in the mobility Control Info or ReconfigurationWithSync, the UE may apply the RRC layer device, SDAP layer device, MAC layer device, PHY layer device, or SRB processing method, etc. for performing the DAPS handover method of the disclosure. In addition, the UE may apply, to bearers for which the DAPS handover method is configured for each bearer, a method for processing the PDCP layer device, RLC layer device, etc. for performing the DAPS handover method of the disclosure.

Method 3-1: When indicating or configuring a handover to a UE, the base station (source base station, target base station, LTE base station, or NR base station) may include mobility Control Info or ReconfigurationWithSync configuration information in the RRCReconfiguration message and define and include an indicator for indicating or configuring the DAPS handover method in the mobility Control Info or ReconfigurationWithSync, thereby indicating that the DAPS handover method has been configured for at least one bearer or a predetermined bearer. In addition, the base station may configure and include a list of bearers for which the DAPS handover methods are configured, and include the identifiers (SRB or DRB) of the bearer, for which the DAPS handover method is configured, in the list of bearers so as to indicate whether the DAPS handover method is configured for each bearer. As another method, the base station may configure and include a list of bearers for which the DAPS handover methods are not configured, and include the identifiers (SRB or DRB) of the bearer, for which the DAPS handover method is not configured, in the list of bearers so as to indicate whether the DAPS handover method is configured for each bearer. The UE, having received the handover command message (RRCReconfiguration message) that is configured above, may perform the DAPS handover method for bearers for which the DAPS handover method is configured according to the configuration, bearers, the identifiers of which are included in the list of bearers for which the DAPS handover methods are configured, or bearers, the identifiers of which are not included in the list of bearers for which the DAPS handover methods are not configured. In addition, the UE may perform a general handover method for bearers for which the DAPS handover method is not configured, bearers, the identifiers of which are not included in the list of bearers for which the DAPS handover methods are configured, or bearers, the identifiers of which are included in the list of bearers for which the DAPS handover methods are not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover CHO) and the DAPS handover method is configured for each bearer, the UE may apply the DAPS handover method prior to the type of the other handover methods when performing a handover procedure for each bearer as described above. For example, the UE may perform a DAPS handover method for bearers for which a DAPS handover method is configured according to the configuration, bearers, the identifiers of which are included in the list of bearers for which the DAPS handover methods are configured; or bearers, the identifiers of which are not included in the list of bearers for which the DAPS handover methods are not configured. In addition, the UE may perform a handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, for bearers for which the DAPS handover method is not configured, bearers, the identifiers of which are not included in the list of bearers for which the DAPS handover methods are configured, or bearers, the identifiers of which are included in the list of bearers for which the DAPS handover methods are not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured as described above, if an indicator for indicating or configuring a DAPS handover method is included or configured in the mobility Control Info or ReconfigurationWithSync, the UE may apply the RRC layer device, SDAP layer device, MAC layer device, PHY layer device, or SRB processing method, etc. for performing the DAPS handover method of the disclosure. In addition, the UE may apply a method for processing the PDCP layer device, RLC layer device, etc. for performing the DAPS handover method of the disclosure, with respect to bearers for which the DAPS handover method is configured for each bearer, bearers, the identifiers of which are included in the list of bearers for which the DAPS handover methods are configured, or bearers, the identifiers of which are not included in the list of bearers for which the DAPS handover method are not configured.

Method 3-2: When indicating or configuring a handover to a UE, the base station (source base station, target base station, LTE base station, or NR base station) may include mobility Control Info or ReconfigurationWithSync configuration information in the RRCReconfiguration message and define and include an indicator for indicating or configuring the DAPS handover method in the mobility Control Info or ReconfigurationWithSync, thereby indicating that the DAPS handover method has been configured for at least one bearer or a predetermined bearer. In addition, the UE may configure and include a list of bearers for which the DAPS handover methods are configured, and include the identifiers (SRB or DRB) of the bearer, for which the DAPS handover method is configured, in the list of bearers so as to indicate whether the DAPS handover method is configured for each bearer. As another method, the base station may configure and include a list of bearers for which the DAPS handover methods are not configured, and include the identifiers (SRB or DRB) of the bearer, for which the DAPS handover method is not configured, in the list of bearers so as to indicate whether the DAPS handover method is configured for each bearer. In addition, for SRBs, the UE may not introduce a separate indicator for configuring the DAPS handover method. That is, upon receiving the handover command message (RRCReconfiguration message) configured above, when the DAPS handover method is configured for at least one bearer (DRB) or a predetermined bearer (DRB) for each bearer, the UE may apply the SRB processing method for performing the DAPS handover method of this disclosure. The UE, having received the handover command message (RRCReconfiguration message) configured, may perform the DAPS handover method for bearers for which a DAPS handover method is configured according to the configuration, bearers, the identifiers of which are included in the list of bearers for which the DAPS handover methods are configured; or bearers, the identifiers of which are not included in the list of bearers for which the DAPS handover methods are not configured. In addition, the UE may perform a general handover method for bearers for which the DAPS handover method is not configured, bearers, the identifiers of which are not included in the list of bearers for which the DAPS handover methods are configured, or bearers, the identifiers of which are included in the list of bearers for which the DAPS handover methods are not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover (CHO)) and the DAPS handover method is configured for each bearer, the UE may apply the DAPS handover method prior to the type of the other handover methods when performing a handover procedure for each bearer as described above. For example, the UE may perform a DAPS handover method for bearers for which a DAPS handover method is configured according to the configuration, bearers, the identifiers of which are included in the list of bearers for which the DAPS handover methods are configured, or bearers, the identifiers of which are not included in the list of bearers for which the DAPS handover methods are not configured. In addition, the UE may perform, for bearers for which a DAPS handover method is not configured, bearers, the identifiers of which are not included in the list of bearers for which the DAPS handover methods are configured, or bearers, the identifiers of which are included in the list of bearers for which the DAPS handover methods are not configured, the handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured as described above, if an indicator for indicating or configuring a DAPS handover method is included or configured in the mobility Control Info or ReconfigurationWithSync, the UE may apply the RRC layer device, SDAP layer device, MAC layer device, PHY layer device, or SRB processing method, etc. for performing the DAPS handover method of the disclosure. In addition, the UE may apply a method for processing the PDCP layer device, RLC layer device, etc. for performing the DAPS handover method of the disclosure, with respect to bearers for which the DAPS handover method is configured for each bearer, bearers, the identifiers of which are included in the list of bearers for which the DAPS handover methods are configured, or bearers, the identifiers of which are not included in the list of bearers for which the DAPS handover method are not configured.

The disclosure proposes seamless handover methods capable of minimizing a data interruption time due to handover or reducing the same to 0 ms in a next-generation mobile communication system.

The UE configures a plurality of first bearers, and transmits or receives data (uplink or downlink data transmission or reception) to or from a source base station through respective protocol layer devices (PHY layer devices, MAC layer devices, RLC layer devices, or PDCP layer devices) of bearers. However, for convenience of explanation, hereinafter, a description will be made as if the UE includes one bearer in the drawings and description. It goes without saying that the contents, which are described with reference to one bearer below, may be applied to multiple bearers.

Figure 7:
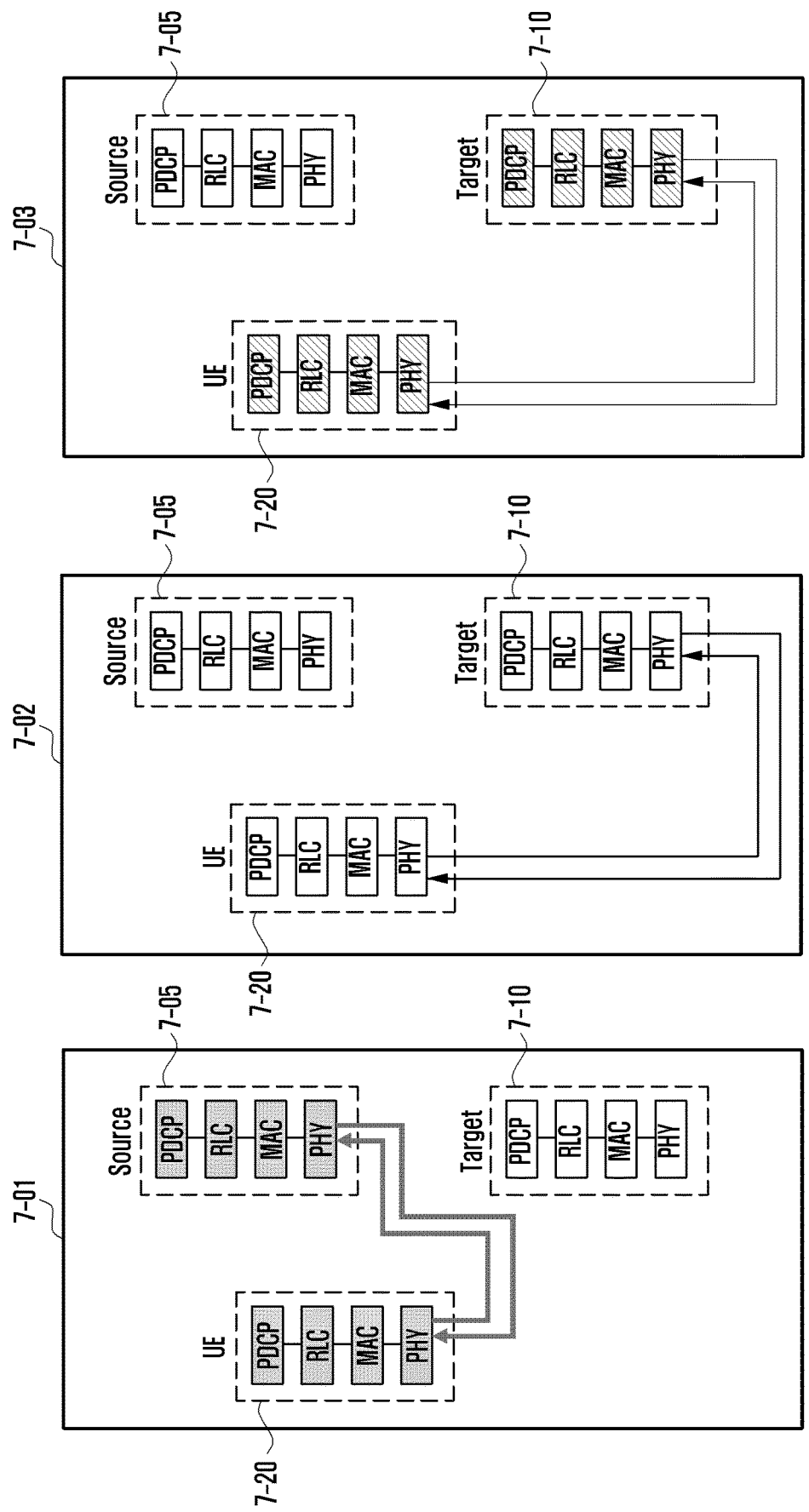
FIG. 7 illustrates specific stages of a first embodiment of an efficient handover method for minimizing a data interruption time due to handover according to an embodiment of the disclosure.

FIG. 7 illustrates specific stages of a first embodiment of an efficient handover method for minimizing a data interruption time due to handover according to an embodiment of the disclosure.

Referring to FIG. 7 according to the first embodiment of the efficient handover method, in a first stage 7-01, if a UE 7-20 receives a handover command message from a source base station 7-05 while transmitting or receiving data to or from the source base station, the UE 7-20 may release the connection with the source base station according to the handover method indicated through the handover command message (for example, RRCReconfiguration message), perform a procedure of random access to a target base station, and perform a handover procedure. As another method, the UE may continue to transmit or receive data to or from the source base station in order to minimize a data interruption time that occurs during handover according to the indicated handover method.

According to the first embodiment of the efficient handover method of FIG. 7, in a second stage 7-02, when the UE 7-20 performs a procedure of random access to a target base station 7-10, transmits a preamble, or initially transmits data to an uplink transmission resource by using a physical uplink control channel (PUCCH) or physical uplink shared channel (PUSCH) transmission resource according to a handover method indicated by the handover command message, the UE 7-20 may stop transmitting or receiving data to or from the source base station (uplink data transmission and downlink data reception).

According to the first embodiment of the efficient handover method of FIG. 7, in a third stage 7-03, the UE 7-20 may complete a procedure of random access to the target base station, may transmit a handover completion message, and may start transmitting or receiving data to or from the target base station (uplink data transmission and downlink data reception).

The first embodiment of the efficient handover method of the disclosure may describe a handover method performed when a DAPS handover method is not configured.

Figure 8:
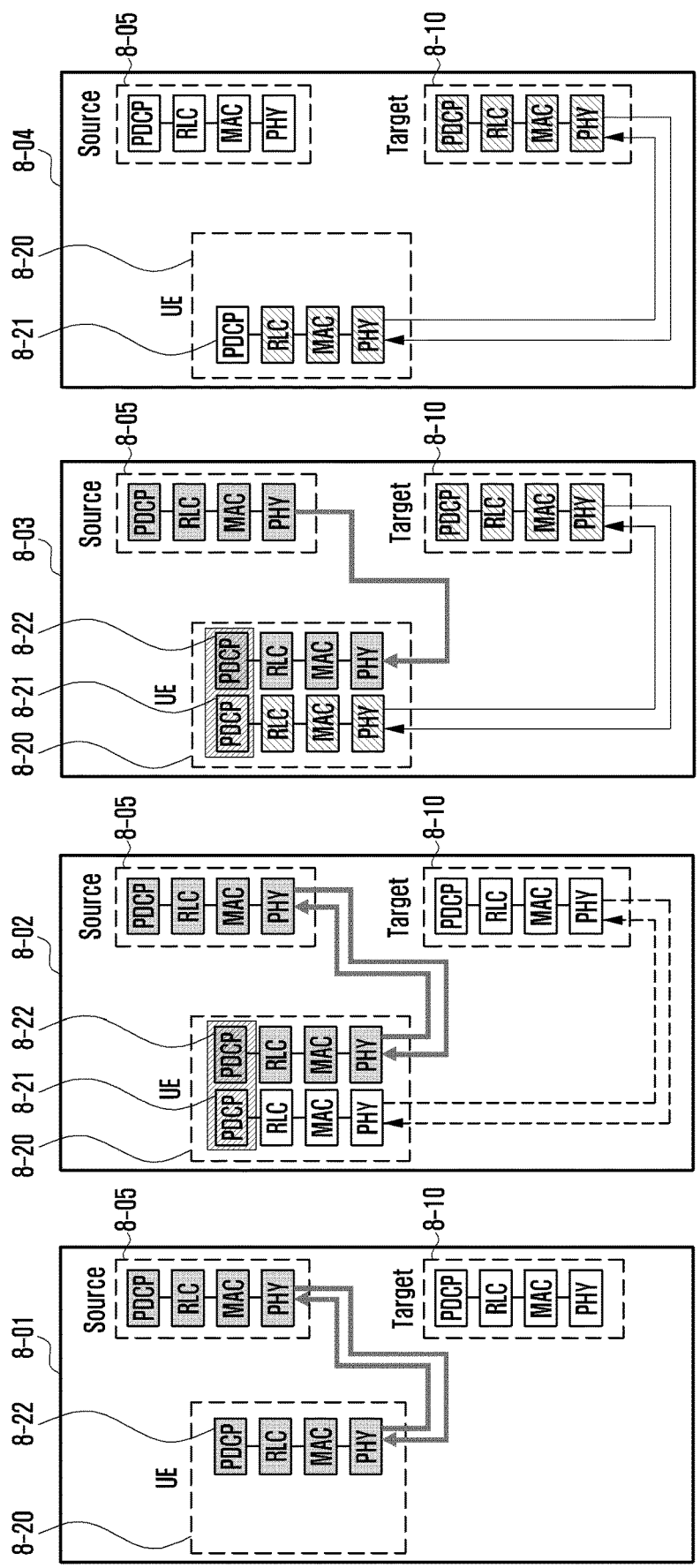
FIG. 8 illustrates specific stages of a second embodiment of an efficient handover method for minimizing a data interruption time due to handover according to an embodiment of the disclosure.

FIG. 8 illustrates specific stages of a second embodiment of an efficient handover method for minimizing a data interruption time due to handover according to an embodiment of the disclosure.

Referring to FIG. 8, according to the second embodiment of the efficient handover method of FIG. 8, in a first stage 8-01, a UE 8-20 may receive a handover command message from a source base station 8-05 while transmitting or receiving data to or from the source base station. If the UE receives the handover command message, in a case where the second embodiment (for example, the DAPS handover method) of the efficient handover method of the disclosure is indicated through the handover command message or indicated for each bearer, the UE may continue to transmit or receive data to or from the source base station through protocol layer devices 8-22 of a first bearer, in order to minimize a data interruption time that occurs during handover, even if the UE has received the handover command message. In addition, when the RRC layer device of the UE identifies the indication for the second embodiment (for example, the DAPS handover method) of the efficient handover method of the disclosure through the handover command message, or identifies an indicator for the DAPS handover method for each bearer, the RRC layer device transmits an indicator to each bearer or a PDCP layer device corresponding to a bearer for which the DAPS handover method is indicated. Then, upon receiving the indicator, the PDCP layer device is switched to the structure of a second PDCP layer device (indicated by reference numeral 9-20) from the structure of a first PDCP layer device (indicted by reference numeral 9-11 or 9-12 of FIGS. 9A and 9B). The first stage may describe a stage in which the UE receives a handover command message (RRCReconfiguration message) from the base station. In addition, when switching to the second PDCP layer device structure, the UE may configure or establish in advance the protocol layer devices (PHY layer devices, MAC layer devices, RLC layer devices, or PDCP layer devices) 8-21 of the second bearer for the target base station 8-10 according to the configuration included in the received handover command message above. In addition, the UE may derive and update the security key for the target base station 8-10, and may configure the header (or data) compression context for the target base station 8-10. In addition, when the handover command message, which is received by the UE, indicates the DAPS handover method of the disclosure or indicates the DAPS handover method for specific bearers, or the PDCP reordering timer value is newly configured, the UE may switch from the structure or function of the first PDCP layer device (indicated by reference numeral 9-11 or 9-12) to the structure or function of the second PDCP layer device (indicated by reference numeral 9-20) of the disclosure, for each bearer or a bearer for which the DAPS handover method is indicated. When performing switching as above, the UE updates a variable for reordering with a PDCP serial number or count value expected to be received next, stops the reordering timer, and restarts the same. In addition, when receiving the handover command message (for example, RRC Reconfiguration message), the RRC layer device of the UE may start a first timer (for example, T304). In addition, the first timer may be interrupted when the procedure of random access to the target base station 9-03 is performed in order to perform handover and the random access procedure is successfully completed (for example, when the first condition described in the disclosure is satisfied). If the handover fails and the first timer expires, the UE performs fallback when the connection to the source base station is valid to report the handover failure to the source base station and attempts connection recovery; and when the connection to the source base station is not valid, the UE may perform an RRC connection re-establishment procedure.

Through the handover command message, the second bearer may be configured and established to have the same bearer identifier as that of the first bearer so that data interruption time does not occur for each bearer. In addition, in the second embodiment, the PDCP layer device of the first bearer and the PDCP layer device of the second bearer may logically operate like one PDCP layer device, and a more detailed operation method will be described in FIGS. 9A and 9B. In addition, in the second embodiment, when the UE enables transmission of the uplink data to both the source base station and the target base station 9-03, there is a need to prevent a coverage reduction problem due to insufficient transmission power of a UE or a problem (i.e., link selection) of requesting transmission resources from a base station and determining transmission of uplink data to a base station when transmitting the uplink data. Accordingly, the uplink data in the second embodiment may be transmitted to only one of the source base station and the target base station 9-03. Specifically, in the second embodiment, if the UE does not have the capability (that is, dual uplink transmission) of simultaneously transmitting uplink data to different base stations at different frequencies or at the same frequency, the uplink data may be transmitted to only one of the source base station and the target base station 9-03, by the UE, in one time unit. Therefore, the UE may request scheduling from only one of the source base station and the target base station 9-03, and may transmit a report of the size of data to be transmitted from the PDCP layer device (e.g., buffer status report (BSR)) to one base station among the source base station and the target base station 9-03 and receive an uplink transmission resource, thereby transmitting the uplink data to only one of the base stations. In addition, even if the UE receives the handover command message from the source base station, the UE does not initialize the MAC layer device of the first bearer in order to prevent data loss by continuing data transmission or reception due to HARQ retransmission. In addition, the RLC layer device, which is in the AM mode, may continuously perform RLC retransmission. As another method, when the second embodiment (DAPS handover method) of the efficient handover method of the disclosure is indicated for each bearer through the handover command message, the UE may continuously transmit or receive data to or from the source base station only for the PDCP layer device, RLC layer device, or MAC layer device corresponding to a bearer or a logical channel identifier for which the second embodiment (DAPS handover method) is indicated through the handover command message, or only for data corresponding to the bearer or logical channel identifier. In addition, even when the first condition described in the disclosure is satisfied (for example, when uplink data transmission is switched to the target base station 9-03), the UE may continuously transmit or receive RLC control data (for example, RLC status report), PDCP control data (ROHC feedback or PDCP status report), or HARQ retransmission to or from the source base station only for the PDCP layer device, RLC layer device, or MAC layer device corresponding to a bearer or a logical channel identifier for which the second embodiment (DAPS handover method) is indicated through the handover command message. In addition, when the second embodiment (DAPS handover method) of the efficient handover method of the disclosure is indicated or has been indicated for each bearer through the handover command message, the UE stops data transmission or reception to or from the source base station for a PDCP layer device, an RLC layer device, or a MAC layer device corresponding to a bearer or logical channel identifier for which the second embodiment (DAPS handover method) is not indicated through the handover command message. In addition, when the UE receives the handover command message, the handover command message indicates the DAPS handover method of the disclosure or indicates the DAPS handover method for specific bearers, the DAPS handover method is configured for at least one bearer, the DAPS handover method is configured for a predetermined bearer, or the QoS flow and bearer mapping information are newly configured, the UE may switch, for each bearer or for a bearer for which the DAPS handover method is indicated, to the structure or function of the second SDAP layer device of the disclosure from the structure or function of the first SDAP layer device. In addition, according to the structure of the second SDAP layer device, the UE maintains the existing first QoS flow and bearer mapping information for the source base station to process uplink data to be transmitted to the source base station and downlink data to be received from the source base station. In addition, the UE configures the second QoS flow and bearer mapping information, newly configured in the handover command message, for the target base station 9-03, and uses the configuration in order to process uplink data to be transmitted to the target base station 9-03 and downlink data to be received from the target base station 9-03. That is, in the structure of the second SDAP layer device of the disclosure, data for the source base station and the target base station 9-03 are classified and processed by maintaining the first QoS flow and bearer mapping information or the second QoS flow and bearer mapping information for the source base station. In the structure of the second SDAP layer device, the SDAP layer device may identify whether data received from a lower layer is data received from the source base station or the target base station 9-03, through a 1-bit indicator of the SDAP header, a 1-bit indicator of the PDCP header, or information indicated by the PDCP layer device. In addition, if the base station instructs the UE to perform the DAPS handover method for each bearer through the handover command message, the UE allows the DAPS handover method to be indicated always for a default bearer (default DRB), and thus when data is generated in a new QoS flow that does not correspond to the bearer mapping information and QoS flow during the DAPS handover procedure, uplink data is always transmitted to the default bearer. If the DAPS handover method is not configured for the default bearer, data interruption time may occur because uplink data transmission in a new QoS flow occurring during handover is impossible. In another method, when the handover command message (for example, RRCReconfiguration message) is received, the second embodiment (DAPS handover method) is indicated, and the SDAP layer device configuration information for the target base station or the second QoS flow and bearer mapping information are configured through the RRC message, the UE may apply the SDAP layer device configuration information or the second QoS flow and bearer mapping information when the first condition described in the disclosure is satisfied. In addition, if the second embodiment (DAPS handover method) is indicated for each bearer through the handover command message, the UE may maintain and apply only the first QoS flow and bearer mapping information corresponding to a bearer for which the second embodiment is indicated when the first QoS flow and bearer mapping information for the source base station are maintained, and may release or not apply the first QoS flow and bearer mapping information corresponding to a bearer for which the second embodiment is not indicated. In addition, the SDAP layer device configuration information for the target base station or the second QoS flow and bearer mapping information are configured through the RRC message, the UE applies the SDAP layer device configuration information or the second QoS flow and bearer mapping information in order to transmit or receive data to or from the target base station when the first condition described in the disclosure is satisfied.

Referring to FIG. 8 according to the second embodiment of the efficient handover method, in a second stage 8-02, even when the UE 8-20 performs a procedure of random access to the target base station 8-20, which is indicated through the handover command message, through the protocol layer devices of the second bearer, the UE 8-20 may continue to transmit or receive data (uplink data transmission or downlink data reception) to or from the source base station through the protocol layer devices of the first bearer. In the second stage, the UE performs a cell selection or reselection procedure, and performs the procedure of random access to a target cell indicated through the handover command message (that is, RRCReconfiguration message) received from the source base station.

According to the second embodiment of the efficient handover method of FIG. 8, when the UE 8-20 satisfies the first condition in a third stage 8-03, the UE 8-20 may stop transmitting uplink data to the source base station through the protocol layer devices 8-22 of the first bearer, for a bearer for which the DAPS handover method is configured, and may transmit the uplink data to the target base station through the protocol layer devices 8-21 of the second bearer. In addition, the UE may continuously receive downlink data from the source base station and the target base station through protocol layer devices of the first bearer and the second bearer. The third stage describes a stage in which the UE satisfies the first condition and switches uplink transmission from the source base station to the target base station. Specifically, the third stage describes a stage in which the UE transmits uplink data to the source base station through the first bearer until the first condition is satisfied, and when the first condition is satisfied, stops transmitting the uplink data to the source base station through the first bearer, and starts transmitting uplink data to the target base station through the second bearer. Specifically, when the PDCP layer device of the second PDCP layer device structure of the disclosure, for the bearers for which the DAPS handover method is configured, satisfies the first condition while transmitting uplink data through the first bearer and receives the indicator from a lower layer device (when the MAC layer device succeeds in a procedure of random access to the target base station) or a higher layer device (when the first timer expires in the RRC layer device), the PDCP layer device may stop and switch transmission of uplink data transmission through the first bearer to thereby start uplink data transmission through the second bearer. In addition, as shown in the structure of the PDCP layer device of FIGS. 9A and 9B, the receiving PDCP layer device 8-21 of the second bearer and the receiving PDCP layer device 8-22 of the first bearer are driven together, and may continuously perform data reception from the source base station or the target base station by using stored transmission or reception data, serial number information, or information such as header compression and decompression context. The first condition may be one of the following conditions. The first condition described in the following is an uplink data transmission switching time in which transmission resources are most efficiently used and data interruption time is minimized.

It may be determined that the first condition is satisfied when the UE successfully completes the procedure of random access to the target base station through the layer devices of the second bearer (for example, the MAC layer device), when the UE successfully completes the procedure of random access to the target base station through the layer devices of the second bearer (for example, the MAC layer device) and receives the first uplink transmission resource assigned from the target base station, or when the uplink transmission resource is first indicated to the UE.

For example, more specifically, when the UE receives a handover command message from the source base station and receives an indication to perform random access to the target base station, if the received random access is a contention free random access procedure (CFRA) (for example, if a pre-designated preamble or UE cell identifier (for example, cell radio network temporary identifier (C-RNTI) is assigned), Since the random access procedure may be considered as being successfully completed when the UE transmits a pre-designated preamble to the cell of the target base station and receives a random access response (RAR) message, it may be determined that the first condition is satisfied when the first uplink transmission resource, which is assigned, included, or indicated through the random access response message, is received. As another method, it may be determined that the first condition is satisfied when an uplink transmission resource is received for the first time after reception of the RAR.

If the UE receives a handover command message from the source base station and receives an indication to perform random access to the target base station, if the commanded random access is a contention-based random access procedure (CBRA) (for example, if a pre-designated preamble or UE cell identifier (e.g., C-RNTI) is not assigned), When the UE transmits a preamble (e.g., a random preamble) to the cell of the target base station, receives a random access response (RAR) message, and transmits message 3 (e.g., a handover complete message) by using the uplink transmission resource allocated, included or indicated through the random access response message, receives an MAC CE (e.g., contention resolution MAC CE) indicating that contention has been resolved through message 4 from the target base station, or receives the uplink transmission resource through the physical downlink control channel (PDCCH) corresponding to the CRNTI of the UE, the UE may identify that the procedure of random access to the target base station has been successfully completed, and thus the UE may monitor the PDCCH and determine that the first condition is satisfied when the uplink transmission resource is received for the first time or when an indication is received for the first time through the PDCCH corresponding to the C-RNTI of the UE. As another method, if the size of the uplink transmission resource allocated through the random access response message is sufficient to transmit message 3 and the UE can additionally transmit uplink data, it may be determined that the uplink transmission resource is received for the first time and that the first condition is satisfied. That is, upon receiving the RAR, it may be determined that the uplink transmission resource is received for the first time and that the first condition is satisfied.

If a handover method that does not require a random access procedure (RACH-less handover) is also indicated through the handover command message received by the UE, If the handover command message includes uplink transmission resources for the target base station, When the UE transmits message 3 (e.g., a handover complete message or an RRCReconfigurationComplete message) to an uplink transmission resource of the target base station, receives a UE identity confirmation MAC CE through message 4 from the base station, or receives the uplink transmission resource through the PDCCH corresponding to the C-RNTI of the UE, it may be determined that the random access procedure has been successfully completed and that the first condition may be satisfied. As another method, it may be determined that the first condition is satisfied when the first uplink transmission resource is received through the PDCCH corresponding to the C-RNTI of the UE by monitoring the PDCCH after the random access procedure is successfully completed.

If the handover command message does not contain uplink transmission resources for the target base station, When the UE receives the uplink transmission resource through the PDCCH corresponding to the C-RNTI of the UE by monitoring the PDCCH for the target base station (or cell), transmits message 3 (e.g., handover completion message or RRCReconfigurationComplete message) to the uplink transmission resource, receives UE identity confirmation MAC CE from the base station, or receives the uplink transmission resource through the PDCCH corresponding to the C-RNTI of the UE, it may be determined that the random access procedure is successfully completed and that the first condition is satisfied. As another method, it may be determined that the first condition is satisfied when the first uplink transmission resource is received through the PDCCH corresponding to the C-RNTI of the UE by monitoring the PDCCH after the random access procedure is successfully completed.

1> When the DAPS handover method is indicated to the UE through a handover command message, and a 2-step random access procedure is configured or indicated through the handover command message (e.g., RRCReconfiguration message), 1> Alternatively, in a case where the 2-step random access procedure is not configured or indicated through the handover command message (for example, RRCReconfiguration message), the UE supports the 2-step random access procedure through the UE capability, supports a 2-step random access procedure through the system information of the target cell, and broadcasts information for the 2-step random access procedure (for example, a random access resource or a threshold value for determining whether or not to perform 2-step random access, etc.) through the system information; or where the UE receives the system information and performs the 2-step random access procedure for the target cell because the signal strength is higher or greater than the threshold value broadcast through the system information, 2> When the 2-step random access procedure is successfully completed, the UE may determine that the first condition is satisfied.

2> The 2-step random access procedure may be specifically performed by using one of a CBRA method and a CFRA method.

3> If the UE performs the CBRA-based 2-step random access procedure in the above, 4> The UE transmits a preamble via transmission resources for 2-step random access (e.g., a transmission resource configured through an RRC message by a PRACH occasion or the base station or a transmission resource broadcast through system information), and data (e.g., MsgA MAC PDU) may be transmitted via transmission resources for data transmission (e.g., a PUSCH occasion). The data may include MAC control information (C-RNTI MAC CE) including a UE identifier (C-RNTI) or an RRC message (RRCReconfigurationComplete message or handover complete message).

4> The UE may monitor the PDCCH scrambled by the UE identifier (C-RNTI) or the first identifier (MsgB-RNTI) derived by the time or frequency at which the preamble has been transmitted.

4> If the UE receives the PDCCH scrambled by the UE identifier, if the PDCCH allocates downlink transmission resources, or if the downlink transmission resource receives MAC control information for time timing adjustment (timing advance command MAC CE), 5> The UE may determine that the 2-step random access procedure has been successfully completed and that the first condition is satisfied.

4> If the UE receives the PDCCH scrambled by the first identifier (MsgB-RNTI), the PDCCH allocates a downlink transmission resource, or the downlink transmission resource receives a fallback random access response to the preamble transmitted by the UE (i.e., when the base station receives the preamble but the base station does not receive MsgA, a fallback RAR for transmitting MsgA to another transmission resource), 5> The UE may transmit data (MsgA MAC PDU) to a transmission resource indicated by the fallback random access response.

5> The UE may monitor the PDCCH scrambled by the UE identifier (C-RNTI).

5> If the UE receives the PDCCH scrambled by the UE identifier or if the PDCCH allocates uplink transmission resources, the UE determines that the 2-step random access procedure has been successfully completed, and may determine that the first condition is satisfied.

3> If the UE performs the CFRA-based 2-step random access procedure in the above, 4> The UE transmits a preamble via a transmission resource for 2-step random access (for example, a transmission resource designated through an RRC message by a PRACH occasion or the base station), and may transmit data (e.g., MsgA MAC PDU) via transmission resources for data transmission (for example, a PUSCH occasion). The data may include MAC control information (C-RNTI MAC CE) including a UE identifier (C-RNTI) or an RRC message (RRCReconfigurationComplete message or handover complete message).

4> The UE may monitor the PDCCH scrambled by the UE identifier (C-RNTI) or the first identifier (MsgB-RNTI) derived by the time or frequency at which the preamble has been transmitted.

4> If the UE receives the PDCCH scrambled by the UE identifier, or the PDCCH allocates downlink transmission resources, or the downlink transmission resource receives MAC control information for time timing adjustment (Timing Advance command MAC CE), 5> The UE may determine that the 2-step random access procedure has been successfully completed and determine that the first condition is satisfied.

4> If the UE receives the PDCCH scrambled by the first identifier (MsgB-RNTI), the PDCCH allocates a downlink transmission resource, or the downlink transmission resource receives a fallback random access response to the preamble transmitted by the UE (i.e., when the base station receives the preamble but the base station does not receive MsgA, a fallback RAR for transmitting MsgA to another transmission resource), 5> The UE may determine that the 2-step random access procedure has been successfully completed and that the first condition is satisfied.

5> The UE may transmit data (MsgA MAC PDU) to a transmission resource indicated through the fallback random access response.

1> As another method, if the DAPS handover method is indicated to the UE through the handover command message, a 2-step random access procedure is configured or indicated through the handover command message (e.g., RRCReconfiguration message), the UE may determine that the first condition is satisfied. For example, in the above case, the UE may determine that the first condition is satisfied before starting the 2-step random access procedure.

1> As another method, if the DAPS handover method is indicated to the UE through the handover command message, a 2-step random access procedure is configured or indicated through the handover command message (e.g., RRCReconfiguration message), if a transmission resource (for example, PUSCH), which is configured for data transmission in the 2-step random access procedure, has a value greater than the first threshold value, or if the timing advance value for time timing adjustment is included in the RRC message, the UE may determine that the first condition is satisfied. The first threshold value may be configured by the base station through the RRC message (for example, RRCReconfiguration), may be broadcast through system information, or may be configured as the size of data to be transmitted from the UE. For example, in the above case, the UE may determine that the first condition is satisfied before starting the 2-step random access procedure. As another method, if a timing advance value for time timing adjustment is included in the RRC message or if a 2-step random access procedure is configured, the UE may directly transmit data via configured transmission resources (e.g., transmission resources configured through the RRC message or transmission resources in which the UE monitors a PDCCH of the target base station and indicated via the PDCCH) without transmitting a preamble. Accordingly, in the above case, the UE may determine that the first condition has been satisfied before starting the 2-step random access procedure or when transmitting or before transmitting the data. As another method, if a timing advance value for time timing adjustment is included in the RRC message, or if a 2-step random access procedure is configured in the RRC message, the UE may directly transmit data via configured transmission resources (e.g., transmission resources configured through the RRC message or transmission resources for which the UE monitors the PDCCH of the target base station and indicated via the PDCCH) without transmitting the preamble. In the above case, if the configured transmission resource (PUSCH) (e.g., transmission resources configured through the RRC message or transmission resources for which the UE monitors the PDCCH of the target base station and indicated via the PDCCH) has a value greater than the first threshold value, or if the timing advance value for time timing adjustment is included in the RRC message, the UE may determine that the first condition is satisfied before starting the 2-step random access procedure or when transmitting or before transmitting the data.

Hereinafter, an efficient method for switching uplink data from a source base station to a target base station in the DAPS handover method of this disclosure is provided. As described above, whether the first condition is satisfied can be identified or detected using one of the following methods in the MAC layer device or the RRC layer device for the target base station corresponding to the second bearer, and the following method can be combined and expanded to a new method.

First method: For example, in the case of indicating DAPS handover through the RRCReconfiguration message received by the UE, the UE configures a MAC layer device for the target base station corresponding to the second bearer, and the MAC layer device may perform a random access procedure and identify whether the first condition is satisfied. In addition, if the first condition is satisfied, the MAC layer device may transmit, to a higher layer device (e.g., a PDCP layer device) of a bearer for which the DAPS handover method is configured, an indicator indicating switching of uplink data transmission to the target base station through the second bearer from the source base station through the first bearer in the DAPS handover method of the disclosure.

Second method: As another method, for example, in the case of indicating DAPS handover through the RRCReconfiguration message received by the UE, the UE configures the MAC layer device for the target base station corresponding to the second bearer, and the MAC layer device may perform a random access procedure and identify whether the first condition is satisfied. In addition, if the first condition is satisfied, the MAC layer device may transmit, to a higher layer device (e.g., RRC layer device), an indication that the first condition has been satisfied. In addition, the higher layer device (e.g., RRC layer device) may transmit, to a lower layer device (e.g., PDCP layer device) of a bearer for which the DAPS handover method is configured, an indicator indicating switching of uplink data transmission to the target base station through the second bearer from the source base station through the first bearer in the DAPS handover method of the disclosure. Since the higher layer device (e.g., the RRC layer device) stops the first timer when the first condition described in the disclosure is satisfied or when the procedure of random access to the target base station is successfully performed, the RRC layer device may indicate the PDCP layer device of the bearer for which the DAPS handover method is configured to switch by using the indicator when the first timer is interrupted.

Third method: For example, in the case of indicating DAPS handover through the RRCReconfiguration message received by the UE, the UE configures a MAC layer device for the target base station corresponding to the second bearer, and if the RRC layer device of the UE transmits an indicator indicating that the RRC layer device performs DAPS handover to a lower layer device (e.g., MAC layer device), the MAC layer device may perform a random access procedure and identify whether the first condition is satisfied. In addition, if the first condition is satisfied, the MAC layer device may transmit, to a higher layer device (e.g., a PDCP layer device) of a bearer for which the DAPS handover method is configured, an indicator indicating switching of uplink data transmission to the target base station through the second bearer from the source base station through the first bearer in the DAPS handover method of the disclosure.

Fourth method: In another method, when DAPS handover is indicated in the RRCReconfiguration message received by the UE, the UE configures a MAC layer device for the target base station corresponding to the second bearer, and if the RRC layer device of the UE transmits an indicator indicating that the RRC layer device performs DAPS handover to a lower layer device (e.g., MAC layer device), the MAC layer device may perform a random access procedure and identify whether the first condition is satisfied. In addition, if the first condition is satisfied, the MAC layer device may transmit, to a higher layer device (e.g., an RRC layer device), an indication that the first condition is satisfied. When identifying the indicator, the higher layer device (e.g., the RRC layer device) stops the first timer when the first condition described in the disclosure is satisfied or when the procedure of random access to the target base station is successfully performed, so that the first timer may be interrupted. In addition, the higher layer device (e.g., the RRC layer device) may transmit, to a lower layer device (e.g., a PDCP layer device) of a bearer for which the DAPS handover method is configured, an indicator indicating switching of uplink data transmission to the target base station through the second bearer from the source base station through the first bearer in the DAPS handover method of the disclosure.

According to the first method, the second method, the third method, or the fourth method, if the PDCP layer device receives, from a higher layer device (e.g., an RRC layer device) or a lower layer device (e.g., a MAC layer device), an indicator indicating that the first condition is satisfied or an indicator to switch uplink data transmission to the target base station from the source base station (for example, when a DAPS handover method is indicated), the PDCP layer device may perform operations of the protocol layer device, described below, in order to effectively perform switching of uplink data transmission, and perform one or more of the following operations so as to prevent data loss due to uplink data transmission. The following operations may be applied to a PDCP layer device connected to an AM DRB or UM DRB (RLC layer device operating in AM mode or RLC layer device operating in UM mode). In the above, if there is data to be transmitted in the buffer before the first condition is satisfied or before an indicator indicating that the first condition is satisfied is received, the PDCP layer device indicates, to the MAC layer device of the first bearer for the source base station, the size or quantity of data to be transmitted (e.g., PDCP data volume) to inform that there is data to be transmitted, and performs uplink data transmission to the source base station. Then, the MAC layer device of the first bearer for the source base station may perform a procedure of scheduling request or buffer status report to the source base station in order to receive allocation of uplink transmission resources. However, when the first condition is satisfied or an indicator indicating that the first condition is satisfied is received, uplink data transmission switching to the target base station for the bearer for which the DAPS handover method is configured is performed as follows.

The uplink or downlink ROHC context for the source base station is not initialized and used as it is, and the uplink or downlink ROHC context for the target base station is initialized and can be started in an initial state (for example, an IR state in U mode).

The PDCP layer device may transmit, to the MAC layer device of the first bearer for the source base station, an indication indicating that the size and the quantity of data to be transmitted is zero (or none) in order to switch the uplink data transmission to the second bearer for the target base station from the first bearer for the source base station. That is, the PDCP layer device may transmit an indication indicating that the data volume of the PDCP layer device is zero to the MAC layer device of the first bearer for the source base station, thereby indicating that there is no more data to be transmitted (even if the data to be transmitted exists actually in the buffer, the indication indicating that there is no data to be transmitted may be transmitted to the MAC layer device of the first bearer for the source base station in order to switch uplink data transmission).

However, as described in the disclosure, when the handover method (DAPS handover method) of the second embodiment of the disclosure is indicated, in the case of a bearer for which the handover method (DAPS handover method) of the second embodiment of the disclosure is indicated, if the first condition is satisfied, or if RLC control data (RLC status report) or PDCP control data (PDCP status report or ROHC feedback) for the source base station is generated, the PDCP layer device of the bearer may indicate, to a MAC layer device for a source base station, a data volume corresponding to RLC control data or PDCP control data, and may perform data transmission to the source base station or an RLC layer device for the source base station. However, as described in the disclosure, when the handover method (DAPS handover method) of the second embodiment of the disclosure is indicated or when the first condition is satisfied for a bearer for which the handover method (DAPS handover method) of the second embodiment of the disclosure is indicated, if RLC control data (RLC status report) or PDCP control data (PDCP status report or ROHC feedback) for the target base station is generated, the PDCP layer device of the bearer may indicate, to a MAC layer device for a target base station, a data volume corresponding to RLC control data or PDCP control data, and may perform data transmission to the target base station or an RLC layer device for the target base station. If the first condition is not satisfied, the PDCP layer device may indicate, to the MAC layer device for the source base station, the generated data (PDCP data PDU or PDCP control PDU) and a data volume corresponding to the data, and may perform data transmission to the source base station or the RLC layer device for the source base station. Therefore, upon receiving an indicator indicating that the first condition has been satisfied in the structure of the second PDCP layer device described for the bearer for which the DAPS handover method is configured, when indicating the data volume to the MAC layer device for the target base station, the second PDCP layer device may indicate, to the MAC layer device for the target base station, PDCP control data, RLC control data, or the data volume excluding the size of the data, which are to be transmitted to the bearer for the source base station or the MAC layer device for the source base station.

The PDCP layer device, which is connected to the AM DRB (RLC layer device operating in the AM mode) (all the previously stored PDCP PDUs are discarded (e.g., the PDCP SDUs are not discarded in order to prevent loss of original data)), may perform a new header compression procedure based on the header context for the target base station for data (PDCP SDUs in the buffer) in ascending order of the count value (or PDCP serial number) allocated before satisfying the first condition from the first data (e.g., PDCP SDU) for which successful transmission from lower layers (e.g., RLC layer device corresponding to the first bearer for the source base station) is not identified or before receiving the indicator indicating that the first condition is satisfied. In addition, the PDCP layer device, which is connected to the AM DRB, may perform the integrity procedure or ciphering procedure again by applying security keys for the target base station, configures the PDCP header, and transmit the PDCP header to the lower layer device (the RLC layer device of the second bearer for the target base station) to perform retransmission or transmission. That is, the PDCP layer device performs cumulative retransmission from the first data that has not been successfully transmitted. As another method, when performing the retransmission above, the PDCP layer device may perform retransmission only for data for which successful transmission from lower layers (e.g., RLC layer devices of the first bearer for the source base station) has not been identified. More specifically, the PDCP layer device, which is connected to the AM DRB (RLC layer device operating in the AM mode) (all the stored PDCP PDUs are discarded in order to transmit the same to the source base station through the first protocol layer device connected to the PDCP layer device (e.g., the PDCP SDUs are not discarded in order to prevent loss of original data)), newly performs a header or data compression procedure for only data (e.g. PDCP SDU) for which successful transmission is not identified from lower layers (e.g., RLC layer devices), which is the first protocol layer device for the source base station, by applying header compression (or data compression) protocol context or security key corresponding to the target base station based on the count value (or PDCP serial number) allocated before the first condition is satisfied or before receiving the indicator indicating that the first condition is satisfied, performs the integrity procedure or ciphering procedure again, configures the PDCP header, and transmits the PDCP header to the lower layer device (the RLC layer device of the second bearer for the target base station) to perform retransmission or transmission. That is, in order to prevent a waste of transmission resources, the PDCP layer device may perform selective retransmission only for data for which successful transmission has not been identified. As another method, the transmission or retransmission operation may be performed by releasing lower layers (e.g., a transmitting or receiving RLC layer device or a MAC layer device), which are first protocol layer devices for transmitting data to a source base station. If the transmission or retransmission procedure is extended to UM DRB, the PDCP layer device, which is connected to the RLC layer device operating in the UM mode, may: regard, as data received from higher layer devices or newly received data, data that has not yet been transmitted to the lower layer device, data for which the PDCP discard timer has not expired, or pieces of data that have already been assigned a PDCP serial number (or count value) to perform header (or data) compression for the pieces of data by using a header (or data) compression context or security key for the target base station without restarting the PDCP discard timer for each data; perform ciphering or integrity protection procedure therefor; generate and conjugate the PDCP header and performs transmission or retransmission thereof; process the data in ascending order of the count values allocated before the procedure is triggered; and perform transmission or retransmission thereof. In addition, the window state variable of the PDCP layer device connected to the UM DRB or AM DRB is not initialized, but is maintained and used as it is.

In the above, if there is data to be transmitted in the buffer, the PDCP layer device indicates, to the MAC layer device of the second bearer for the target base station, the size or quantity of data to be transmitted (e.g., PDCP data volume) to inform that there is data to be transmitted, and performs uplink data transmission switching to the target base station. Then, the MAC layer device of the second bearer for the target base station may perform a procedure of scheduling request or buffer status report to the target base station in order to receive allocation of uplink transmission resources.

For a bearer for which the second embodiment (or DAPS handover method) is indicated (or configured), when the first condition is satisfied, the UE may release configuration information or context for the data compression protocol for the source base station (for example, uplink data compression protocol). Alternatively, when the first condition is satisfied, the higher layer device (e.g., RRC layer device) of the UE may instruct the PDCP layer device to release configuration information or context for the data compression protocol (e.g., uplink data compression protocol) or reconfigure the same. However, for a bearer for which the second embodiment (or DAPS handover method) is not indicated (or configured), when the handover command message is received, the UE may release configuration information or context for a data compression protocol (e.g., uplink data compression (UDC) protocol). Alternatively, when a handover command message is received, the higher layer device (e.g., RRC layer device) of the UE may instruct the PDCP layer device to release configuration information or context for the data compression protocol (e.g., uplink data compression protocol) (for the source base station) or reconfigure the same. This is because, for a bearer for which the DAPS handover method is configured, data needs to be compressed by using the context or configuration information for the data compression protocol for the source base station until the first condition is satisfied and transmitted to the source base station.

When a DAPS handover method is configured for at least one bearer among bearers configured for the UE, or a DAPS handover method is configured for a predetermined bearer, if the first condition is satisfied or if an indicator indicating that the first condition is satisfied is received, the UE may perform one of the following methods for a bearer for which the DAPS handover method is not configured.

First method: If the first condition is satisfied, the higher layer device (for example, RRC layer device) of the UE may trigger or request a PDCP re-establishment procedure for a bearer or bearers for which the DAPS handover method is not configured (even if the target base station configures the PDCP re-establishment procedure for the bearer in the handover command message, the procedure may be performed when the first condition is satisfied). The PDCP layer device, which has received the request for the PDCP re-establishment procedure, may perform different PDCP re-establishment procedures for respective bearers. For example, for UM DRB, the PDCP layer device may initialize the window state variables, and may perform compression, ciphering, or integrity protection of data that has not yet been transmitted to the lower layer device or data for which the PDCP discard timer has not expired, based on the header (or data) compression context or security key of the target base station in ascending order of the count value, to perform transmission or retransmission thereof. In addition, the PDCP layer device may interrupt and initialize a reordering timer if the reordering timer is running, and may sequentially process received data (PDCP SDU or PDCP PDU) and transmit the same to the higher layer device. For AM DRB, the PDCP layer device may not initialize the window state variables, and may perform compression, ciphering, or integrity protection of first data (PDCP SDU or PDCP PDU) that has not been successfully transmitted from the lower layer device, based on the header (or data) compression context or security key of the target base station in ascending order of the count value or the PDCP serial number, to perform transmission or retransmission thereof. The reason for performing the PDCP re-establishment procedure when the first condition is satisfied rather than performing the PDCP re-establishment procedure when the handover command message is received, for the bearer(s) for which the DAPS handover method is not configured, is that if the handover procedure to the target base station fails, the UE may perform fallback to the source base station, wherein, during fallback, in the PDCP re-establishment procedure, pieces of data, which are subjected to compressed based on the header (or data) compression context of the target base station and ciphered or integrity-protected based on the security key of the target base station, become useless and need to be discarded. In addition, when fallback is required, pieces of data, for which PDCP re-establishment procedure is performed again and to be transmitted to the bearers, need to be compressed based on the header (or data) compression context of the source base station, and ciphered or integrity-protected again based on the security key of the source base station. Thus, unnecessary processing occurs. Therefore, when the UE performs the DAPS handover method, for a bearer for which the DAPS handover method is not configured, the PDCP re-establishment procedure is not triggered or performed when the handover command message is received. The target base station may not configure the PDCP re-establishment procedure for the bearers through the handover command message, and when the first condition is satisfied, the target base station may trigger or perform the PDCP re-establishment procedure. In addition, the PDCP re-establishment procedure is not performed for the bearer for which the DAPS handover method is configured.

Second method: When a handover command message is received, the higher layer device (for example, RRC layer device) of the UE may trigger or request a PDCP re-establishment procedure for bearer(s) for which the DAPS handover method is not configured. The PDCP layer device, which has received the request for the PDCP re-establishment procedure, may perform different PDCP re-establishment procedures for respective bearers. For example, for UM DRB, the PDCP layer device may initialize the window state variables, and perform compression, ciphering, or integrity protection of data not yet transmitted to the lower layer device or data for which the PDCP discard timer has not expired, based on the header (or data) compression context or security key of the target base station in ascending order of the count value, to perform transmission or retransmission thereof. In addition, the PDCP layer device may interrupt and initialize a reordering timer if the reordering timer is running, and may sequentially process received data (PDCP SDU or PDCP PDU) and transmit the same to the higher layer device. For AM DRB, the PDCP layer device may not initialize the window state variables, and may perform compression, ciphering, or integrity protection of first data (PDCP SDU or PDCP PDU) that has not been successfully transmitted from the lower layer device, based on the header (or data) compression context or security key of the target base station in ascending order of the count value or the PDCP serial number, to perform transmission or retransmission thereof. When a handover command message is received for the bearer(s) for which the DAPS handover method is not configured, the data is compressed based on the header (or data) compression context of the target base station and is ciphered and integrity-protected based on the security key of the target base station through the PDCP re-establishment procedure. Accordingly, if the UE fails to handover to the target base station (for example, if the first timer expires or wireless connection to the target base station fails), and fallback to the source base station is possible and thus fallback is performed, the base station needs to support the UE to discard pieces of data (e.g., PDCP PDUs), which are generated or processed for transmission to the target base station in the bearers, and to process again the pieces of data (for example, PDCP SDUs) based on the header (or data) compression context or security key for the source base station. Accordingly, the base station may request or indicate such that the higher layer device (e.g., RRC layer device) of the UE reconfigures, for the bearers for which the DAPS handover method is not indicated, an indication of discarding pieces of data (e.g., PDCP PDUs), which are processed based on configuration information (security key or header (or data) compression context) for the target base station, a PDCP re-establishment procedure, or configuration information (security key or header (or data) compression context) for the source base station; and generate or process again the data based on the source base station configuration information.

According to the second embodiment (for example, the DAPS handover method) of the efficient handover method of the disclosure, a UE can continuously receive downlink data from the source base station or the target base station through protocol layer devices of the first bearer for the source base station or the second bearer for the target base station, even after the UE receives a handover command message (for example, an RRCReconfiguration message). In addition, in order to smoothly receive downlink data from the source base station (or target base station) or to smoothly transmit the downlink data by the source base station (or target base station), the UE may allow, with respect to AM bearers, the RLC status report other than data to be continuously transmitted via uplink transmission to the source base station (or target base station) via uplink transmission through protocol layer devices of the first bearer (or second bearer). That is, even if the UE switches uplink data transmission to the target base station by satisfying the first condition as described above, when transmission of RLC status report, HARQ ACK, NACK, or PDCP control data (PDCP ROHC feedback or PDCP status report) to the source base station is required, data transmission may be allowed to be transmitted through a first bearer for the source base station. This is because, in the case of AM bearers, after transmitting data to the transmitting terminal, if successful transmission of the RLC status report is not indicated (i.e., if the RLC status report is not received), data cannot be continuously transmitted thereafter. Specifically, in the second embodiment of the efficient handover method of FIG. 8, even if the UE 8-20 stops transmission of uplink data to the source base station through the protocol layer devices 8-22 of the first bearer and switches to start transmission of uplink data to the target base station through the protocol layer devices 8-21 of the second bearer because the first condition is satisfied in a third stage 8-03, the UE may enable continuous transmission of HARQ ACK or HARQ NACK information, RLC status report (ACK or NACK information), or PDCP control data (for example, PDCP status report or ROHC feedback information) through the protocol layer devices of the first bearer (or the second bearer) so as to smoothly receive downlink data from the source base station (or target base station) or to enable the source base station (or target base station) to smoothly transmit downlink data. In addition, in the second embodiment of the efficient handover method of FIG. 8, even if the UE 8-20 stops transmission of uplink data to the source base station through the protocol layer devices 8-22 of the first bearer and switches to start transmission of uplink data to the target base station through the protocol layer devices 8-21 of the second bearer because the first condition is satisfied in the third stage 8-03, the UE may continuously perform data transmission due to HARQ retransmission of the MAC layer device or data transmission due to retransmission of RLC layer device in the AM mode in order to prevent data loss to the source base station. In the above, in the second embodiment of the efficient handover method of FIG. 8, if the UE 8-20 stops transmission of uplink data to the source base station through the protocol layer devices 8-22 of the first bearer and switches to start transmission of uplink data to the target base station through the protocol layer devices 8-21 of the second bearer because the first condition is satisfied in the third stage 8-03, the source base station or the target base station may divide time and accordingly allocate transmission resources to the UE so that the uplink transmission resource for the target base station and the uplink transmission resource for the source base station do not collide. If the uplink transmission resource for the target base station and the uplink transmission resource for the source base station collide and overlap, the UE may prioritize the uplink transmission resource for the source base station and perform data transmission to the source base station in order to maintain the downlink data transmission from the source base station or continuously receive the uplink transmission resource from the source base station without problems. As another method, if the uplink transmission resource for the target base station and the uplink transmission resource for the source base station collide and overlap, the UE may prioritize the uplink transmission resource for the target base station and perform data transmission to the target base station in order to maintain the downlink data transmission from the target base station.

Specifically, when a handover (for example, a DAPS handover) corresponding to the second embodiment of the disclosure is indicated when the UE receives a handover command message, or when the handover is indicated for each bearer, the UE or the bearer for which the DAPS handover is indicated may perform a scheduling request through the first protocol layer device and transmit a buffer status report to the source base station, before the first condition is satisfied, to receive uplink transmission resources and transmit uplink data, and receive downlink data from the source base station. However, if the first condition is satisfied, the UE no longer transmits data to the source base station and switches the uplink to perform a scheduling request through the second protocol layer device, and may transmit a buffer status report to the target base station, receive uplink transmission resources, and transmit uplink data to the target base station. However, the UE may continuously receive downlink data from the source base station, and even after uplink transmission switching, may continuously transmit HARQ ACK, HARQ NACK, RLC status report, or PDCP control data (e.g., PDCP status report or ROHC feedback information) corresponding to the downlink data. In addition, even if the first condition is satisfied, the UE may continue to receive downlink data from the source base station or the target base station.

In the second embodiment of the efficient handover method of FIG. 8, in fourth state 8-04, if the UE 8-20 satisfies the second condition, the UE may stop reception of downlink data from the source base station 8-05 through the protocol layer devices 8-22 of the first bearer or release a connection to the source base station. The second condition may be one of the following conditions. In addition, the PDCP layer device 8-21 of the second bearer may continuously perform data transmission or reception to or from the target base station by using transmission or reception data, serial number information, or information such as header compression and decompression context, stored in the PDCP layer device 8-22 of the first bearer.

When the UE performs a procedure of random access to the target base station through the layer devices 8-21 of the second bearer and receives a random access response, it may be determined that the second condition is satisfied.

When the UE performs a procedure of random access to the target base station through the layer devices of the second bearer, receives a random access response, configures and transmits a handover completion message to the target base station, it may be determined that the second condition is satisfied.

When the UE completes a procedure of random access to the target base station through the layer devices of the second bearer and transmits data for the first time to the PUCCH or PUSCH uplink transmission resource, or when the PUCCH or PUSCH uplink transmission resource is initially received, it may be determined that the second condition is satisfied.

The base station may set a separate timer for the UE through an RRC message, and when the timer expires, it may be determined that the second condition is satisfied.

The timer may be started when the UE has received a handover command message from the source base station, starts random access to the target base station (when the UE transmits a preamble), receives a random access response from the target base station, transmits a handover completion message to the target base station, or initially transmits data to a PUCCH or PUSCH uplink transmission resource.

When the UE performs a procedure of random access to the target base station through the layer devices of the second bearer, receives a random access response, and configures and transmits a handover completion message to the target base station, and then successful transmission of the handover completion message is identified by the MAC layer device (HARQ ACK) or the RLC layer device (RLC ACK), it may be determined that the second condition has been satisfied.

When the UE performs a procedure of random access to the target base station through the layer devices of the second bearer, receives a random access response, and configures and transmits a handover completion message to the target base station, and then initially receives an allocation of the uplink transmission resource from the target base station or initially receives an indication of the uplink transmission resource, it may be determined that the second condition has been satisfied.

When the source base station performs the efficient handover of the disclosure, there may be determined a time when downlink data transmission to the UE is stopped or a time when the connection with the UE is released. For example, the time may be determined by using a predetermined method (e.g., when a predetermined timer expires (the timer may be started after performing a handover indication) or when an indication indicating that the UE has successfully performed a handover to the target base station is received, from the target base station, by the source base station). In addition, if the downlink data is not received from the source base station for a predetermined period of time, the UE may determine that the second condition is satisfied, and may determine that the connection with the source base station is released and release the connection.

When the UE receives an indicator (for example, an RRC message (for example, RRCReconfiguration message) indicating to release the connection with the source base station from the target base station, a MAC CE, RLC control PDU, or PDCP control PDU, it may be determined that the second condition is satisfied.

If the UE does not receive downlink data from the source base station for a predetermined time, it may be determined that the second condition is satisfied.

When the UE successfully completes the procedure of random access to the target base station through the layer devices (for example, the MAC layer device) of the second bearer or the UE successfully completes the procedure of random access to the target base station through the layer devices of the second bearer and receives an allocation of the first uplink transmission resource from the target base station or when the uplink transmission resource is first indicated to the UE, it may be determined that the second condition is satisfied.

For example, more specifically, when the UE receives a handover command message from the source base station and receives an indication to perform random access to the target base station, if the received random access is a CFRA (for example, if a pre-designated preamble or UE cell identifier (for example, C-RNTI) is assigned), Since the random access procedure may be determined as being successfully completed when the UE transmits a pre-designated preamble to the cell of the target base station and receives a random access response (RAR) message, when the first uplink transmission resource, which is assigned, included, or indicated through the random access response message, is received, it may be determined that the second condition is satisfied. As another method, it may be determined that the second condition is satisfied when an uplink transmission resource is received for the first time after reception of the RAR.

If the UE receives a handover command message from the source base station and receives an indication to perform random access to the target base station, if the commanded random access is a CBRA (for example, if a pre-designated preamble or UE cell identifier (e.g., C-RNTI) is not assigned), when the UE transmits a preamble (e.g., a random preamble) to the cell of the target base station, receives a random access response (RAR) message, transmits message 3 (e.g., a handover complete message) by using the uplink transmission resource allocated, included or indicated through the random access response message, receives a contention resolution MAC CE indicating that contention has been resolved through message 4 from the target base station, or receives the uplink transmission resource through the PDCCH corresponding to the RNTI, the UE may identify that the procedure of random access to the target base station has been successfully completed. Accordingly, it is determined that the second condition is satisfied when the UE monitors the PDCCH and thus receives the uplink transmission resource for the first time through the PDCCH corresponding to the C-RNTI of the UE or receives an indication thereof. As another method, if the size of the uplink transmission resource allocated through the random access response message is sufficient to transmit message 3 and the UE can additionally transmit uplink data, it may be determined that the uplink transmission resource is received for the first time and that the second condition is satisfied. That is, when RAR is received, it may be determined that the uplink transmission resource is received for the first time and that the second condition is satisfied.

If a handover method that does not require a random access procedure (RACH-less handover) is also indicated through the handover command message received by the UE, If the handover command message includes uplink transmission resources for the target base station, When the UE transmits message 3 (e.g., a handover complete message or an RRCReconfigurationComplete message) to an uplink transmission resource of the target base station, receives a UE identity confirmation MAC CE through message 4 from the base station, or receives the uplink transmission resource through the PDCCH corresponding to the C-RNTI of the UE, it may be determined that the random access procedure has been successfully completed and that the second condition may be satisfied. As another method, it may be determined that the second condition is satisfied when the first uplink transmission resource is received through the PDCCH corresponding to the C-RNTI of the UE by monitoring the PDCCH after the random access procedure is successfully completed.

If the handover command message does not contain uplink transmission resources for the target base station, It may be determined that the random access procedure is successfully completed and that the second condition is satisfied when the UE receives the uplink transmission resource through the PDCCH corresponding to the C-RNTI of the UE by monitoring the PDCCH for the target base station (or cell), transmits message 3 (e. g., handover completion message or RRCReconfigurationComplete message) to the uplink transmission resource, receives UE identity confirmation MAC CE from the base station, or receives the uplink transmission resource through the PDCCH corresponding to the C-RNTI of the UE. As another method, it may be determined that the second condition is satisfied when the first uplink transmission resource is received through the PDCCH corresponding to the C-RNTI of the UE by monitoring the PDCCH after the random access procedure is successfully completed.

In the above, when the UE performs the second embodiment (for example, the DAPS handover method) of the efficient handover method of the disclosure, if it is identified that the RRC layer device, the MAC layer device, or the RLC layer device of the first bearer for the source base station of the UE, or the RRC layer device, the MAC layer device, or the RLC layer device of the second bearer for the target base station satisfy a second condition described in the disclosure, the higher layer or lower layer device may transmit an indicator indicating that the second condition is satisfied to the PDCP layer device of the UE or bearer for performing the DAPS handover method. If the PDCP layer device of the UE receives an indicator indicating that the second condition is satisfied from a lower layer device or a higher layer device, or if the second condition is satisfied, one or more of the procedures, which will be described in the following, may be performed for the bearer or the UE for which the DAPS handover method is configured, to successfully complete the second embodiment of the efficient handover method of the disclosure.

The UE may release the first bearer for the source base station and release the connection with the source base station. In addition, before releasing the first bearer for the source base station, the UE may perform an RLC re-establishment procedure for an RLC layer device corresponding to the first bearer for the source base station (for example, if the reordering timer is running, the timer is paused or initialized, and if the received data is stored in the buffer, the stored data may be processed and transmitted to the higher layer device, and if the data to be transmitted is in the buffer, data may be discarded) or the MAC layer device may be initialized.

When the UE disconnects from the source base station, the UE may trigger a PDCP status reporting procedure and configure a PDCP status report to transmit the PDCP status report to the target base station, in order to report the reception status of downlink data, received from the source base station, to the target base station.

If the second condition is satisfied, the UE may switch the structure or function of the second PDCP layer device (indicated by reference numeral 9-20 of FIGS. 9A and 9B) to the structure or function of the first PDCP layer device (indicated by reference numeral 9-11 or 9-12) of the disclosure for each bearer or for a bearer for which the DAPS handover method is indicated, may initialize variables for realignment, and may interrupt and initialize a reordering timer. In addition, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In addition, the UE may transmit the processed data to the higher layer in ascending order. That is, in the above case, when the second condition is satisfied, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In another method, if the second condition is satisfied, the UE may switch the structure or function of the second PDCP layer device (indicated by reference numeral 9-20) to the structure or function of the third PDCP layer device (indicated by reference numeral 9-30) of the disclosure for each bearer or for a bearer for which the DAPS handover method is indicated, and may use variables for realignment and a reordering timer as they are without stopping and initializing. However, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In addition, the UE may transmit the processed data to the higher layer in ascending order. That is, in the above case, when the second condition is satisfied, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In the above, the UE may release QoS mapping information of the SDAP layer device for the source base station, the security key information for the source base station of the PDCP layer device, the header (or data) compression context information for the source base station, or the RLC layer device or MAC layer device for the source base station. In the above, switching the structure or function of the second PDCP layer device (indicated by reference numeral 9-20) to the structure or function of the first PDCP layer device of the disclosure for each bearer or for a bearer for which the DAPS handover method is indicated may denote that the PDCP layer device is reconfigured, and may be performed when a reconfiguration indicator of the PDCP layer device is received from a higher layer device (e.g., an RRC layer device). For example, the UE receives the handover command message and the higher layer device (for example, the RRC layer device) transmits the PDCP layer device reconfiguration indicator to the PDCP layer device of the bearer for the bearer for which the DAPS handover method is configured, and thus the structure or function of the first PDCP layer device may be reconfigured to the structure or function of the second PDCP layer device. In addition, if the second condition is satisfied, the higher layer device (e.g., RRC layer device) may transmit the PDCP layer device reconfiguration indicator to the PDCP layer device of the bearer to reconfigure the structure or function of the second PDCP layer device to be the structure or function of the first PDCP layer device. For example, whenever the PDCP layer device reconfiguration indicator is received from a higher layer device (for example, an RRC layer device) by using a toggle scheme, the PDCP layer device of the bearer may reconfigure the structure or function of the first PDCP layer device to be the structure or function of the second PDCP layer device, or may reconfigure the structure or function of the second PDCP layer device to be the structure or function of the first PDCP layer device.

When the second condition described in this disclosure is satisfied while performing the DAPS handover method of the disclosure, the UE may release the first bearers for the source base station and switch the structure and function of the second SDAP layer device, which is being applied to each bearer or a bearer for which the DAPS handover method is indicated, to the structure and function of the first SDAP layer device and apply the same. In addition, if the second condition is satisfied, the UE may switch the structure or function of the second PDCP layer device to the structure or function of the first PDCP layer device of the disclosure for each bearer or for a bearer for which the DAPS handover method is indicated, and may maintain mapping information between second a QoS flow and a bearer and a second bearer for the target base station. In addition, the UE may release mapping information of a first QoS flow and a bearer or a first bearer for the source base station after completing data processing by applying the mapping information of the first QoS flow and a bearer to pieces of data received from the source base station (for example, all pieces of data received from the source base station) before releasing the mapping information of the first QoS flow and a bearer or the first bearer for the source base station. In addition, the UE may transmit the processed data to a higher layer in ascending order. That is, in the above, when the second condition is satisfied, the UE may process pieces of data stored in the buffer (for example, all pieces of data received from the source base station) by applying the mapping information of the first QoS flow and a bearer for the source base station (e.g., a procedure of reading SDAP header information and updating mapping information, configuring SDAP header, or routing or transmitting to a suitable higher layer device or lower layer device based on the mapping information of the first QoS flow and a bearer), and then may discard the mapping information of the first QoS flow and bearer for the source base station. In the above, the SDAP layer device may define and apply a 1-bit indicator of a new SDAP header, a 1-bit indicator of a PDCP header, SDAP control data (for example, a downlink end marker), or information indicated by a PDCP layer device, and may identify last data received from the source base station based on the defined information. Therefore, after performing data processing by applying the mapping information of the first QoS flow and the bearer for the source base station to the last data received from the source base station, the UE may discard the mapping information between the first QoS flow and the bearer for the source base station. In addition, in the above, the SDAP layer device may continuously maintain the mapping information between the second QoS flow and the bearer and process uplink data or downlink data transmission to the target base station based on the mapping information.

The UE may initialize the MAC layer device for the source base station, and may perform an RLC layer device re-establishment procedure or a release procedure for the RLC layer device for the source base station in the second PDCP layer device structure when converting the second PDCP layer device structure of the bearer for which the DAPS handover method is configured to the first PDCP layer device structure.

In the disclosure, when the second condition is satisfied or an indicator indicating that the second condition is satisfied has been received from a higher layer device (e.g., an RRC layer device) or a lower layer device (e.g., a MAC layer device), the procedure for re-establishing or releasing the RLC layer device of the first bearer for the source base station by the UE may follow one of the following methods in detail.

First method: If an RLC layer device of a first bearer for the source base station is an LTE RLC layer device for a bearer for which the DAPS handover method is configured in the above, a higher layer device (for example, an RRC layer device) may instruct the LTE RLC layer device to perform a re-establishment procedure. Specifically, if the reordering timer is running, the LTE RLC layer device may stop or initialize the timer, and if there is stored data, the LTE RLC layer device may process the stored data and transmit the processed data to a higher layer device, to reduce transmission delay due to the reordering timer. In addition, the RLC layer device may initialize variables and discard pieces of data for transmission. Then, the higher layer device (e.g., the RRC layer device) may indicate to release the LTE RLC layer device. However, if the RLC layer device of the first bearer for the source base station is an NR RLC layer device, the higher layer device (e.g., the RRC layer device) may indicate to release the NR RLC layer device directly without re-establishing the same. This is because the NR RLC layer device always performs out-of-sequence transmission and thus there is no stored data, and even if there is stored data, the data is divided data and thus there is no problem even if it is discarded as it is. Different procedures may be applied according to an RLC layer device configured for each bearer as described above.

Second method: If an RLC layer device of a first bearer for the source base station is an LTE RLC layer device for a bearer for which the DAPS handover method is configured in the above, a higher layer device (for example, an RRC layer device) may instruct the LTE RLC layer device to perform a re-establishment procedure. Specifically, if the reordering timer is running, the LTE RLC layer device may stop or initialize the timer, and if there is stored data, the LTE RLC layer device may process the stored data and transmit the processed data to a higher layer device, to reduce transmission delay due to the reordering timer. Alternatively, the higher layer device (e.g., the RRC layer device) may release the LTE RLC layer device. However, if the RLC layer device of the first bearer for the source base station is an NR RLC layer device, the higher layer device (e.g., the RRC layer device) may indicate to release the NR RLC layer device directly without re-establishing the same. This is because the NR RLC layer device always performs out-of-sequence transmission and thus there is no stored data, and even if there is stored data, the data is divided data and thus there is no problem even if it is discarded as it is. Different procedures may be applied according to an RLC layer device configured for each bearer as described above.

Third method: If an RLC layer device of a first bearer for the source base station is an LTE RLC layer device for a bearer for which the DAPS handover method is configured in the above, a target base station may, when transmitting an RRC message (e.g., RRCReconfiguration) including an indicator to release the connection with the source base station or the first bearer for the base station to the UE, include an indicator (e.g., reestablishRLC) indicating re-establishment of the LTE RLC layer device in configuration information (e.g., RLC-config) of the LTE RLC layer device for the bearer in the RRC message and transmit the same (or may include an indicator to release the LTE RLC layer device). Therefore, upon receiving an indication to release the connection with the source base station or satisfying the second condition, the higher layer device (for example, the RRC layer device) may read the RRC message, and may indicate to perform a re-establishment procedure for the LTE RLC layer device according to the indication of the LTE RLC re-establishment procedure (or release). Specifically, if the reordering timer is running, the LTE RLC layer device may stop or initialize the timer, and if there is stored data, the LTE RLC layer device may process the stored data and transmit the processed data to a higher layer device, to reduce transmission delay due to the reordering timer. In addition, the LTE RLC layer device may initialize variables and discard pieces of data for transmission. Then, the higher layer device (for example, the RRC layer device) may release the LTE RLC layer device. If an RLC layer device of a first bearer for the source base station is an LTE RLC layer device for a bearer for which the DAPS handover method is configured in the above, the target base station may, when transmitting an RRC message (e.g., RRCReconfiguration) including an indicator to release the connection with the source base station or the first bearer for the source base station to the UE, include an indicator indicating release of the NR RLC layer device in configuration information (e.g., RLC-config) of the NR RLC layer device for the bearer in the RRC message and transmit the same. As described above, the target base station may indicate different procedures according to an RLC layer device configured for each bearer through the RRC message, and accordingly, the UE may apply a procedure to each bearer.

Fourth method: If an RLC layer device of a first bearer for the source base station is an LTE RLC layer device for a bearer for which the DAPS handover method is configured in the above, a target base station may, when transmitting an RRC message (e.g., RRCReconfiguration) including an indicator to release the connection with the source base station or the first bearer for the base station to the UE, include an indicator (e.g., reestablishRLC) indicating re-establishment of the LTE RLC layer device in configuration information (e.g., RLC-config) of the LTE RLC layer device for the bearer in the RRC message and transmit the same (or may include an indicator to release the LTE RLC layer device). Therefore, upon receiving an indication to release the connection with the source base station or satisfying the second condition, the higher layer device (for example, the RRC layer device) may read the RRC message, and may indicate to perform a re-establishment procedure for the LTE RLC layer device according to the indication of the LTE RLC re-establishment procedure (or release). Specifically, if the reordering timer is running, the LTE RLC layer device may stop or initialize the timer, and if there is stored data, the LTE RLC layer device may process the stored data and transmit the processed data to a higher layer device, to reduce transmission delay due to the reordering timer. In addition, the RLC layer device may initialize variables and discard pieces of data for transmission. Alternatively, the higher layer device (e.g., the RRC layer device) may release the LTE RLC layer device. If an RLC layer device of a first bearer for the source base station is an NR RLC layer device for a bearer for which the DAPS handover method is configured in the above, the target base station may, when transmitting an RRC message (e.g., RRCReconfiguration) including an indicator to release the connection with the source base station or the first bearer for the source base station to the UE, include an indicator indicating release of the NR RLC layer device for the bearer or re-establishment of the NR RLC layer device in the RRC message and transmit the same. As described above, the target base station may indicate different procedures according to an RLC layer device configured for each bearer through the RRC message, and accordingly, the UE may apply a procedure to each bearer.

The receiving PDCP layer device may process or store the data received due to the re-establishment procedure of the lower layer device (e.g., RLC layer device), and for UM DRBs, a header decompression procedure may be performed on the stored data (received from the source base station) or all stored data, based on header compression context (ROHC or Ethernet header compression (EHC)) (for the source base station).

The receiving PDCP layer device may process or store the data received due to the re-establishment procedure of the lower layer device (e.g., RLC layer device), and for AM DRBs, a header decompression procedure may be performed on the stored data (received from the source base station) or all stored data, based on header compression context (ROHC or Ethernet header compression (EHC)) (for the source base station).

As another method, the receiving PDCP layer device may process or store the data received due to the re-establishment procedure of the lower layer device (e.g., the RLC layer device), and for UM DRBs or AM DRBs, if an indicator (drb-Continue ROHC or drb-Continue Ethernet header compression (EHC)) indicating that continued use of the header compression context is not configured, a header decompression procedure may be performed on the stored data (received from the source base station) or all stored data, based on header compression context (ROHC or Ethernet header compression (EHC)).

After performing the above procedure, the transmitting or receiving PDCP layer device may discard or release the security key or header compression contexts for the source base station.

Referring to FIG. 6 of the disclosure, when transmitting a handover command message (indicated by reference numeral 6-20) to the UE, the base station may define indicators for the embodiments of the disclosure in the handover command message (e.g., RRCReconfiguration message), and may indicate, to the UE, whether to trigger a handover procedure corresponding to an embodiment. In addition, the UE may perform a handover procedure according to a handover method indicated through the handover command message, and, for example, the UE may perform the second embodiment of the efficient handover method (DAPS handover method) of the disclosure, so as to perform a handover to a target base station while minimizing a data interruption time. As another method, the base station may define an indicator, for the embodiments of the disclosure, for each bearer, through the handover command message, and may more specifically indicate a bearer to which an embodiment is applied during a handover. For example, the base station may indicate to apply the second embodiment of the disclosure to an AM bearer only in which an RLC layer device operating in the AM mode operates, or an indication may be extended and applied to a UM bearer in which an RLC layer device operating in the UM mode operates. In addition, it is assumed that the embodiments of the disclosure are applied to DRB. However, if necessary (for example, in a case where the UE maintains the SRB for the source base station and fails to handover to the target base station, and thus may report or restore the handover failure message to the SRB for the source base station), the embodiments of the disclosure may be extended and applied to the SRB.

In the embodiments of the disclosure, when a UE performs data transmission or reception to or from a source base station through protocol layer devices of a first bearer, and performs data transmission or reception to or from a target base station through protocol layer devices of a second bearer, the MAC layer device of the first bearer and the MAC layer device of the second bearer operate a separate discontinuous reception (DRX) cycle to reduce battery consumption of the UE. That is, the UE may continuously apply the DRX cycle of the MAC layer device, applied when transmitting or receiving data through the protocol layer devices of the first bearer, even after receiving the handover command message, and may stop the DRX cycle according to the first condition or the second condition of the disclosure. In addition, the UE may separately apply the DRX cycle to the MAC layer device of the second bearer according to the instruction of the target base station.

In addition, in the disclosure, the UE stops uplink transmission to the source base station through the protocol layer devices of the first bearer and stops receiving downlink data from the source base station, and denotes that the UE re-establishes, initializes, or releases protocol layer devices of the first bearer (PHY layer device, MAC layer device, RLC layer device, or PDCP layer device).

In the embodiments of the disclosure, for convenience of description, it has been described that the UE is configured with a first bearer for the source base station or a second bearer for the target base station, and it may be easily extended and applied equally to a case in which the UE is configured with a plurality of first bearers for the source base station or a plurality of second bearers for the target base station. As another method, it may be easily extended and applied equally to a case in which a plurality of bearers for a plurality of target base stations are configured. For example, the UE may perform a procedure of handover to a first target base station and configure the second bearers. If handover fails, the UE may perform a procedure of handover to a second target base station and configure the second bearers, and thus the UE may search for and determine a cell satisfying a predetermined condition (e.g., having a value equal to or greater than a predetermined signal strength) among a plurality of target base stations by itself, and may determine one cell to perform a handover procedure.

Figure 9A:
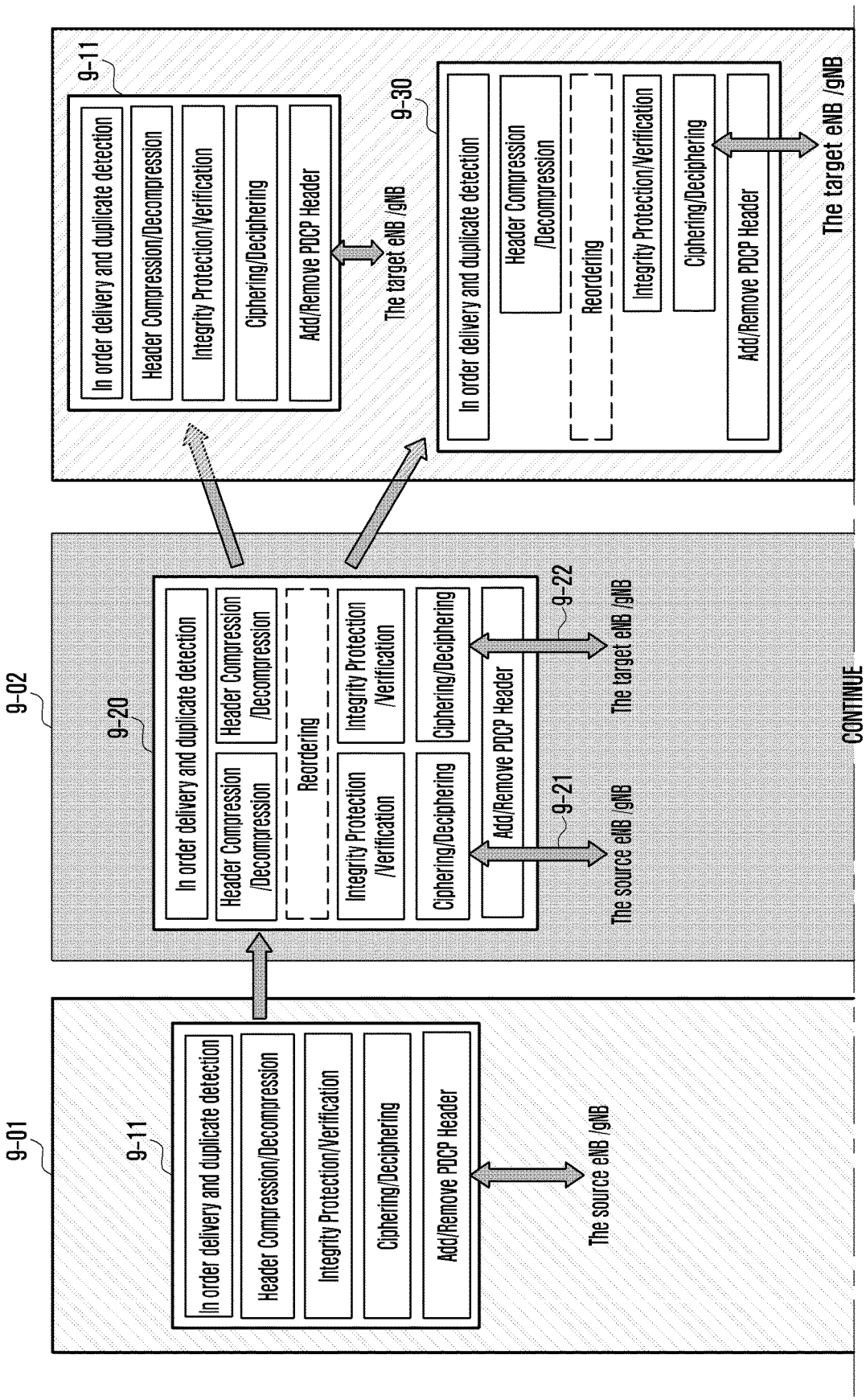
FIGS. 9A and 9B illustrate the structures of an efficient packet data convergence protocol (PDCP) layer device applied in a dual active protocol stack (DAPS) handover method, which is a second embodiment of an efficient handover method and a method for applying the structures according to various embodiments of the disclosure.
Figure 9B:
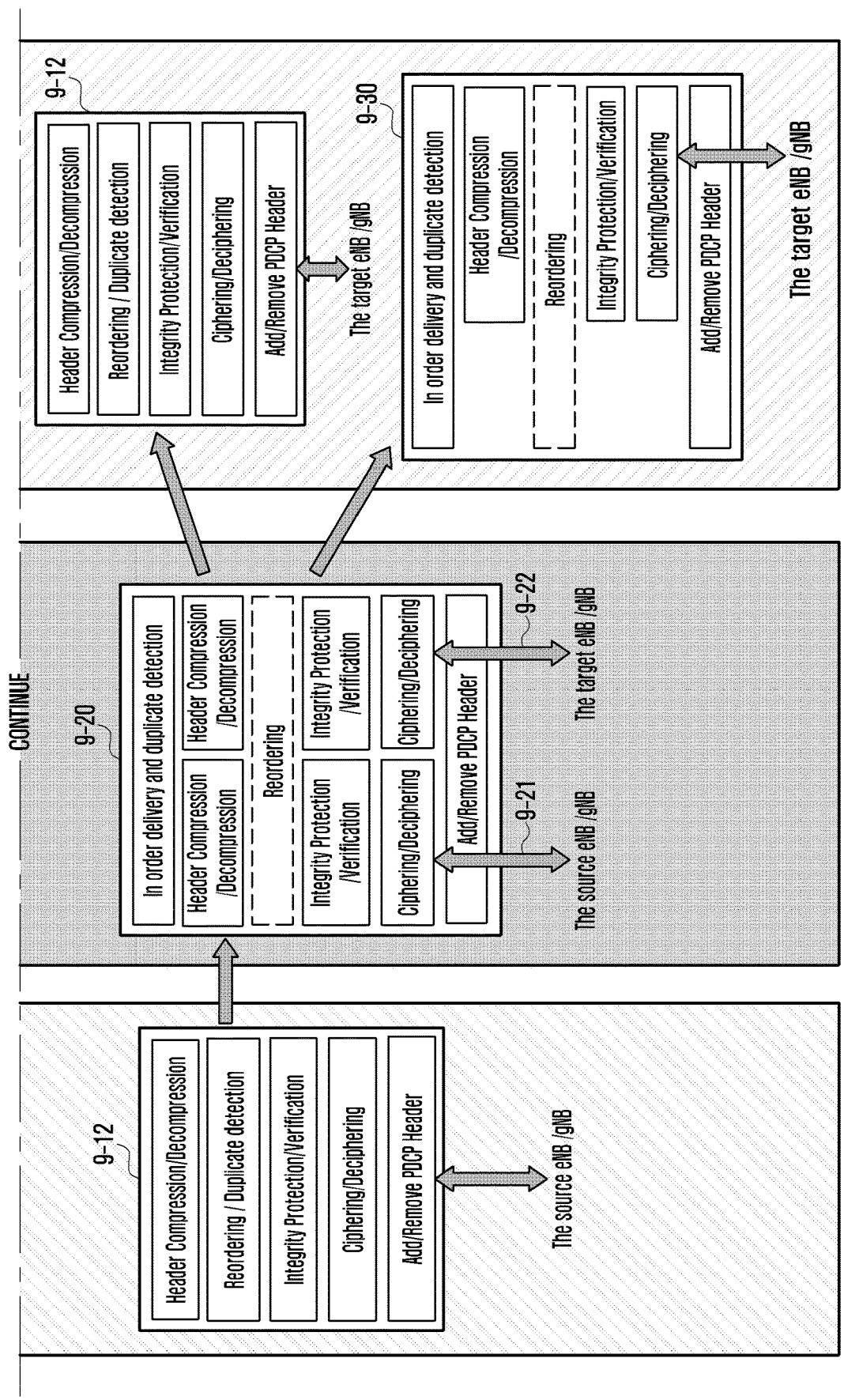

FIGS. 9A and 9B, they illustrate the structures of an efficient PDCP layer device applied in a DAPS handover method, which is a second embodiment of an efficient handover method and a method of applying the structures according to various embodiments of the disclosure.

Referring to FIGS. 9A and 9B, they propose detailed the structures and functions of an efficient PDCP layer device applied in a DAPS handover method, which is a second embodiment of an efficient handover method of the disclosure, and may apply different structures of the PDCP layer device of the following to each bearer at different time points while performing the DAPS handover procedure.

For example, before receiving the handover command message from the base station, the UE may process data by applying the structure and functions of the first PDCP layer device (indicated by reference numeral 9-11 or 9-12) of this disclosure for each bearer and transmit or receive the same (indicated by reference numeral 9-01).

However, if the UE receives the handover command message from the base station, indicates the DAPS handover method of this disclosure through the handover command message, or indicates the DAPS handover method for specific bearers, the UE may process data by applying the structure and functions of the second PDCP layer device (indicated by reference numeral 9-20) of the disclosure, for each bearer or for bearers for which the DAPS handover method is indicated above, and transmit or receive the same (indicated by reference numeral 9-02). That is, when the handover command message is received and the handover command message indicates the DAPS handover method of this disclosure, or the DAPS handover method is indicated for specific bearers, the UE may switch, for each bearer or for bearers for which the DAPS handover method is indicated, from the structure or functions of the first PDCP layer device (indicated by reference numeral 9-11 or 9-12) used for each bearer to the structure or functions of the second PDCP layer device (indicated by reference numeral 9-20) of the disclosure. In another method, when the first condition described in the disclosure is satisfied, the UE may switch, for each bearer or for bearers for which the DAPS handover method is indicated, from the structure or functions of the first PDCP layer device (indicated by reference numeral 9-11 or 9-12) used for each bearer to the structure or functions of the second PDCP layer device (indicated by reference numeral 9-20) of the disclosure (indicated by reference numeral 9-02). In addition, when the UE receives the handover command message, indicates the DAPS handover method of this disclosure through the handover command message, or indicates the DAPS handover method for specific bearers, or when the PDCP reordering timer value is newly configured, the UE updates parameters of reordering to a PDCP serial number or count value expected to be received next, and stops and restarts the reordering timer in a case where the UE may switch, for each bearer or for bearers for which the DAPS handover method is indicated, from the structure or functions of the first PDCP layer device (indicated by reference numeral 9-11 or 9-12) to the structure or functions of the second PDCP layer device (indicated by reference numeral 9-20) of the disclosure.

In addition, the UE performs the DAPS handover method of the disclosure, and if the second condition described in the disclosure is satisfied, the UE may switch again and apply to the structure or functions of the first PDCP layer device (indicated by reference numeral 9-11 or 9-12) by releasing the first bearers for the source base station from the structure or functions of the second PDCP layer device (indicated by reference numeral 9-20), which are applied for each bearer or for bearers for which the DAPS handover method is indicated. In addition, when the second condition described in the disclosure is satisfied, and the UE switches, for each bearer or for bearers for which the DAPS handover method is indicated, from the structure or functions of the second PDCP layer device (indicated by reference numeral 9-20) to the structure or functions of the first PDCP layer device (indicated by reference numeral 9-11 or 9-12) of the disclosure, the UE may initialize variables for reordering, interrupt and initialize the reordering timer. In addition, the UE may perform a deciphering procedure or header (or data) decompression by applying a security key or header decompression context for the source base station to pieces of data stored in the buffer for reordering (e.g., for data received from the source base station) and then discard the security key or header decompression context for the source base station. In addition, the UE may transmit the processed data to the higher layer in ascending order. That is, in the above case, when the second condition is satisfied, the UE may perform a deciphering procedure or header (or data) decompression by applying a security key or header decompression context for the source base station to pieces of data stored in the buffer for reordering (e.g., for data received from the source base station) and then discard the security key or header decompression context for the source base station.

As another method, the UE performs the DAPS handover method of the disclosure, and if the second condition described in the disclosure is satisfied, the UE may switch again and apply to the structure or function of the third PDCP layer device (indicated by reference numeral 9-30) by releasing bearers for the source base station from the structure or functions of the second PDCP layer device (indicated by reference numeral 9-20), which are applied for each bearer or for bearers for which the DAPS handover method is indicated. In addition, when the second condition described in the disclosure is satisfied, and the UE switches, for each bearer or for bearers for which the DAPS handover method is indicated, from the structure or functions of the second PDCP layer device (indicated by reference numeral 9-20) to the structure or functions of the third PDCP layer device (indicated by reference numeral 9-30) of the disclosure, the UE may use variables for reordering and the reordering timer as they are without stopping or initializing the same. However, the UE may perform a deciphering procedure or header (or data) decompression by applying a security key or header decompression context for the source base station to pieces of data stored in the buffer for reordering (e.g., for data received from the source base station) and then discard the security key or header decompression context for the source base station. In addition, the processed data may be transmitted to the higher layer in ascending order. That is, in the above case, when the second condition is satisfied, the UE may perform a deciphering procedure or header (or data) decompression by applying a security key or header decompression context for the source base station to pieces of data stored in the buffer for reordering (e.g., for data received from the source base station) and then discard the security key or header decompression context for the source base station.

As suggested in FIGS. 9A and 9B of the disclosure above, when the UE performs handover by applying the structure and function of the first PDCP layer device (indicated by reference numeral 9-11 or 9-12), the structure and function of the second PDCP layer device (indicated by reference numeral 9-20), or the structure and function of the third PDCP layer device (indicated by reference numeral 9-30) which are different for each bearer at different time points, there is no data loss and a data interruption time can be minimized.

The structure of the first PDCP layer device (indicated by reference numeral 9-11 or 9-12) of FIGS. 9A and 9B may have a (1-1)th PDCP layer device structure, a (1-2)th PDCP layer device structure, a (1-3)th PDCP layer device structure, or a (1-4)th PDCP layer device structure, which will be described later, and may have the following characteristics.

1> (In the case of the (1-1)th PDCP layer device structure) for example, if a UE applies the structure and function of the first PDCP layer device (indicated by reference numeral 9-11) to a PDCP layer device (e.g., E-UTRA PDCP layer device or an LTE PDCP layer device) connected to an AM RLC layer device (e.g., E-UTRA AM RLC layer device), the structure may have the following characteristics.

2> The receiving PDCP layer device may first detect data outside the window or detect duplicate data of the received data. (Since there is retransmission for the RLC AM, and the size of the LTE RLC SN and the PDCP SN may be different, duplicated data or data outside the window may be received. The window indicates a range of PDCP serial numbers or a count value in which valid data is received.)

3> The UE performs a deciphering procedure and a header decompression procedure for the data outside the window or duplicate data before discarding the same, and then discards the data. (Because the data may include useful information for the header decompression procedure (for example, IR packet or header compression information), the UE may identify and discard the data.)

2> Data received without being discarded are deciphered directly without sequencing data and a header decompression procedure thereon is performed. This is because the E-UTRA AM RLC layer device arranges data in sequence and transmits the same to the PDCP layer device.

2> In addition, when transmitting the data to the higher layer, the UE transmits the data in ascending order of the count value.

1> (In the case of the structure of the (1-2)th PDCP layer device) For example, if a UE applies the structure and function of the first PDCP layer device (indicated by reference numeral 9-11) to a PDCP layer device (e.g., E-UTRA PDCP layer device or an LTE PDCP layer device) connected to a UM RLC layer device (e.g., E-UTRA UM RLC layer device), the structure may have the following characteristics.

2> A procedure of detecting data outside the window or detecting duplicate data is not performed. This is because the UM E-UTRA RLC layer device does not perform a retransmission procedure.

2> In addition, a deciphering procedure is directly performed for the received data and a header decompression procedure thereof is performed.

2> Then, the data can be transmitted directly to the higher layer (for example, in ascending order) after the reordering procedure.

1> (In the case of the structure of the (1-3)th PDCP layer device) For example, if a UE applies the structure and function of the first PDCP layer device (indicated by reference numeral 9-11) to a PDCP layer device (e.g., E-UTRA PDCP layer device or an LTE PDCP layer device) in which a split bearer, a packet duplication bearer, or an LTE-wireless local area network (WLAN) aggregation (LWA) bearer are configured, a reordering procedure and a reordering timer are always applied thereto, and the structure may have the following characteristics:

2> It may be characterized by first detecting data outside the window or duplicate data with respect to the received data. (This is because data may be received at different times from different RLC layer devices or RLC AM retransmission, and data outside the window or duplicate data may be received because the sizes of the LTE RLC SN and the PDCP SN may be different.)

3> A deciphering procedure is performed. However, a header compression decompression procedure is not performed. (Because it is impossible for E-UTRA PDCP to set a header compression protocol for a split bearer or LWQ bearer)

3> If integrity protection or a verification procedure has been performed, the data subject to the procedure is discarded. If the integrity verification procedure fails, the data may be discarded and reported to a higher layer device.

3> Data outside the window or duplicate data is discarded.
2> If the data is not discarded, it may be characterized in that the deciphering procedure is directly performed without sequencing of the received data. In addition, when integrity protection or a verification procedure is configured, integrity verification is performed. If the integrity protection or verification procedure for the data has been performed, the data is discarded. If the integrity verification procedure fails, the data may be discarded and reported to a higher layer device.
2> In addition, if the received data is arranged in sequence, and if the data is sequentially arranged in ascending order without gaps in the PDCP serial number or count value, and the header compression procedure is performed (in a case where the header compression procedure or the decompression procedure is configured), it may be characterized in that data is transmitted to the higher layer in ascending order.
2> If the reordering timer is running
3> If data corresponding to the count value, which is the same value as the value obtained by subtracting 1 from a value maintained by a variable for reordering, is transmitted to the higher layer device, or if all the data is transmitted to the higher layer without a gap in the PDCP serial number (or count value)
4> The reordering timer is interrupted and initialized.
2> If the reordering timer is not running
3> If there is data stored in the buffer without being transmitted to the higher layer device, or if there is a gap in the PDCP serial number (or count value)
4> The reordering timer is started.
4> In addition, the variable for reordering is updated with the PDCP serial number or count value that is expected to be received next.
2> If the reordering timer has expired
3> If the header decompression procedure is configured for stored data in ascending order of the PDCP serial number or count value for a value smaller than the reordering variable value, the header decompression procedure is performed for the stored data and the data is transmitted to the higher layer device.
3> If the header decompression procedure is successively configured for the stored data in ascending order of the PDCP serial number or count value for values equal to or greater than reordering variable values, the header decompression procedure is performed for the stored data and the data is transmitted to the higher layer device.
3> Then, the variable value of the data last transmitted to the higher layer is updated with the PDCP serial number or count value of the last transmitted data.
3> If there is data stored in the buffer without being transmitted to the higher layer device, or if there is a gap in the PDCP serial number (or count value)
4> The reordering timer is started.
4> In addition, the variable for reordering is updated with the PDCP serial number or count value that is expected to be received next.
1> (In the case of the structure of the (1-4)th PDCP layer device) For example, if the UE applies the structure and function of the first PDCP layer device (indicated by reference numeral 9-12) to the NR PDCP layer device, the reordering procedure and reordering timer are always applied and may have the following characteristics.
2> It may be characterized by first performing a deciphering procedure for the received data.
2> When an integrity protection or verification procedure is configured, an integrity protection or verification procedure is performed on the received data, and if the integrity verification procedure fails, the data may be discarded and reported to a higher layer device.
2> Data outside the window or duplicate data with respect to the received data may be detected. (It may be characterized in that data outside the window or redundant detection is performed after performing the deciphering procedure above. According to another method, detection of data outside the window or detection of duplicate data is performed after performing a deciphering procedure only when the integrity protection or verification procedure is configured. In addition, if the integrity protection or verification procedure is not configured, a deciphering procedure can be performed only for data that is not discarded after performing detection of data outside the window or detection of duplicate data.)
3> Data outside the window or duplicated data is discarded.
2> If the data is not discarded above, sequencing for the received data is performed, and if the data is sequentially arranged in ascending order without gaps in the PDCP serial number or count value, the header compression procedure is performed (in a case where the header compression procedure or header decompression procedure is configured) and data may be transmitted to a higher layer in ascending order.
2> In addition, when transmitting data to the higher layer, the count value is transmitted in ascending order.
2> If the reordering timer is running
3> If data corresponding to the count value, which is the same value as the value obtained by subtracting 1 from a value maintained by a variable for reordering, is transmitted to the higher layer device, if all the data is transmitted to the higher layer without a gap in the PDCP serial number (or count value), or if the value of the variable storing the PDCP serial number or count value of the data to be transmitted to the higher layer is greater than or equal to the value of the variable for reordering
4> The reordering timer is interrupted and initialized.
2> If the reordering timer is not running
3> If there is data stored in the buffer without being transmitted to the higher layer device, if there is a gap in the PDCP serial number (or count value), or if the value of the variable storing the count value of first, which is not transmitted to the higher layer, is smaller than the value of the variable for reordering
4> In addition, the variable for reordering is updated with the PDCP serial number or count value that is expected to be received next.
4> The reordering timer is started.
2> If the reordering timer has expired
3> If the header compression decompression procedure is configured for stored data in ascending order of the PDCP serial number or count value for a value smaller than the reordering variable value, the header decompression procedure for the stored data is performed and the data is transmitted to the higher layer device.
3> If the header decompression procedure is successively configured for the stored data in ascending order of the PDCP serial number or count value for values equal to or greater than the reordering variable value, the header decompression procedure for the stored data is performed and the data is transmitted to the higher layer device.
3> Then, the variable value of the first data not transmitted to the higher layer is updated with the PDCP serial number or count value of the first data not transmitted to the higher layer.
3> If there is data stored in the buffer without being transmitted to the higher layer device, if there is a gap in the PDCP serial number (or count value), or if the value of variable that stores the count value of the first data that has not been transmitted to the higher layer is smaller than the value of variable for reordering 4> In addition, the variable for reordering is updated with the PDCP serial number or count value that is expected to be received next.

4> The reordering timer is started.

The structure of the second PDCP layer device (indicated by reference numeral 9-20) of FIGS. 9A and 9B may have the following (2-1)th PDCP layer device structure or the (2-2)th PDCP layer device structure 2-2 of the disclosure, and may have the following characteristics.

The disclosure proposes the structure of a second PDCP layer device that is efficient in handover, as shown in reference numeral 9-20. The structure of the second PDCP layer device may be applied to the second embodiment of an efficient handover method for minimizing a data interruption time, of the disclosure.

In the second PDCP layer device structure, the UE may perform data transmission or reception to or from the source base station 9-21 through protocol layer devices of the first bearer (for example, SDAP layer device, PDCP layer device, RLC layer device, or MAC layer device), and may perform data transmission or reception to or from the target base station 9-22 through protocol layer devices (for example, SDAP layer device, PDCP layer device, RLC layer device, or MAC layer device) of the second bearer.

The PDCP layer device of the first bearer and the PDCP layer device of the second bearer may be configured in the UE, respectively, but logically operate as a single PDCP layer device, such as reference numeral 9-20. Specifically, the one PDCP layer device may be implemented with functions, wherein the functions of the PDCP layer device are divided into functions of a higher PDCP layer device (for example, a serial number assignment function, a reordering function, a sequence transfer function, or a duplicate detection function), and functions of two lower PDCP layer devices for the source base station and the target base station (e.g., a deciphering or ciphering function, a header (or data) compression or header (or data) decompression function, an integrity protection or verification function, or a duplicate detection function). In addition, in the DAPS handover method as described above, the UE transmits uplink data transmission to the source base station and switches to the target base station when the first condition is satisfied, and downlink data may be successively received from the source base station and the target base station. Therefore, with respect to the header (or data) compression protocol context, only one context is maintained and applied to the source base station or target base station for the uplink, and two contexts are maintained and applied to the source base station or target base station for the downlink.

Based on the second PDCP layer structure described above, the (2-1)th PDCP layer structure (for example, an E-UTRA PDCP layer device for a DAPS handover method) of the disclosure may have the following characteristics.

The function of a higher transmission PDCP layer device may perform a role of allocating a PDCP serial number to data received from a higher layer device. In addition, according to the functions of lower transmission PDCP layer devices 9-21 and 9-22 for each source base station and each target base station, a header (or data) compression procedure is applied by using a separate security key configured with each source base station and each target base station such that a header (or data) compression context or security key configured with the source base station is applied to data to be transmitted to the source base station, and a header (or data) compression context or security key configured with the target base station is applied to data to be transmitted to the target base station. In addition, two lower transmission PDCP layer devices 9-21 and 9-22 may, if integrity protection is configured, apply the integrity protection procedure to the PDCP header and data (PDCP SDU) and apply the ciphering procedure thereto, and may perform transmission such that data to be transmitted to the source base station is transmitted to the transmission RLC layer device of the first bearer and data to be transmitted to the target base station is transmitted to the transmission RLC layer device of the second bearer. The functions of two lower transmission PDCP layer devices 9-21 and 9-22 may perform parallel data processing in which header compression, integrity protection, or ciphering procedures are processed in parallel in order to accelerate data processing speed. The integrity protection or ciphering procedure is performed using different security keys in the functions of two lower transmission PDCP layer devices. In addition, it may be characterized in that procedures of compression, integrity protection, or ciphering different pieces of data are logically performed by applying different compression contexts, security keys, or security algorithms in one transmission PDCP layer device.

The function of the receiving PDCP layer device may perform, for pieces of data received from respective lower layer devices, specifically for data received from two RLC layer devices for each source base station and each target base station. That is, the functions of lower receiving PDCP layer devices 9-21 and 9-22 for the source base station and the target base station may independently perform a procedure of detecting data outside the window or duplicate data based on the PDCP serial number or count value, for data received from respective RLC layer devices. As another method, for convenience of implementation, the lower receiving PDCP layer devices 9-21 and 9-22 may perform the procedure of detecting data outside the window or duplicate data based on the PDCP serial number or count value, for all received data without distinguishing respective RLC layer devices. As another method, for more accurate duplication detection, the lower receiving PDCP layer devices 9-21 and 9-22 may perform the procedure of detecting data outside the window based on the PDCP serial number or count value, for all received data without distinguishing respective RLC layer devices, and may independently perform the duplicate data detection procedure for pieces of data received from respective RLC layer devices. As another method, when data received from different base stations overlap each other, in order to prevent data loss for the header compression protocol, the lower receiving PDCP layer devices 9-21 and 9-22 may perform the procedure of detecting data outside the window based on the PDCP serial number or count value, for all received data without distinguishing respective RLC layer devices, and may perform the duplicate data detection procedure for all the pieces of data after performing a deciphering procedure, an integrity protection procedure, or a header (or data) decompression procedure for respective pieces of data received from RLC layer devices.

The functions of the lower receiving PDCP layer devices may directly apply a deciphering procedure to pieces of received data, by using a separate header (or data) compression context or security key configured with each source base station and each target base station, and when the integrity protection is configured, the functions may apply the integrity verification procedure to the PDCP header and data (PDCP SDU).

In the (2-1)th PDCP layer device structure, a header (or data) decompression procedure is directly performed without sequencing pieces of data, received from RLC layer devices of the first bearer for each source base station, and a header (or data) decompression procedure is directly performed without sequencing pieces of data received from RLC layer devices of the second bearer for each target base station. In addition, in order to distinguish data received from RLC layer devices of the first bearer for each source base station and data received from RLC layer devices of the second bearer for each target base station, the (2-1)th PDCP layer device structure may define an indicator for each data to distinguish whether data is received from the source base station or the target base station. As another method, the (2-1)th PDCP layer device structure may define a 1-bit indicator of a PDCP header, SDAP header, or RLC header to distinguish whether data is received from the source base station or the target base station. In addition, in the (2-1)th PDCP layer device structure, for all the pieces of data received from the RLC layer devices of the first bearer for the source base station and pieces of data received from the RLC layer devices of the second bearer for the target base station, in which the header (or data) compression procedure for the pieces of data is completed, the duplicate detection procedure based on the PDCP serial number or count value is performed (a procedure in which only one data (including previously received data or data transmitted to a higher layer) is left (for each PDCP serial number or count value) and the remaining pieces of data are discarded). In addition, in the (2-1)th PDCP layer device structure, a reordering procedure is performed for all the pieces of data received from the RLC layer devices of the first bearer for the source base station and pieces of data received from the RLC layer devices of the second bearer for the target base station, based on the PDCP serial number or count value in an ascending order, and the data may be transmitted to a higher layer device in sequence. As described above, since one PDCP layer device can receive data from different base stations, that is, from the first bearer or the second bearer in any order, it may be characterized in that the reordering procedure must always be performed.

Each of the functions of the two lower receiving PDCP layer devices may perform parallel data processing of performing header compression, integrity protection, or ciphering procedures in parallel in order to accelerate the data processing speed based on the PDCP serial number or count value, and may perform the integrity protection, ciphering procedure, or decompression procedure by using different header (or data) compression contexts or security keys. In addition, the functions may perform the integrity protection, ciphering procedure, or decompression procedure of different pieces of data by applying different header (or data) compression contexts, security keys, or security algorithms logically in one transmitting PDCP layer device. In addition, according to the functions of lower receiving PDCP layer devices, it is possible to perform out-of-sequence deciphering or an integrity verification procedure for each data received regardless of the sequence of the PDCP serial number or count value.

When distinguishing between the layer devices of the first bearer and the layer devices of the second bearer, the one PDCP layer device may distinguish the layer devices of the first bearer (or first RLC layer devices) and the layer devices of the second bearer (or second RLC layer devices) by considering that the layer devices of the first bearer and the layer devices of the second bearer are connected to different MAC layer devices or have different logical channel identifiers, or the layer devices of the first bearer and the layer devices of the second bearer are different RLC layer devices connected to different MAC layer devices or use different ciphering keys. In addition, the PDCP layer device performs ciphering or deciphering procedures of uplink data and downlink data by using different security keys, and performs compression or decompression therefor using different compression protocol contexts.

Based on the second PDCP layer structure described above, the (2-2)th PDCP layer structure (for example, an NR PDCP layer device for a DAPS handover method) of the disclosure may have the following characteristics.

The function of a higher transmission PDCP layer device may perform a role of allocating PDCP serial numbers to pieces of data received from a higher layer device. In addition, according to the functions of two lower transmission PDCP layer devices 9-21 and 9-22 for a source base station and a target base station, a header (or data) compression procedure is applied by using a separate security key configured with each source base station and each target base station such that a header (or data) compression context or security key configured with the source base station is applied to data to be transmitted to the source base station, and a header (or data) compression context or security key configured with the target base station is applied to data to be transmitted to the target base station. In addition, according to the functions of two lower transmission PDCP layer devices 9-21 and 9-22, if integrity protection is configured, the integrity protection procedure is applied to the PDCP header and data (PDCP SDU), the ciphering procedure is applied thereto, and transmission may be performed such that the data to be transmitted to the source base station is transmitted to the transmission RLC layer device of the first bearer and data to be transmitted to the target base station is transmitted to the transmission RLC layer device of the second bearer. The functions of two lower transmission PDCP layer devices 9-21 and 9-22 may perform parallel data processing in which header compression, integrity protection, or ciphering procedures are processed in parallel in order to accelerate data processing speed. The integrity protection or ciphering procedure is performed using different security keys in the functions of two lower transmission PDCP layer devices. In addition, it may be characterized in that procedures of compression, integrity protection, or ciphering different pieces of data are logically performed by applying different compression contexts, security keys, or security algorithms in one transmission PDCP layer device.

The function of the receiving PDCP layer device, specifically, the functions of lower receiving PDCP layer devices 9-21 and 9-22 for the source base station and the target base station, may independently perform a procedure of detecting data outside the window or duplicate data based on the PDCP serial number or count value, for data received from each lower layer device, specifically for data received from two RLC layer devices for each source base station and each target base station. As another method, for convenience of implementation, the lower receiving PDCP layer devices 9-21 and 9-22 may perform the procedure of detecting data outside the window or duplicate data based on the PDCP serial number or count value for all received data without distinguishing respective RLC layer devices. As another method, for more accurate duplication detection, the lower receiving PDCP layer devices 9-21 and 9-22 may perform the procedure of detecting data outside the window based on the PDCP serial number or count value for all received data without distinguishing respective RLC layer devices, and the duplicate data detection procedure may be independently performed for pieces of data received from respective RLC layer devices. As another method, when data received from different base stations overlap each other, the lower receiving PDCP layer devices 9-21 and 9-22 may perform the procedure of detecting data outside the window based on the PDCP serial number or count value for all received data without distinguishing respective RLC layer devices, in order to prevent data loss for the header compression protocol, and the duplicate data detection procedure may be performed for all the pieces of data after performing a deciphering procedure, an integrity protection procedure, or a header (or data) decompression procedure for respective pieces of data received from RLC layer devices.

The functions of the lower receiving PDCP layer devices may directly apply a deciphering procedure to pieces of received data, by using a separate header (or data) compression context or security key configured with each source base station and each target base station, and when the integrity protection is configured, the functions may apply the integrity verification procedure to the PDCP header and data (PDCP SDU).

In the (2-2)th PDCP layer device structure, pieces of data received from RLC layer devices of the first bearer for each source base station and pieces of data received from RLC layer devices of the second bearer for each target base station are re-sequenced and then a header (or data) decompression procedure is performed by applying the header (or data) compression context of each base station (source base station or target base station) for each data received from each base station (source base station or target base station) in ascending order of PDCP serial number or count value. In addition, in order to distinguish data received from RLC layer devices of the first bearer for each source base station and data received from RLC layer devices of the second bearer for each target base station, the (2-2)th PDCP layer device structure may define an indicator for each piece of data to distinguish whether data is received from the source base station or the target base station. As another method, the (2-2)th PDCP layer device structure may define a 1-bit indicator of a PDCP header, SDAP header, or RLC header to distinguish whether data is received from the source base station or the target base station. In addition, the (2-2)th PDCP layer device structure may perform the duplicate detection procedure for all the pieces of data received from the RLC layer devices of the first bearer for the source base station and pieces of data received from the RLC layer devices of the second bearer for the target base station, in which the header (or data) compression procedure for the pieces of data has been completed, based on the PDCP serial number or count value (a procedure in which only one piece of data (including previously received data or data transmitted to a higher layer) is left for each PDCP serial number or count value and the remaining pieces of data are discarded). In addition, all the pieces of data received from the RLC layer devices of the first bearer for the source base station and pieces of data received from the RLC layer devices of the second bearer for the target base station are transmitted to a higher layer device in sequence, based on the PDCP serial number or count value in an ascending order. As described above, since one PDCP layer device can receive data from different base stations, that is, from the first bearer or the second bearer regardless of the sequence, the reordering procedure needs to be always performed.

Each of the functions of the two lower receiving PDCP layer devices may perform parallel data processing of performing header compression, integrity protection, or ciphering procedures in parallel in order to accelerate the data processing speed based on the PDCP serial number or count value, and may perform the integrity protection, ciphering procedure, or decompression procedure by using different header (or data) compression contexts or security keys. In addition, the functions of the two lower receiving PDCP layer devices may perform the integrity protection, ciphering procedure, or decompression procedure of different pieces of data by applying different header (or data) compression contexts, security keys, or security algorithms logically in one transmitting PDCP layer device. In addition, according to the functions of lower receiving PDCP layer devices, it is possible to perform out-of-sequence deciphering or an integrity verification procedure for each data received regardless of the sequence of the PDCP serial number or count value.

When distinguishing between the layer devices of the first bearer and the layer devices of the second bearer, the one PDCP layer device may distinguish the layer devices of the first bearer (or first RLC layer devices) and the layer devices of the second bearer (or second RLC layer devices) by considering that the layer devices of the first bearer and the layer devices of the second bearer are connected to different MAC layer devices or have different logical channel identifiers, or the layer devices of the first bearer and the layer devices of the second bearer are different RLC layer devices connected to different MAC layer devices or use different ciphering keys. In addition, the one PDCP layer device may perform ciphering or deciphering procedures for uplink data and downlink data by using different security keys, and perform compression or decompression thereof using different compression protocol contexts.

The disclosure proposes the structure of a third PDCP layer device that is efficient in handover, as shown in reference numeral 9-30. The structure of the third PDCP layer device may be applied to the second embodiment of an efficient handover method for minimizing a data interruption time, of the disclosure. In addition, in the structure of the third PDCP layer device of the disclosure, the function of the PDCP layer device may be the same as the function of the structure of the second PDCP layer device of the disclosure. However, the third PDCP layer device structure may be obtained by releasing the first bearer for the source base station from the structure of the second PDCP layer device. Specifically, the structure of the third PDCP layer device of this disclosure has the same function as the function of the structure of the second PDCP layer device described above, but has the structure obtained by releasing the first bearer for the source base station (e.g., SDAP layer device, PDCP layer device, RLC layer device, or MAC layer device). Accordingly, the structure of the third PDCP layer device is obtained by releasing QoS mapping information of the SDAP layer device for the source base station, security key information for the source base station of the PDCP layer device, or header (or data) compression context information for the source base station, the RLC layer device for the source base station, or the MAC layer device.

Hereinafter, the disclosure proposes, in FIG. 6, when the UE receives a handover command message and applies bearer configuration information included in the handover command message, the features of applying bearer configuration information based on different methods according to a handover type indicated through the handover command message.

In a case where the UE receives the handover command message, if a first handover method (for example, the first embodiment of the disclosure or a general handover method) is indicated through the handover command message, ReconfigWithSync information, or MobilityControlInfo information, if the second embodiment (DAPS handover method) of the disclosure is not configured in the above, or if the second embodiment (DAPS handover method) of this disclosure is not configured for any bearer through the bearer configuration information, When a default bearer is configured in SDAP layer device configuration information configured through the handover command message, a default bearer for a source base station may be configured as a default bearer for a target base station, indicated in the configuration information.

When the second QoS flow and bearer mapping information are configured in the SDAP layer device configuration information configured through the handover command message, the first QoS flow and bearer mapping information applied for the source base station are released, and the second QoS flow and bearer mapping information can be applied. As another method, the first QoS flow and bearer mapping information applied for the source base station may be replaced by the second QoS flow and bearer mapping information.

When a data discard timer value is configured in the PDCP layer device configuration information configured through the handover command message, the discard timer value may be directly applied to the PDCP layer device corresponding to the bearer identifier of the configuration information.

If a drb-ContinueROHC indicator is configured as false in the PDCP layer device configuration information configured through the handover command message, the PDCP layer device corresponding to the bearer identifier of the configuration information may initialize the context of the header compression or decompression protocol. If the drb-ContinueROHC indicator is configured as true, the PDCP layer device corresponding to the bearer identifier of the configuration information does not initialize the context of the header compression or decompression protocol.

When the reordering timer value is configured in the PDCP layer device configuration information configured through the handover command message, the reordering timer value may be applied directly to the PDCP layer device corresponding to the bearer identifier of the configuration information.

Upon receiving the handover command message, the PDCP layer device may be re-established. For example, for SRB, window state variables may be initialized and stored data (PDCP SDU or PDCP PDU) may be discarded; and for UM DRB, window state variables may be initialized, and data which has not yet been transmitted to lower layer devices or data for which the PDCP revocation timer has not expired may be compressed or ciphered based on the header (or data) compression context or security key of the target base station in ascending order of the count value, or may be subject to integrity protection thereof to perform transmission or retransmission. In addition, if the reordering timer is running, the timer may be interrupted and initialized, and received data (PDCP SDU or PDCP PDU) may be processed in sequence and transmitted to the higher layer device. For AM DRB, window state variables are not initialized, and compression or ciphering is performed starting from first data (PDCP SDU or PDCP PDU), which is not successfully transmitted from the lower layer device, based on the header (or data) compression context or security key of the target base station in ascending order of the PDCP serial number or count value, or integrity protection thereof is performed to be transmitted or retransmitted.

When security key-related configuration information or security algorithm is configured in the security configuration information configured through the handover command message, a new security key or security configuration information is derived using the configuration information, the existing security key or security configuration information is released, or the existing security key or security configuration information may be replaced by the new security key or security configuration information.

When a new logical channel identifier is configured in the RLC layer device configuration information configured through the handover command message, the new logical channel identifier is released from the existing logical channel identifier corresponding to a bearer identifier indicated in the RLC layer device configuration information, or the existing logical channel identifier may be replaced and configured to be the new logical channel identifier.

When an RLC re-establishment procedure is configured in the RLC layer device configuration information configured through the handover command message, the RLC re-establishment procedure may be performed for an RLC layer device corresponding to a bearer identifier indicated in the RLC layer device configuration information. That is, specifically, the transmitting RLC layer device may perform a procedure of discarding all stored data by performing the RLC re-establishment procedure. In addition, when the reordering timer is running, the receiving RLC layer device may interrupt and initialize the reordering timer, process all stored data, and transmit the processed data to a higher layer device. In addition, the receiving RLC layer device may initiate the MAC layer device. In addition, the receiving RLC layer device may initiate the MAC layer device for the source base station and use the MAC layer device for the target base station.

The MAC layer device may be initialized, and data transmission or reception may be stopped for the source base station and each bearer. In addition, the MAC layer device may stop monitoring the PDCCH for the first UE identifier (C-RNTI) allocated from the source base station. In addition, the MAC layer device may stop a procedure of requesting scheduling from a source base station or may release transmission resources for scheduling. In addition, the PHY or MAC layer device may perform a procedure of random access to the target base station. The PHY or MAC layer device may resume data transmission or reception to or from the target base station if the procedure of handover to the target base station is successfully completed, and may start monitoring the PDCCH for the second UE identifier (C-RNTI) allocated from the target base station. In addition, the PHY or MAC layer device may receive a system frame number from the target base station and perform synchronization. In addition, the PHY or MAC layer device may initiate or perform a procedure of requesting scheduling from the target base station.

The PHY layer device may perform channel measurement for the source base station, perform a channel measurement report, or stop a procedure of transmitting HARQ ACK or NACK. Then, the PHY layer device may perform a downlink synchronization procedure for the target base station. In addition, the PHY layer device may configure configuration information for the target base station (or Spcell or Pcell), received through the handover command message, in a lower layer device or a PHY layer device. The PHY layer device may start transmission of or may transmit HARQ ACK or NACK information to the target base station if the procedure of handover to the target base station is successfully completed. In addition, the PHY or MAC layer device may receive a system frame number from the target base station and perform synchronization. In addition, the PHY or MAC layer device may initiate or perform a procedure of requesting scheduling from the target base station.

When the RLC layer device configuration information configured through the handover command message is newly configured, an RLC re-establishment procedure may be performed for an RLC layer device corresponding to a bearer identifier indicated in the RLC layer device configuration information.

When the second priority for the logical channel is newly configured in the MAC layer device configuration information configured through the handover command message, the first priority corresponding to the logical channel identifier indicated in the configuration information is released, or the first priority corresponding to the logical channel identifier may be replaced and configured to be the newly configured second priority.

When the second prioritized bit rate (PBR) for a logical channel is newly configured in the MAC layer device configuration information configured through the handover command message, the first PBR corresponding to the logical channel identifier indicated in the configuration information may be released, or the first PBR corresponding to the logical channel identifier may be replaced and configured to be the newly configured second PBR. The prioritized bit rate is a value that increases for each logical channel for a predetermined time (for example, every TTI), when an uplink transmission resource is received, a logical channel prioritization (LCP) procedure is performed, data for the logical channel may be transmitted by considering the priority and the prioritized bit rate, and the higher the priority or the greater the value of the prioritized bit rate, the more data may be transmitted.

When a second bucket size (bucketSizeDuration) for a logical channel is newly configured in the MAC layer device configuration information configured through the handover command message, a first bucket size (bucketSizeDuration) corresponding to the logical channel identifier indicated in the configuration information may be released, or the first bucket size (bucketSizeDuration) corresponding to the logical channel identifier may be replaced and configured to be the newly configured second bucket size (bucketSizeDuration). The bucket size indicates a maximum value that the prioritized bit rate may have when the prioritized bit rate is accumulated.

If second allowed SCell information, allowed subcarrier spacing information, a maximum PUSCH period, or logical channel group configuration information are configured in the MAC layer device configuration information configured through the handover command message, the previously configured first allowed SCell information, allowed subcarrier spacing information, a maximum PUSCH period, or logical channel group configuration information are released, or the previously configured first allowed SCell information, allowed subcarrier spacing information, maximum PUSCH period, or logical channel group configuration information may be replaced and configured to be the newly configured second allowed SCell information, allowed subcarrier spacing information, maximum PUSCH period, or logical channel group configuration information.

When the UE receives the handover command message, if the handover command message or ReconfigWithSync information and mobility Control Info information indicate or configure the second handover method (for example, the second embodiment or the DAPS handover method of the disclosure), if the DAPS handover method is indicated or configured for each bearer identifier, or if the second embodiment (DAPS handover method) of the disclosure is configured for a predetermined bearer through the bearer configuration information or the second embodiment (DAPS handover method) of the disclosure is configured for at least one bearer through the bearer configuration information, When a default bearer is configured in the SDAP layer device configuration information configured through the handover command message, the DAPS handover method of the disclosure is performed, and by applying the second SDAP layer device structure, a default bearer for the existing source base station may be maintained and default bearer information indicated in the configuration information may be configured as a default bearer for the target base station. As another method, when the first condition described in the disclosure is satisfied, the default bearer for the existing source base station may be switched to the default bearer for the target base station indicated in the configuration information.

When a second QoS flow and bearer mapping information are configured in the SDAP layer device configuration information configured through the handover command message, the DAPS handover method of the disclosure is performed, and by applying the second SDAP layer device structure, the first QoS flow and bearer mapping information that have been applied for the source base station may be maintained and the second QoS flow and bearer mapping information may be applied to data for the target base station. As another method, when the first condition described in the disclosure is satisfied, the second QoS flow and bearer mapping information for the target base station may be applied.

When a data discard timer value is configured in the PDCP layer device configuration information configured through the handover command message, the DAPS handover method described above of the disclosure is performed, and by applying a second PDCP layer device structure, the discard timer value may be applied directly to the PDCP layer device corresponding to the bearer identifier of the configuration information.

The PDCP layer device in which the DAPS handover method is indicated or configured through the handover command message may not be re-established, and the following procedures may be performed. For example, for SRB, window state variables may be initialized (initialization of variables may be omitted in order to perform fall back when DAPS handover fails). Specifically, when the count value or the window state variable value is initialized, in order to solve the security issue (the risk of exposure of security keys caused by transmitting different pieces of data by using the same security key and same count value when the DAPS handover fallback procedure is performed), which occurs from reusing the same count value from the beginning when the DAPS handover fallback procedure is performed, the count value, a transmission window state variable (TX_NEXT), or a reception window state variable (RX_NEXT and RX_DELIV) may not be initialized and the values of the existing variables may be continuously used or maintained; or stored data (PDCP SDU) may be discarded. In addition, for UM DRB, window state variables may not be initialized and data that has not yet been transmitted to the lower layer device or data for which the PDCP discard timer has not expired may continue to transmit or receive data to or from the source base station. Alternatively, for AM DRB, window state variables may not be initialized and continue to transmit or receive data to or from the source base station. In addition, with regard to the procedure for the SRBs, the SRBs for the source base station are suspended, or in the case of the SRBs for the target base station, in order to solve the security issue that occurs from reusing the same count value from the beginning when the DAPS handover fallback procedure is performed, the existing count value of the SRBs for the source base station or the values of transmission or reception window variables are applied to the SRBs established for the target base station and maintained to be used (or by configuring the count value of the SRBs of the source base station or the values of transmission or reception window variables as the count value of SRBs of the target base station or values of transmission or reception window variables). In addition, for the SRBs for the target base station, the security key for the target base station may be derived or the derived security key may be applied, and the PDCP layer device of the SRBs may perform ciphering, deciphering, integrity protection, or verification procedures by applying the security key for the target base station. In addition, for SRBs for the source base station, old data (e.g., RRC message for the source base station) may be discarded. The procedure for the SRB for the target base station may be defined as a new procedure (e.g., a DAPS SRB establishment or PDCP layer device re-establishment procedure) and indicated, triggered, or performed, and the procedure for the SRB may be extended and applied to UM DRB or AM DRB for which the DAPS handover method is not configured.

A PDCP layer device for which a DAPS handover method is not indicated or not configured through the handover command message may be re-established. For example, for SRB, window state variables may be initialized, and stored data (PDCP SDU or PDCP PDU) may be discarded. For UM DRB, window state variables are initialized, and data that have not yet been transmitted to lower layer devices or data for which the PDCP revocation timer has not expired may be compressed or ciphered based on the header (or data) compression context or security key of the target base station in ascending order of the count value, or integrity protection thereof is performed to be transmitted or retransmitted. In addition, if the reordering timer is running, the reordering timer is stopped and initialized, and received data (PDCP SDU or PDCP PDU) may be processed in sequence and transmitted to the higher layer device. For AM DRB, window state variables are not initialized, and compression or ciphering is performed starting from first data (PDCP SDU or PDCP PDU) that has not been successfully transmitted from the lower layer device based on the header (or data) compression context or security key of the target base station in ascending order of the PDCP serial number or count value, or integrity protection thereof is performed to be transmitted or retransmitted. In addition, the RLC layer device may perform a re-establishment procedure.

When the drb-ContinueROHC indicator is configured as "false" in the configuration information of the PDCP layer device in which the DAPS handover method is indicated or configured through the handover command message, the DAPS handover method of the disclosure is performed. Here, by applying the second PDCP layer device structure, the PDCP layer device corresponding to the bearer identifier of the configuration information may use the context of the header compression or decompression protocol for the source base station as it is, and may initialize the context of the header compression or decompression protocol for the target base station and start from an initial state (e.g., IR state). If the drb-ContinueROHC indicator is configured as "true", the DAPS handover method of the disclosure is performed, and by applying the second PDCP layer device structure, the PDCP layer device corresponding to the bearer identifier of the configuration information may use the context of the header compression or decompression protocol for the source base station as it is, and may apply the context of the header compression or decompression protocol for the target base station to be the same form as the context of the header compression or decompression protocol for the source base station. For example, the context of the header compression or decompression protocol for the source base station may be copied to the context of the header compression or decompression protocol for the target base station and applied as is. As another method, the same header compression or decompression protocol context may be applied to the target base station or the source base station.

When a reordering timer value is configured through the configuration information of the PDCP layer device in which the DAPS handover method is indicated or configured through the handover command message, the DAPS handover method of the disclosure is performed, and by applying the second PDCP layer device structure, the reordering timer value may be directly applied to the PDCP layer device corresponding to the bearer identifier of the configuration information.

When security key-related configuration information or a security algorithm is configured through the security configuration information in which the DAPS handover method is indicated or configured through the handover command message, or when there is an indicator indicating a new procedure in the PDCP layer device configuration information, a new security key or security configuration information is derived using the configuration information, the DAPS handover method as described above in the disclosure may be performed. In addition, by applying the second PDCP layer device structure, the existing security key or security configuration information for the source base station is maintained and a security key or security configuration information for the target base station may be configured as the new security key or security configuration information.

When a new logical channel identifier is configured in the RLC layer device configuration information of a bearer for which the DAPS handover method is indicated or configured through the handover command message, the DAPS handover method of the disclosure may be performed. In addition, by applying the second PDCP layer device structure, for the RLC layer device or MAC layer device of a first bearer for a source base station corresponding to a bearer identifier indicated in the RLC layer device configuration information, the existing logical channel identifier is maintained, and the RLC layer device or the MAC layer device of a second bearer for the target base station may be configured as a new logical channel identifier indicated in the configuration information.

The RLC re-establishment procedure may not be performed for the RLC layer device for the source base station in the RLC layer device configuration information of a bearer for which the DAPS handover method is indicated or configured through the handover command message. Specifically, without performing the RLC re-establishment procedure, the transmitting RLC layer device continues to transmit the stored data, and the receiving RLC layer device continues to process the stored data together with the received data to avoid occurrence of a data interruption. However, when the first condition described in the disclosure is satisfied, with respect to the AM bearer or UM bearer, the PDCP layer device in which the DAPS handover method is configured may transmit a data discard indicator for PDCP user data (PDCP Data PDU) in order to indicate discarding of data (PDCP Data PDU) to the RLC layer device for the source base station according to the method of this disclosure. Accordingly, the RLC layer device for the source base station discards the PDCP data PDU, but may perform transmission without discarding the PDCP control PDU.

The RLC re-establishment procedure may be performed for the RLC layer device of a bearer for which the DAPS handover method configured in the handover command message is not indicated or not configured, or may perform the RLC re-establishment procedure when the RLC re-establishment procedure is configured. That is, specifically, by performing the RLC re-establishment procedure, the transmitting RLC layer device may perform a procedure of discarding all stored data (PDCP data PDU or PDCP control PDU). In addition, when the reordering timer is running, the receiving RLC layer device may interrupt and initialize the reordering timer, process all stored data, and transmit the processed data to a higher layer device.

When RLC layer device configuration information of a bearer for which the DAPS handover method is indicated or configured through the handover command message is newly configured, the DAPS handover method of the disclosure is performed, and by applying the second PDCP layer device structure, the existing RLC configuration information is maintained for an RLC layer device of a first bearer for the source base station corresponding to a bearer identifier indicated in the RLC layer device configuration information, and an RLC layer device of a second bearer for the target base station may be configured via new RLC layer device configuration information indicated in the configuration information.

Figure 10:
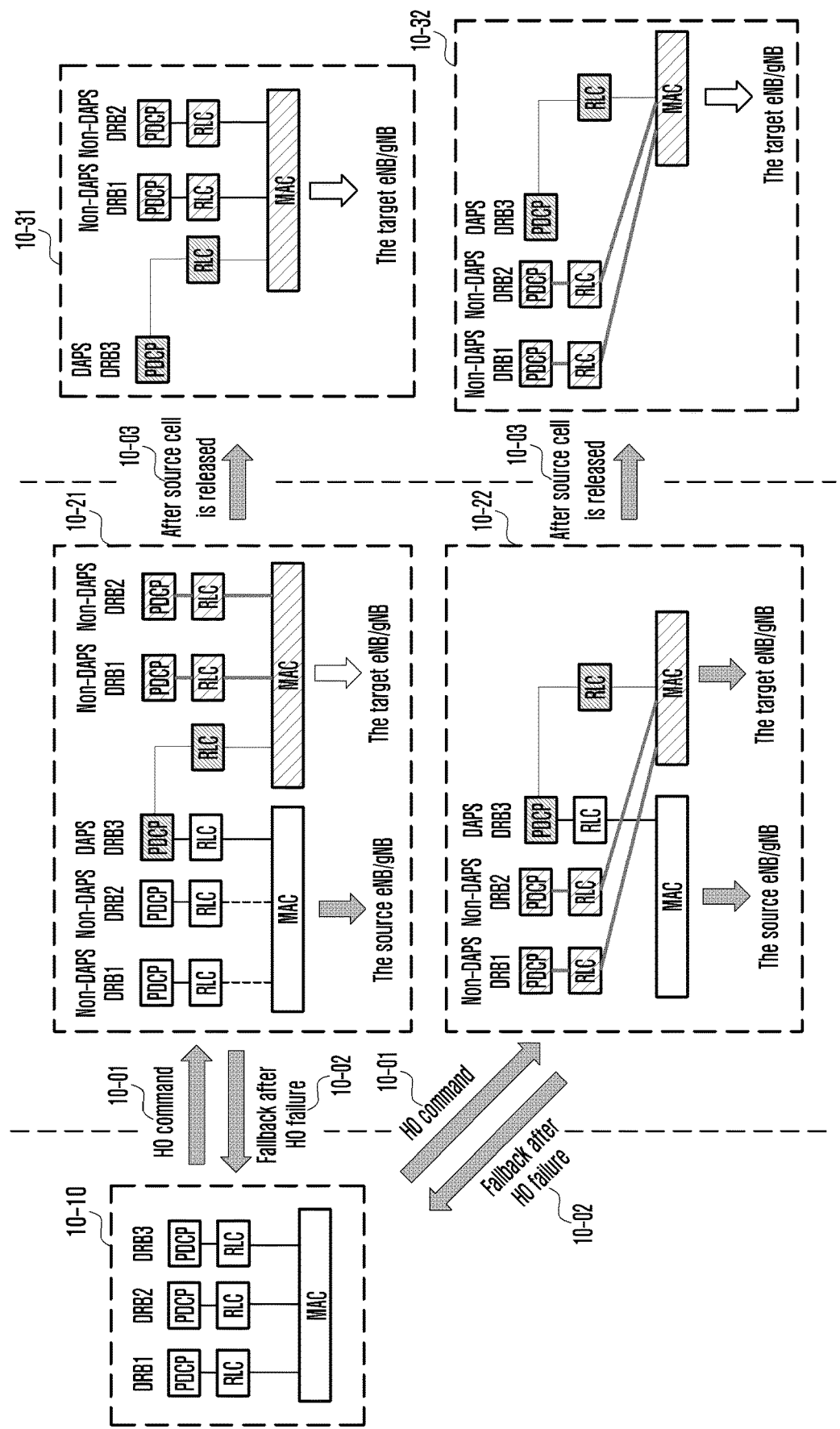
FIG. 10 illustrates a method of applying configuration information for each bearer when a DAPS handover method is configured according to an embodiment of the disclosure.

Method 1, method 2, or method 3 for configuring the MAC layer device of FIG. 10 of the disclosure may be performed.

Method 1 method 2, or method 3 for configuring the MAC layer device of FIG. 10 may be performed, and data transmission or reception may be continuously performed for bearers for which the DAPS handover method is indicated or configured in the MAC layer device, the MAC layer device is not initialized, and data transmission or reception may be stopped for bearers for which the DAPS handover method is not indicated or not configured.

In the above, the MAC layer device for the source base station is not initialized, and monitoring the PDCCH for the first UE identifier (C-RNTI) allocated from the source base station may be continuously performed. In addition, the MAC layer device for the source base station may continue to perform a procedure of requesting scheduling from the source base station. In addition, the PHY or MAC layer device for the target base station may apply configuration by using configuration information to be received through the handover command message and perform a procedure of random access to the target base station. The PHY or MAC layer device for the target base station may start data transmission or reception to or from the target base station if the procedure of handover to the target base station is successfully completed, and may start monitoring the PDCCH for the second UE identifier (C-RNTI) allocated from the target base station. In addition, the PHY or MAC layer device may receive a system frame number from the target base station and perform synchronization. In addition, the PHY or MAC layer device for the target base station may initiate or perform a procedure of requesting scheduling from the target base station. The UE may monitor the PDCCH for the first UE identifier allocated from the source base station in the PHY or MAC layer device for the source base station until the connection with the source base station is released or the second condition described in this disclosure is satisfied, and may monitor the PDCCH for the second UE identifier allocated from the target base station in the PHY or MAC layer device for the target base station. As described above, if the connection with the source base station is released or the second condition described in this disclosure is satisfied, the UE may stop monitoring the PDCCH for the first UE identifier allocated from the source base station in the PHY or MAC layer device for the source base station, or may release a transmission resource for a scheduling request.

The PHY layer device for the source base station may maintain configuration information, perform a channel measurement for the source base station, perform a channel measurement report, or continue to perform a procedure of transmitting HARQ ACK or NACK. In addition, the PHY or MAC layer device for the target base station performs a downlink synchronization procedure for the target base station. In addition, configuration information for the target base station (or Spcell or Pcell), received through the handover command message, may be configured in a lower layer device or a PHY layer device for the target base station. The PHY or MAC layer device for the target base station may start transmission of HARQ ACK or NACK information to the target base station or may perform transmission thereof, if the procedure of handover to the target base station is successfully completed. In addition, the PHY or MAC layer device for the target base station may receive a system frame number from the target base station and perform synchronization. In addition, the PHY or MAC layer device for the target base station may initiate or perform a procedure of requesting scheduling from the target base station, a procedure of performing channel measurement, or a procedure of reporting a result of channel measurement. The UE may monitor the PDCCH for the first UE identifier allocated from the source base station in the PHY or MAC layer device for the source base station until the connection with the source base station is released or the second condition described in this disclosure is satisfied, and may monitor the PDCCH for the second UE identifier allocated from the target base station in the PHY or MAC layer device for the target base station. In the above, if the connection with the source base station is released or the second condition described in this disclosure is satisfied, the UE stops monitoring the PDCCH for the first UE identifier allocated from the source base station in the PHY or MAC layer device for the source base station, or may release a transmission resource for a scheduling request.

Method 1, method 2, or method 3 for configuring or processing the SRB of FIG. 10 of the disclosure may be performed.

When a second priority for a logical channel is newly configured in the MAC layer device configuration information configured through the handover command message, the DAPS handover method of the disclosure may be performed. In addition, the second PDCP layer device structure is applied, the existing configuration information is maintained for the MAC layer device of the first bearer for the source base station corresponding to the bearer identifier indicated above, and a new logical channel identifier, which is indicated in the configuration information, may be configured for the MAC layer device of the second bearer for the target base station and a newly configured second prioritized bit rate corresponding to the logical channel identifier indicated in the configuration information may be applied thereto. As another method, when the first condition described in the disclosure is satisfied, the priority may be applied to the MAC layer device of the second bearer for the target base station for each logical channel identifier.

When the second PBR for a logical channel is newly configured in the MAC layer device configuration information configured through the handover command message, the DAPS handover method of the disclosure may be performed. In addition, the second PDCP layer device structure is applied, the existing configuration information is maintained for the MAC layer device of the first bearer for the source base station corresponding to the bearer identifier indicated above, and a new logical channel identifier, which is indicated in the configuration information, may be configured for the MAC layer device of the second bearer for the target base station and a newly configured second prioritized bit rate corresponding to the logical channel identifier indicated in the configuration information may be applied thereto. As another method, the second prioritized bit rate may be started to be applied to the logical channel identifier in the MAC layer device of the second bearer for the target base station from the time when the first condition described in the disclosure is satisfied (Accordingly, when different handover methods are indicated for each bearer, uplink transmission resources can be fairly distributed). The prioritized bit rate is a value that increases for each logical channel for a predetermined time (for example, every TTI) when starting to be applied to each logical channel identifier, and when an uplink transmission resource is received, a logical channel prioritization (LCP) procedure is performed, data for the logical channel may be transmitted by considering the priority and the prioritized bit rate, and the higher the priority or the greater the value of the prioritized bit rate, the more data may be transmitted.

In addition, when applying the DAPS handover method above, if the UE needs to transmit uplink data through the first bearer for the source base station because the first condition described in the disclosure is not yet satisfied, the MAC layer device of the first bearer selects, as a target of the LCP procedure, only bearers or logical channel identifiers for which the DAPS handover method (or a handover method for continuing data transmission to the source base station even after receiving the handover command message) is indicated during the LCP procedure, and performs the LCP procedure thereof. Bearers or logical channel identifiers for which the DAPS handover method is not applied should not be selected as a target of the LCP procedure because uplink data cannot be transmitted to the source base station upon receiving the handover command message.

When a second bucket size (bucketSizeDuration) for a logical channel is newly configured in the MAC layer device configuration information configured through the handover command message, the DAPS handover method of the disclosure is performed, the second PDCP layer device structure is applied, the existing configuration information is maintained for the MAC layer device of the first bearer for the source base station corresponding to the bearer identifier indicated above, a new logical channel identifier indicated by the configuration information may be configured for the MAC layer device of the second bearer for the target base station, and the newly configured second bucket size corresponding to the logical channel identifier indicated by the configuration information may be configured. As another method, the second bucket size can be started to be applied to the logical channel identifier in the MAC layer device of the second bearer for the target base station from the time when the first condition described in the disclosure is satisfied (Accordingly, when different handover methods are indicated for each bearer, uplink transmission resources can be fairly distributed). The bucket size indicates a maximum value that the prioritized bit rate may have when the prioritized bit rate is accumulated.

If second allowed SCell information, allowed subcarrier spacing information, a maximum PUSCH period, or logical channel group configuration information are configured in the MAC layer device configuration information configured through the handover command message, the DAPS handover method described above in this disclosure is performed. In addition, the second PDCP layer device structure is applied, the existing configuration information is maintained for the MAC layer device of the first bearer for the source base station corresponding to the bearer identifier indicated above, and the second allowed SCell information, allowed subcarrier spacing information, maximum PUSCH period, or logical channel group configuration information, which are indicated in the configuration information, may be configured for the MAC layer device of the second bearer for the target base station.

FIG. 10 illustrates a method of applying configuration information for each bearer when a DAPS handover method is configured according to an embodiment of the disclosure.

Referring to FIG. 10, when the UE receives a handover command message (indicated by reference numeral 10-01), if a second handover method (for example, the second embodiment or DAPS handover method of the disclosure) is indicated through ReconfigWithSync information, if the DAPS handover method is indicated for each bearer identifier or logical channel identifier, if the DAPS handover method is configured for at least one bearer, or if the DAPS handover method is configured for a predetermined bearer, the UE may generate or establish a MAC layer device for the target base station (or a target cell) at a time when the handover command message is received, and the UE may continue to transmit or receive data to or from a source base station with respect to only bearers (AM bearer or UM bearer) for which the DAPS handover method is indicated, through an MAC layer device for the source base station (or source cell), until the first condition described in this disclosure is satisfied from the time when the handover command message is received. In addition, the UE may, when the first condition is satisfied, switch uplink data to a target base station, and may receive downlink data from the source base station until the connection with the source base station is released. However, for bearers for which the DAPS handover method is not indicated above, the UE may not transmit or receive data to or from the source base station until the first condition described in the disclosure is satisfied from the time when the handover command message is received or may no longer continue to transmit or receive data to or from the source base station. Accordingly, the following method may be applied to the UE to perform the operation of the disclosure, and may be modeled as shown in reference numeral 10-21 or 10-22. In addition, if the second condition described in the disclosure is satisfied and thus the source base station is released, the method may be modeled as shown in reference numeral 10-31 or 10-32.

As suggested in the disclosure, when the UE receives a handover command message, if a second handover method (for example, the second embodiment or DAPS handover method of the disclosure) is indicated through ReconfigWithSync information, if the DAPS handover method is indicated for each bearer identifier or logical channel identifier, if the DAPS handover method is configured for at least one bearer, or if the DAPS handover method is configured for a predetermined bearer, the UE may suspend SRBs configured for the MAC layer device for the source base station. In addition, a higher layer device (for example, an RRC layer device) of the UE may instruct the MAC layer device for the source base station to perform reconfiguration (MAC reconfiguration) by using configuration information, which is obtained by excluding configuration information related to the bearer for which the DAPS handover method is not indicated through the handover command message from the configuration information of the current MAC layer device. As another method, the higher layer device (for example, the RRC layer device) of the UE may instruct the MAC layer device for the source base station to perform reconfiguration (MAC reconfiguration) by using configuration information, which is obtained by including only configuration information related to the bearer for which the DAPS handover method is indicated through the handover command message in the configuration information of the current MAC layer device. In the above, if the UE reconfigures the MAC layer device for the source base station, the MAC layer device for the source base station of the UE may maintain logical channel identifiers for which the DAPS handover method is indicated or a priority bit rate or bucket size corresponding to the logical channel identifiers, and may release, or no longer use or apply logical channel identifiers corresponding to bearers for which the DAPS handover method is not indicated or a priority bit rate or bucket size corresponding to the logical channel identifiers. In addition, the higher layer device (for example, the RRC layer device) of the UE may perform, for a bearer for which the DAPS handover method is not indicated above, a PDCP re-establishment procedure or an RLC re-establishment procedure; may apply PDCP configuration information or RLC configuration information configured through the handover message or suspend the bearer; may suspend the bearer in the MAC layer device for the source base station; may configure the PDCP configuration information or RLC configuration information in the MAC layer device for the target base station (when the first condition is satisfied, the PDCP configuration information or RLC configuration information may be configured in the MAC layer device for the target base station); may indicate the MAC layer device for the target base station to configure or apply bearer configuration information, such as a logical channel identifier or priority bit rate or bucket size configured for the target base station, to the MAC layer device for the target base station with respect to a bearer for which the DAPS handover method is not indicated through the handover command message; and may switch the connection of the PDCP layer device or the RLC layer device with the MAC layer device for the source base station, the PDCP layer device or the RLC layer device corresponding to a bearer for which the DAPS handover method is not indicated, to the connection of the PDCP layer device or the RLC layer with the MAC layer device for the target base station. Then, for example, from that time point, when a logical channel prioritization (LCP) procedure for data transmission is performed, the MAC layer device for the source base station of the UE may select, as a candidate group, only logical channel identifiers corresponding to the bearer for which the DAPS handover method is indicated and perform the LCP procedure thereof. In the above, a procedure of reconfiguring the MAC layer device for the source base station by the higher layer device (for example, the RRC layer device) enables partial initialization of the MAC layer device (partial MAC reset) for the source base station to perform the same procedure. For example, the configuration information of the MAC layer device for a bearer for which the DAPS handover method is not indicated above may be initialized, released, or application thereof may be suspended. In addition, data transmission or reception to or from the source base station may be performed until the first condition described in the disclosure is satisfied. For the logical channel identifier corresponding to the bearer for which the DAPS handover method is not indicated above, the MAC layer device for the source base station may initialize the priority bit rate and release or suspend the bearer without further applying a procedure of calculating the priority bit rate accumulation. In addition, for a logical channel identifier corresponding to a bearer for which the DAPS handover method is indicated, the MAC layer device for the source base station may continue to maintain the priority bit rate and perform the accumulation calculation procedure. If the first condition is satisfied, data transmission is switched to the target base station, and the MAC layer device for the target base station may initialize the priority bit rate for newly configured logical channel identifiers (logical channel identifies corresponding to a bearer in which a DAPS handover method is indicated or a bearer in which the DAPS handover method is not indicated), or may start accumulation calculation (in another way, when a handover command message is received for the MAC layer device for the target base station, the priority bit rate is initialized and accumulation calculation may start). If bearers for which the DAPS handover method is not indicated in the above are configured or suspended, the MAC layer device for the target base station may configure or resume the bearers to perform data transmission or reception to or from the target base station, and may initialize the prioritized bit rate or start accumulation calculations. In addition, until the second condition described in the disclosure is satisfied, data reception from the source base station or the target base station is performed, and when the second condition is satisfied (indicated by reference numeral 10-03), the MAC layer device for the source base station is initialized, the RLC layer device, PDCP layer device, or bearer configuration information corresponding to a bearer for which the DAPS handover method is not indicated may be released from the MAC layer device for the source base station, and the RLC layer device or bearer configuration information corresponding to the bearer for which the DAPS handover method is indicated may be released from the structure of the second PDCP layer device or the MAC layer device for the source base station (indicated by reference numeral 10-31 or 10-32). If the handover procedure fails and the connection with the source base station is valid, as described herein below in the disclosure, the UE may perform a procedure of fallback to the source base station (indicated by reference numeral 10-02), may resume the SRB configured in the MAC layer device of the source base station and report the handover failure, may apply the existing bearer configuration information of the source base station before receiving the handover command message again and apply the configuration information of the original MAC layer device (for example, the RRC layer device may reconfigure MAC layer device configuration information used before receiving the handover command message), and may resume data transmission or reception to or from the source base station for each bearer (indicated by reference numeral 10-10). As another method, the higher layer device (for example, the RRC layer device) of the UE may indicate the RLC re-establishment procedure for the bearer for which the DAPS handover method is indicated or the bearer in which the DAPS handover method is not indicated. As another method, in the above, configuration information of the MAC layer device for the source base station, to be applied when the source base station performs the DAPS handover method, may be configured through an RRC message.

In the methods of the disclosure, when the UE receives a handover command message, if a second handover method (for example, the second embodiment or DAPS handover method of the disclosure) is indicated through ReconfigWithSync information, if the DAPS handover method is indicated for each bearer identifier or logical channel identifier, if the DAPS handover method is configured for at least one bearer, or if the DAPS handover method is configured for a predetermined bearer, the UE may apply SRBs, which are configured in the MAC layer device for the source base station, by using one method or a plurality of methods among the following methods.

When the UE receives a handover command message, if a second handover method (for example, the second embodiment or DAPS handover method of the disclosure) is indicated through ReconfigWithSync information, if the DAPS handover method is indicated for each bearer identifier or logical channel identifier, if the DAPS handover method is configured for at least one bearer, or if the DAPS handover method is configured for a predetermined bearer, Method 1: SRB may be suspended in the MAC layer device for the source base station. Alternatively, window state variables may be initialized by performing the re-establishment procedure of the RLC layer device of the SRBs or the re-establishment procedure of the PDCP layer device, and stored data (PDCP SDU, PDCP PDU, RLC SDU, or RLC PDU) may be discarded. Alternatively, SRBs may be configured in the MAC layer device for the target base station according to the configuration received through the handover message. Alternatively, the SRBs of the MAC layer device for the source base station may be configured according to the configuration received through the handover message, and may be switched and connected to the MAC layer device for the target base station. If the UE fails the handover procedure and performs the fallback procedure, the SRBs, which are suspended in the MAC layer device for the source base station, may be resumed or the SRBs configured for the target base station may be reconfigured by the existing configuration for the source base station and switched and connected to the MAC layer device for the source base station to be resumed.

Method 2: The SRB may be suspended in the MAC layer device for the source base station. Alternatively, the re-establishment procedure of the RLC layer device of the SRBs or the re-establishment procedure of the PDCP layer device may be suspended without performing thereof. Alternatively, SRBs may be configured in the MAC layer device for the target base station according to the configuration received through the handover message. As another method, the SRBs of the MAC layer device for the source base station may be configured according to the configuration received through the handover message, and may be switched and connected to the MAC layer device for the target base station. If the UE fails a handover procedure and performs a fallback procedure, SRBs suspended in the MAC layer device for the source base station may be resumed or SRBs configured for the target base station may be reconfigured using the existing configuration for the source base station, and switched and connected to the MAC layer device for the source base station to be resumed.

Method 3: The SRB may be suspended in the MAC layer device for the source base station. Alternatively, the re-establishment procedure of the RLC layer device of the SRBs or the re-establishment procedure of the PDCP layer device may not be performed, and window state variables are not initialized but stored data (PDCP SDU, PDCP PDU, RLC SDU, or RLC PDU) may be discarded (in order to prevent RRC messages, which are not transmitted, from being transmitted unnecessarily later). Alternatively, SRBs may be configured in the MAC layer device for the target base station according to the configuration received through the handover message. As another method, the SRBs of the MAC layer device for the source base station may be configured according to the configuration received through the handover message, and may be switched and connected to the MAC layer device for the target base station. If the UE fails a handover procedure and performs a fallback procedure, the SRBs suspended in the MAC layer device for the source base station may be resumed or the SRBs configured for the target base station may be reconfigured using the existing configuration for the source base station, and may be switched and connected to the MAC layer device for the source base station to be resumed. In addition, according to the procedure for the SRBs, specifically, SRBs for the source base station are allowed to be suspended or SRBs configured for the target base station are enabled such that, in order to solve the security issue occurring by reusing the same count value from the beginning when performing the DAPS handover fallback procedure as described above, the existing count value of the SRBs for the source base station or transmission or reception window variable values thereof are applied or maintained for the SRBs established for the target base station (or the count value of the SRBs of the source base station or transmission or reception window variable values thereof may be configured as a count value of SRBs of the target base station or a transmission or reception window variable values thereof). In addition, for the SRBs for the target base station, the security key for the target base station may be derived or the derived security key may be applied, and the PDCP layer device of the SRBs may apply the security key for the target base station to perform ciphering or deciphering, or an integrity protection or verification procedure. In addition, for SRBs for the source base station, old data (e.g., RRC messages for the source base station) may be discarded. The procedure for the SRB for the target base station may be defined as a new procedure (e.g., DAPS SRB establishment or PDCP layer device re-establishment procedure) and indicated, triggered, or performed, and the procedure for the SRB may be extended and applied in the same manner as that of a UM DRB or AM DRB in which the DAPS handover method is not configured. More specifically, if the UE fails a handover procedure and performs a fallback procedure, and SRBs for the source base station may be resumed or SRBs for the target base station may be released. As another method, the target base station is enabled such that, in order to solve the security issue occurring by using the same count value from the beginning, the existing count value of SRBs for the target base station or the transmission or reception window variable values thereof are applied or maintained for SRBs for the source base station (alternatively, the count value of the SRBs of the target base station or the transmission or reception window variable values thereof may be configured as the count value of the SRBs of the source base station or the transmission or reception window variable values thereof), and the SRBs for the target base station may be released. In addition, the security key for the source base station may be applied to the SRBs for the source base station, and the PDCP layer device of the SRBs applies the security key for the source base station to perform ciphering or deciphering, or an integrity protection or verification procedure. Also, for SRBs for the source base station, old data (e.g., RRC message for the source base station) may be discarded. The procedure for the SRB may be extended and applied in the same manner as that of a UM DRB or AM DRB in which the DAPS handover method is not configured.

Herein below in the disclosure, when the UE performs the second embodiment (DAPS handover method) of the efficient handover method of the disclosure, if the UE fails in handover, a method is provided for quickly falling back to the source base station and re-establishing a connection by using the characteristics of the DAPS handover method of the above. In the above, the characteristics of the DAPS handover method of the disclosure specifically refers to performing data transmission or reception by maintaining a connection with the source base station even when performing a handover procedure. In addition, in the following of the disclosure, a handover method is provided for performing fallback by using a wireless connection established with the existing source base station even if the handover fails.

In the second embodiment (DAPS handover method) of the efficient handover method as described in FIG. 8 of the disclosure, even if the handover command message is received from the source base station, a procedure of handover to the target base station is performed while maintaining data transmission or reception to or from the source base station of reference numeral 8-02. In addition, the disclosure proposes, when the procedure of handover to the target base station fails in the above, a procedure for falling back to the source base station.

If the UE fails the procedure of handover to the target base station as suggested above, in order to fall back to the source base station, a method for identifying whether a wireless connection between the UE and the source base station is valid is needed. This is because if the UE fails to handover and performs a fallback to the source base station when the wireless connection between the UE and the source base station is not valid, the fallback procedure to the source base station also fails, resulting in a very-long data interruption time, leading to a significant data loss. In addition, when the wireless connection between the UE and the source base station is valid, the SRB configured in the UE and the source base station needs to be maintained.

First, the disclosure proposes new timers applicable to the handover method, and proposes specific operations of each timer. In addition, specific operations of the timer may include performing different operations according to the type of handover method indicated through the handover command message by the base station. In addition, a method of releasing or maintaining connection with the source base station or SRB configuration according to the handover method is provided.

The disclosure introduces, in order to efficiently perform a handover procedure, a first timer (for example, T304), a second timer (for example, T310), a third timer (for example, T312), or a fourth timer (for example, a timer for fallback), and runs and applies the timers in the handover procedure. The first timer (for example, T304), the second timer (for example, T310), the third timer (for example, T312), or the fourth timer (for example, a timer for fallback) of the disclosure perform different operations as follows according to the type of handover method indicated through the handover command message. In the above, the first timer (for example, T304) is a timer for determining whether the handover has been successfully performed, the second timer (for example, T310) is a timer for determining whether the wireless connection is valid, and the third timer (for example, T312) is an auxiliary timer for determining whether the wireless connection is valid and is a timer for triggering a frequency measurement procedure and reporting a frequency measurement result. In addition, the fourth timer (for example, a timer for fallback) is a timer for, when handover fails while performing the second embodiment (DAPS handover method) of the efficient handover method of the disclosure, transmitting a message indicating that the handover has failed to the source base station by performing a procedure of fallback to the source base station and then determining whether the fallback procedure has been successfully performed or has failed.

Specific operations of the first timer (for example, T304), the second timer (for example, T310), the third timer (for example, T312), or the fourth timer (for example, a timer for fallback) of order to support an efficient handover method in the disclosure are described as follows according to the indicated handover method.

1> If the UE receives, from a lower layer device (e.g., a MAC layer device or a PHY layer device), an indicator (out-of-sync indication) indicating that wireless connection signals are not synchronized a predetermined number of times (for example, the base station configures the same), and thus detects that a problem exists in the physical layer device, the UE may start the second timer (for example, T310) when the first timer is not running. In addition, when the UE receives an indicator (in-sync indication) indicating that wireless connection signals are synchronizing well from the lower layer device a predetermined number of times (for example, the base station configures the same), when the handover procedure is triggered (started), or when an RRC connection re-establishment procedure is started, the second timer is interrupted. If the second timer expires, the UE triggers or starts an RRC connection re-establishment procedure. Alternatively, the UE transitions to an RRC idle mode, and triggers or starts the RRC connection re-establishment procedure.

1> When the second timer is running, the UE starts the third timer when a frequency measurement procedure is triggered for a frequency measurement identifier for which the third timer is configured. In addition, when the UE receives an indicator (in-sync indication) that the wireless connection signals are synchronizing well from the lower layer device a predetermined number of times (for example, the base station may configure the same), when the handover procedure is triggered (when the handover procedure is started), or when the RRC connection re-establishment procedure is started, the UE may interrupt the third timer. If the third timer expires, the UE triggers or starts an RRC connection re-establishment procedure. Alternatively, the UE transitions to the RRC idle mode and triggers or starts an RRC connection re-establishment procedure.

1> If the UE indicates a first handover method (for example, the first embodiment of the disclosure or general handover method) through a handover command message (a message obtained by including a mobility indication (MobilityControl info or ReconfigurationWithSync) or a handover indication in the RRCReconfiguration message), which is received from a base station, when the UE receives the handover command message, the first handover method (for example, the first embodiment of the disclosure or general handover method) is indicated through the handover command message, ReconfigWithSync information, or MobilityControlInfo information, if the second embodiment (DAPS handover method) of this disclosure is not configured, or the second embodiment (DAPS handover method)

of this disclosure is not configured for a predetermined bearer through the bearer configuration information, 2> In the disclosure, upon receiving a handover command message (a message obtained by including mobility indication (mobility control info or ReconfigurationWithSync) or handover indication in the RRCReconfiguration message), the UE triggers a handover procedure and starts a first timer.

2> When triggering the handover procedure in the above, the UE releases an SRB (for example, SRB1) configured for the source base station, and configures an SRB for the target base station (for example, SRB1) based on the configuration information configured in the handover command message).

2> When triggering the handover procedure in the above, the UE may interrupt the second timer if the second timer is running. In addition, when the first timer is running, a second timer is not started even when the condition of starting the second timer (when an asynchronous indicator of a wireless connection signal is received from a lower layer a predetermined number of times) is satisfied. That is, when the first timer is running, the second timer is not used.

2> When triggering the handover procedure in the above, the UE may interrupt a third timer if the third timer is running. In addition, the third timer is started when the condition of starting the third timer only when the second timer is running (when a frequency measurement procedure is triggered for a frequency measurement identifier for which the third timer is configured) is satisfied. That is, since the second timer is not used when the first timer is running, the third timer is also not used.

2> In the above, if the procedure of handover to the target base station or the random access procedure is successfully completed, the UE interrupts the first timer.

2> If the first timer expires in the above (for example, if the procedure of handover to the target base station fails), the UE performs an RRC connection re-establishment procedure (may release the connection with the base station, and perform the RRC connection procedure from the beginning again, that is, perform a cell selection or reselection procedure, perform a random access procedure, and transmit an RRC connection re-establishment request message).

1> In a case where the UE indicates a second handover method (for example, the second embodiment or the DAPS handover method) through a handover command message (a message obtained by including a mobility indication (MobilityControl info or ReconfigurationWithSync) or a handover indication in the RRCReconfiguration message), which is received from a base station, (or may be extended and applied to a case where the UE indicates a conditional handover method together); if the UE receives the handover command message, the second embodiment (the DAPS handover method) of the disclosure is configured through the handover command message, ReconfigWithSync information, or MobilityControlInfo information; if the second embodiment (DAPS handover method) of this disclosure is configured for a predetermined bearer through bearer configuration information; or if the second embodiment (DAPS handover method) of this disclosure is configured for at least one bearer through the bearer configuration information.

2> In the disclosure, the UE triggers a handover procedure and starts a first timer upon receiving a handover command message (a message including a mobility indication (MobilityControl info or ReconfigurationWithSync) or a handover indication in the RRCReconfiguration message). If the conditional handover method is indicated together, the UE may start the first timer when selecting one cell among a plurality of target cells and starting a handover procedure or performing a random access procedure.

2> If the DAPS handover method is started when triggering the handover procedure in the above, the UE maintains or suspends the SRB (e.g., SRB1) configured for the source base station, and configures the SRB (for example, SRB1) for the target base station based on the configuration information configured in the handover command message. As another method, if the DAPS handover method is started when triggering the handover procedure in the above, the UE: may maintain or suspend an SRB (e.g., SRB1) configured for the source base station, and for the SRB for the source base station, re-establish a PDCP layer device or re-establish an RLC layer device to initialize a window state variable or interrupt a timer; may indicate to discard stored data (PDCP SDU or PDCP PDU) (that may be performed when the fallback procedure of this disclosure is triggered); and may configure an SRB (for example, SRB1) for the target base station based on the configuration information configured through the handover command message. As another method, the UE may configure a first bearer for a source base station and a second bearer for a target base station by applying the second PDCP layer device structure of the disclosure to the SRB. As another method, when the second PDCP layer device structure is applied to the SRB, the UE may re-establish the PDCP layer device for the first bearer or re-establish the RLC layer device to initialize the window state variable, interrupt the timer, and indicate to discard stored data (PDCP SDU or PDCP PDU) (that may be performed when the fallback procedure of the disclosure is triggered). That is, as another method, when the fallback procedure of the disclosure is triggered, the UE may perform a procedure of discarding data (e.g., old RRC messages) remaining in the SRB for the source base station or stored in a buffer, or may trigger or instruct the higher layer device (e.g., RRC layer device) of the UE to discard data (e.g., old RRC messages) remaining in the PDCP layer device for the SRB or stored in a buffer. This is because old RRC messages should be prevented from being transmitted to the source base station.

2> If the DAPS handover method is triggered when triggering the handover procedure in the above, the UE may not interrupt the second timer for the source base station even if the second timer for the source base station is running. In addition, when the condition of starting the second timer even when the first timer is running (or when the first timer is not running) is satisfied (when an asynchronous indicator of a wireless connection signal is received from a lower layer a predetermined number of times), the UE starts the second timer. The second timer may operate for wireless connection between the UE and the source base station. As another method, two second timers are operated, one second timer is operated for the wireless connection between the UE and the source base station, and another second timer is operated for the wireless connection between the UE and the target base station. That is, even when the first timer is running, the second timer may be used for wireless connection with the source base station or the target base station. However, even when the second timer expires, if the first timer does not expire and is running, the UE may not trigger an RRC connection re-establishment procedure. That is, specifically, even if the second timer for the source base station expires or a radio connection failure (RLF) occurs in the above, if the first timer is not expired and is running, a procedure of random access to the target base station is being performed, or a procedure of handover to the target base station is being performed, the UE may release the radio connection with the source base station without triggering the RRC connection re-establishment procedure. In addition, the UE may not release RRC configuration information (e.g., bearer configuration information etc.) configured by the source base station and may reuse the same if the RRC connection re-establishment procedure is triggered later. In addition, even if the second timer expires, if the first timer does not expire and is running, the UE does not trigger the RRC connection re-establishment procedure, and may transmit a report indicating that the wireless connection with the source base station has failed to the source base station or target base station, or the UE may release the connection with the source base station (e.g., first bearers for the source base station may be released) or suspends the first bearers for the source base station. However, when the second timer expires, if the first timer expires or has been interrupted, or if the first timer is not driven because it is not started, the UE may trigger the RRC connection re-establishment procedure. The reason for operating the second timer even when the handover procedure is performed is to enable the fallback procedure to be performed in a case where the wireless connection with the source base station or the target base station is valid when a handover failure occurs as a result of monitoring the wireless connection between the UE and the source base station. In addition, when the second timer for the target base station in the above expires or when the wireless connection with the target base station fails, if the first timer has expired, has been interrupted, or has not started and thus is not running, or a procedure of random access to the target base station has been successfully performed, the UE may trigger an RRC connection re-establishment procedure.

2> If the DAPS handover method is triggered when triggering the handover procedure in the above, the UE does not interrupt the third timer for the source base station even if the third timer is running. In addition, when the condition of starting the third timer only when the second timer is running is satisfied (when the frequency measurement procedure is triggered for the frequency measurement identifier for which the third timer is configured), the third timer is started. That is, since the second timer is used even when the first timer is running, the third timer may also be used. The third timer may operate for wireless connection between the UE and the source base station. In another method, two third timers are operated, one third timer may operate for the wireless connection between the UE and the source base station, and another third timer may operate for the wireless connection between the UE and the target base station. That is, even when the first timer is running, the third timer may be used for wireless connection with the source base station or the target base station. However, if the first timer does not expire and is running even if the third timer expires, the UE may not trigger an RRC connection re-establishment procedure. In addition, if the first timer does not expire and is running even if the third timer expires, the UE does not trigger the RRC connection re-establishment procedure, and may transmit, to the source base station or target base station, a report indicating that the connection with the source base station has failed, and release the connection with the source base station (for example, first bearers for the source base station may be released) or suspend the first bearers for the source base station. However, if the first timer expires or is interrupted when the third timer expires, or if the first timer is not driven because it is not started, the UE may trigger the RRC connection re-establishment procedure. The reason for operating the third timer even when performing the handover procedure in the above is to enable the fallback procedure to be performed in a case where the wireless connection with the source base station is valid when a handover failure occurs as a result of monitoring the wireless connection between the UE and the source base station, and is to enable a result of frequency measurement to be reported in the fallback procedure.

2> In the above, if the procedure of handover to the target base station is successfully completed, the UE interrupts the first timer.

2> In the above, if the first timer expires (for example, if the procedure of handover to the target base station has failed); if the number of retransmissions to the target base station in the RLC layer device exceeds the maximum number of retransmissions; when a handover command message is received in the above, if the UE fails the handover because the configuration information of the handover command message has a value exceeding the UE capability or an error occurs in the application of the configuration information; if a problem in performing random access to the target base station occurs, and the handover procedure fails because the first timer expires although the UE continues to attempt the random access procedure; or if the second timer or the third timer is driven for the target base station above, the second timer or the third timer expires before the handover procedure is completed, the T304 timer is interrupted or expired, and if it is determined that the handover procedure has failed, 3> If the second timer or the third timer for the wireless connection between the UE and the source base station in the above has not expired (or the second timer or the third timer for the wireless connection between the UE and the source base station is not started or is running), or if the wireless connection between the UE and the source base station is valid, 4> The UE may determine that the wireless connection between the UE and the source base station is valid and perform the fallback procedure of this disclosure.

4> In the above, if the SRB (e.g., SRB1, or MAC, RLC, or PDCP layer device of SRB1), which is configured for the source base station, is suspended when starting the fallback procedure, the UE resumes or newly configures the SRB and perform a procedure of fallback to the SRB (for example, SRB1). As another method, if the second PDCP layer device structure of the disclosure is applied to the SRB, the UE may perform a fallback procedure through the first bearer for the source base station, and may release the second bearer for the target base station. For example, the UE may switch uplink data transmission to the first bearer for the source base station, indicate that there is data to be transmitted to the RLC layer device or the MAC layer device of the first bearer, and transmit a message for reporting failure of a handover for the fallback procedure through the first bearer. In addition, when the fallback procedure is triggered in the above, the UE performs a procedure of discarding data (e.g., old RRC messages) remaining in the SRB for the source base station or stored in the buffer, or may trigger or instruct the higher layer device (e.g., RRC layer device) of the UE to discard data (e.g., old RRC messages) remaining in the PDCP layer device for the SRB or stored in a buffer. This is because old RRC messages should be prevented from being transmitted to the source base station.

4> In the above, the fallback procedure is to report the handover failure to the source base station by configuring a report message indicating that the handover has failed through the SRB (for example, SRB1) configured with the source base station. In the above, when the UE transmits, to the source base station, the report message indicating that the handover has failed, a result of frequency measurement measured by the UE is also reported, thereby helping to quickly recover the connection with the source base station. As another method, the UE may define and transmit MAC control information (for example, the UE may indicate that the handover has failed by indicating that there is new MAC control information or data to be transmitted for buffer status report or by defining and indicating a special value), RLC control information, or PDCP control information so as to transmit an indication that the handover has failed to the source base station. As another method, the UE may transmit the RRC connection re-establishment request message to the SRB (e.g., SRB0 or SRB1) for the source base station in the above. As another method, the fallback procedure in the above may be a procedure of releasing the second bearer for the target base station for each bearer or in the second PDCP layer device structure of a bearer in which the DAPS handover method is configured when the handover fails, or resuming data transmission or reception through the first bearer for the source base station by the UE after switching to the first PDCP layer device structure. The UE may transmit an indication indicating that there is data to be transmitted to the MAC layer device of the first bearer, request scheduling from the source base station or report, to the source base station, that there is data to be transmitted (e.g., buffer status report), or transmit new MAC CE, RLC control data, or PDCP control data to fall back to the source base station and thus transmit an indication indicating that data transmission is to be started again to the source base station. In addition, the UE may newly configure or resume the SRB for the source base station. In addition, the fallback procedure in the above has been previously configured for each bearer when the handover fails or bearers for which the DAPS handover method is not configured because the bearers do not have a second PDCP layer device structure, and the UE may release the PDCP layer device, RLC layer device, bearer configuration information, or logical channel identifier information, reconfigured through the configuration information of the handover command message, from the MAC layer device for the target base station, and may switch and connect to the MAC layer device for the source base station to resume data transmission or reception for each bearer to or from the source base station. This is because, for a bearer in which the DAPS handover method is not indicated when receiving the handover command message, the UE may apply the bearer configuration information configured in the handover command message to the MAC layer device for the target base station, and may switch the connection of the MAC layer device for the source base station with the PDCP layer device or the RLC layer device corresponding to the bearer in which the DAPS handover method is not indicated to the connection of the MAC layer device for the target base station with the PDCP layer device or the RLC layer device. For example, when receiving the handover command message, the higher layer device (for example, the RRC layer device) of the UE may instruct the MAC layer device for the source base station to perform reconfiguration (MAC reconfiguration) by using configuration information, which is obtained by excluding configuration information related to the bearer for which the DAPS handover method is not indicated through the handover command message from the configuration information of the current MAC layer device. Alternatively, the higher layer device (for example, the RRC layer device) of the UE may instruct the MAC layer device for the source base station to perform reconfiguration (MAC reconfiguration) by using configuration information, which is obtained by including only configuration information related to the bearer for which the DAPS handover method is indicated through the handover command message in the configuration information of the current MAC layer device. That is, when the handover command message is received, since the configuration information of the PDCP layer device, RLC layer device, or MAC layer device of a bearer for which the DAPS handover method is not indicated may be released from the MAC layer device for the source base station, and the configuration information may be applied or connected to the MAC layer device for the target base station according to the bearer configuration for the target base station, if the fallback procedure is performed, the bearer for which the DAPS handover method is not configured is reconfigured in the MAC layer device for the source base station. For example, when performing a fallback procedure, the higher layer device (e.g., RRC layer device) of the UE may instruct the MAC layer device for the source base station to perform reconfiguration (MAC reconfiguration) by using the configuration information of the current MAC layer device, the configuration information related to the bearer for which the DAPS handover method is not indicated through the handover command message, and the bearer configuration information in which the DAPS handover method is indicated. Alternatively, when the fallback procedure is performed, the UE may reconfigure or reconstruct bearer configuration (for example, PDCP layer device configuration information, RLC layer device configuration information, MAC layer device configuration information, or PHY layer device configuration information) prior to reception of the handover command message and apply the reconfigured or reconstructed bearer configuration to the bearer for the source base station (PHY layer devices, PDCP layer device configuration information, RLC layer device configuration information, or MAC layer device configuration information of SRB, AM DRB, or UM DRB).

4> In the fallback procedure, when the UE transmits a report message indicating that the handover has failed to the source base station (for example, the RRC message, MAC CE, RLC control data, or PDCP control data described above), the UE may start the fourth timer. When receiving an instruction or message from the source base station in response to a report message indicating that the handover has failed, the UE may interrupt a fourth timer. However, if the fourth timer expires or if the response message is not received until the expiration, the UE performs an RRC connection re-establishment procedure (may release the connection with the base station and perform the RRC connection procedure again from the beginning, that is, perform a cell selection or reselection procedure, perform a random access procedure, and transmit an RRC connection re-establishment request message). In addition, if the RRC connection re-establishment procedure is triggered due to the expiration of the fourth timer, the second timer or the third timer may be interrupted if it is running.

3> If the second timer or the third timer for wireless connection between the UE and the source base station or the target base station in the above has expired, or if the wireless connection between the UE and the source base station or target base station is not valid 4> The UE performs the RRC connection re-establishment procedure (may release the connection with the base station and perform the RRC connection procedure again from the beginning, that is, perform a cell selection or reselection procedure, perform a random access procedure, and transmit an RRC connection re-establishment request message).

2> If the UE satisfies the second condition described in the disclosure when performing the DAPS handover procedure in the above, the UE may release the connection with the source base station or release the SRB for the source base station, and may interrupt and initialize the second timer or the third timer for the source base station if it is running. In the above, it is possible to prevent unnecessary RRC connection re-establishment procedures due to expiration of the second timer or the third timer only when the second timer or the third timer is interrupted. Since satisfaction of the second condition may denote that the handover procedure has been successfully performed, and the first timer is thus interrupted and expiration of the second timer or the third timer may trigger an unnecessary RRC connection re-establishment procedure. As another method, when the first condition described in the disclosure is satisfied or the handover procedure is successfully completed, the SRB for the source base station is released, or the second timer or the third timer for the source base station may be interrupted and initialized if it is running. In the above, it is possible to prevent unnecessary RRC connection re-establishment procedures due to expiration of the second timer or the third timer only when the second timer or the third timer is interrupted. Since satisfaction of the first condition may denote that the handover procedure has been successfully performed, the first timer is thus interrupted and expiration of the second timer or the third timer may trigger an unnecessary RRC connection re-establishment procedure.

When the UE determines that a handover failure has occurred according to the method of the disclosure and performs a fallback procedure by satisfying the condition described above, the UE may include, in an RRC message (for example, a ULInformationTransferMRDC message or a FailureInformation message), information indicating that a handover failure has occurred, and transmit the RRC message to SRB1 or SRB1 to which the second PDCP layer device structure is applied, to enable the source base station to identify the handover failure of the UE. In the above, when the source base station detects the handover failure of the UE, the source base station may configure an RRC message (for example, an RRCReconfiguration message or an RRCRelease message) in response thereto and transmit the RRC message to the UE. In the above, when receiving an RRCReconfiguration message (SRB1 to which the second PDCP layer device structure is applied, or an RRC message received through SRB1) through a response RRC message with respect to the handover failure report, the UE may complete the application of the configuration information thereof and in response thereto, transmit an RRCReconfigurationComplete message again to the source base station through SRB1 or SRB1 to which the second PDCP layer device structure is applied; and if the handover or access to another cell is indicated through the RRCReconfiguration, complete a procedure of random access to the cell and transmit the RRCReconfigurationComplete message through SRB1. However, if the UE receives the RRCRelease message as a response RRC message with respect to the handover failure report in the above, the UE may transition to the RRC idle mode or to the RRC deactivation mode according to the configuration information indicated through the RRCRelease message, and may no longer transmit an additional response RRC message with respect to the RRC message to the base station.

Figure 15:
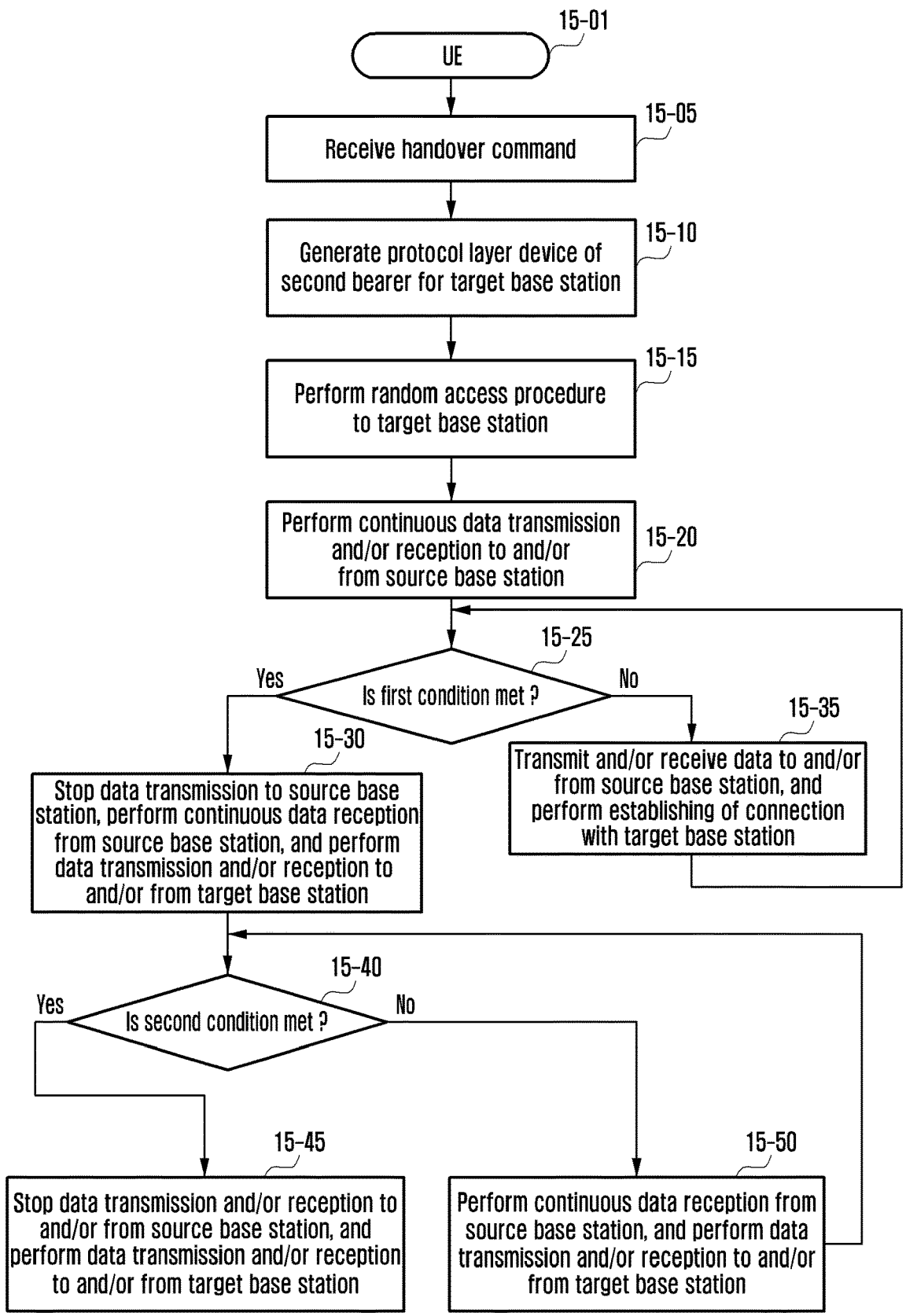
FIG. 15 illustrates a UE operation applicable to embodiments of the disclosure.

FIG. 15 illustrates a UE operation applicable to embodiments according to embodiments of the disclosure.

Referring to FIG. 15, a UE 15-01 may transmit or receive data to or from the source base station through the first PDCP layer device structure for each bearer. However, when a handover command message is received at operation 15-05 and the DAPS handover method of the second embodiment of the disclosure is indicated through the handover command message, or when the DAPS handover method is indicated for each bearer, the UE 15-01 may switch the target base station indicated through the message to the structure of the second PDCP layer device for each bearer or the bearers for which the DAPS handover method is indicated, and even when the protocol layer devices of the second bearer are configured and established and a procedure of random access to the target base station is performed through the established protocol layer devices (indicated by reference numerals 15-10 and 15-15), the UE continue to transmit or receive data (uplink data transmission and downlink data reception) to or from the source base station through protocol layer devices of the first bearer (indicated by reference numeral 15-20).

If the first condition is satisfied (indicated by reference numeral 15-25), the UE interrupts transmission of uplink data to the source base station through the protocol layer devices of the first bearer, and switches the uplink data transmission to transmit the uplink data to the target base station through the protocol layer devices of the second bearer, wherein the UE may continuously receive downlink data from the source base station and the target base station through the protocol layer devices of the first bearer and the second bearer (indicated by reference numeral 15-30). In addition, the PDCP layer device of the second bearer may continue to perform seamless data transmission or reception to or from the target base station by using transmission or reception data, serial number information, or information such as header compression and decompression context, which are stored in the PDCP layer device of the first bearer. In the above, if the first condition is not satisfied, the UE may continue to identify the first condition while continuing the procedure previously performed (indicated by reference numeral 15-35).

In addition, in the above, if the second condition is satisfied at operation 15-40, the UE may stop receiving downlink data from the source base station through the protocol layer devices of the first bearer (indicated by reference numeral 15-45). In addition, the PDCP layer device of the second bearer may continue to perform seamless data transmission or reception to or from the target base station by using transmission or reception data, serial number information, or information such as header compression and decompression context stored in the PDCP layer device of the first bearer.

If the second condition is not satisfied at operation 15-40 above, the UE may continue to identify the second condition while continuing to perform the existing procedure (indicated by reference numeral 15-50).

A specific embodiment of the PDCP layer device of the disclosure may perform different procedures according to the type of handover indicated through the handover command message received by the UE as follows.

If the handover type indicated through the handover command message, received from the source base station by the UE, indicates the handover of the first embodiment (for example, a general handover procedure), if the handover command message, ReconfigWithSync information, or MobilityControlInfo information indicates a first handover method (for example, the first embodiment of the disclosure or a general handover method) when the UE has received the handover command message, if the second embodiment (DAPS handover method) of the disclosure is not configured, or if the second embodiment (DAPS handover method) of the disclosure is not configured for a predetermined bearer through the bearer configuration information, for a bearer in which the second embodiment of the disclosure (DAPS handover method) is not configured through the bearer configuration information, The UE may perform a PDCP layer device re-establishment procedure (PDCP re-establishment) of the PDCP layer device for each bearer. For example, for SRB, the UE may initialize window state variables and discard stored data (PDCP SDU or PDCP PDU). For UM DRB, the UE may initialize window state variables, and may perform compression, ciphering, or integrity protection of data, which has not yet been transmitted to lower layer devices or data for which the PDCP revocation timer has not expired, based on the header (or data) compression context or security key of the target base station in ascending order of the COUNT value, thereby performing transmission or retransmission thereof. If the reordering timer is running, the UE may interrupt the timer and initialize, and may process received data (PDCP SDU or PDCP PDU) in sequence and transmit the same to the higher layer device. For AM DRB, the UE may not initialize window state variables, and may perform compression or ciphering starting from first data (PDCP SDU or PDCP PDU), which is not successfully transmitted from the lower layer device, based on the header (or data) compression context or security key of the target base station in ascending order of the PDCP serial number or count value, or integrity protection thereof is performed to be transmitted or retransmitted. In addition, the receiving PDCP layer device may process or store the data received due to the re-establishment procedure of the lower layer device (e.g., the RLC layer device), and for AM DRBs, if an indicator (drb-Continue ROHC) indicating continuous use of the header compression context is not configured, a header decompression procedure may be performed on the stored data based on header compression context (ROHC). In addition, the receiving PDCP layer device may process or store the data received due to the re-establishment procedure of the lower layer device (e.g., the RLC layer device), and for AM DRBs, a header decompression procedure may be performed on the stored data based on Ethernet header compression context (EHC). In another method, the receiving PDCP layer device may process or store the data received due to the re-establishment procedure of the lower layer device (e.g., the RLC layer device), and for AM DRBs, if an indicator (drb-Continue Ethernet header compression context (EHC)) indicating continuous use of the header compression context is not configured, a header decompression procedure may be performed on the stored data based on the EHC.

If the handover type indicated through the handover command message received from the source base station indicates the handover of the second embodiment (or the handover is indicated for each bearer), if the second embodiment (DAPS handover method) of the disclosure is configured based on the handover command message, ReconfigWithSync information, or MobilityControlInfo information when the UE has received the handover command message, if the second embodiment (DAPS handover method) of the disclosure is configured for a predetermined bearer through the bearer configuration information, or if the second embodiment (DAPS handover method) of the disclosure is configured for at least one bearer through the bearer configuration information, for a bearer in which the second embodiment of the disclosure (DAPS handover method) is configured through the bearer configuration information, The PDCP layer device in which the handover command message is received and the DAPS handover method is indicated may perform the following procedures without performing a PDCP re-establishment procedure. For example, for SRB, the UE may initialize window state variables (variable initialization may be skipped in order to perform fallback at the time of DAPS handover failure), or may discard stored data (PDCP SDU or PDCP PDU). For UM DRB, the UE may initialize window state variables, and may continue to transmit or receive pieces of data, which has not yet been transmitted to lower layer devices or pieces of data, for which the PDCP revocation timer has not expired, to or from the source base station. For AM DRB, the UE may not initialize window state variables, and may continue to transmit or receive data to or from the source base station. In addition, the UE may not initialize the uplink or downlink ROHC context for the source base station and use the same as it is, and may initialize the uplink or downlink ROHC context for the target base station and start in an initial state (for example, an IR state of U mode). As another method, the UE may initialize the uplink or downlink ROHC context for the source base station and start in an initial state (for example, an IR state in U mode), and may initialize an uplink or downlink ROHC context for the target base station and start in an initial state (for example, an IR state in U mode).

The UE may perform procedures, which are described in the disclosure when the first condition is satisfied, for each bearer (or for a bearer for which the second embodiment is indicated).

The UE may perform procedures, which are described in the disclosure when the second condition is satisfied, for each bearer (or for a bearer for which the second embodiment is indicated).

For bearers for which the second embodiment (or DAPS handover method) is not indicated (or not configured), when the handover command message is received, the UE may release configuration information or context for a data compression protocol (e.g., uplink data compression protocol). Alternatively, when the handover command message is received, the higher layer device (e.g., RRC layer device) of the UE may instruct the PDCP layer device to release configuration information or context for the data compression protocol (e.g., uplink data compression protocol) or reconfigure the same. However, for bearers for which the second embodiment (or DAPS handover method) is indicated (or configured), the UE may release context or configuration information for a data compression protocol (e.g., uplink data compression protocol) (for the source base station) when the first condition described in the disclosure is satisfied. Alternatively, when the first condition is satisfied, the higher layer device (e.g., RRC layer device) of the UE may instruct or reconfigure the PDCP layer device to release configuration information or context for the data compression protocol (e.g., uplink data compression protocol) (for the source base station). This is because, for a bearer for which the DAPS handover method is configured, data needs to be compressed by using the context or configuration information for the data compression protocol for the source base station until the first condition is satisfied and transmitted to the source base station.

One of the following methods may be applied to a bearer or PDCP layer device for which a DAPS handover method is not indicated after receiving the handover command message.

First method: For bearers or PDCP layer devices for which the DAPS handover method is not configured above, when a handover command message is received, the UE does not trigger or perform the PDCP re-establishment procedure, or the target base station does not establish a PDCP re-establishment procedure for the bearers through the handover command message. If the first condition described in the disclosure is satisfied, the PDCP re-establishment procedure may be triggered or performed (even if the target base station configures the PDCP re-establishment procedure for the bearer through the handover command message, the procedure may be performed when the first condition is satisfied). Specifically, if the first condition is satisfied, the higher layer device (for example, RRC layer device) of the UE may trigger or request a PDCP re-establishment procedure for a bearer or bearers for which the DAPS handover method is not configured. The PDCP layer device, which has received the request for the PDCP re-establishment procedure, may perform different PDCP re-establishment procedures for respective bearers. For example, for UM DRB, the UE may initialize the window state variables, may perform compression, ciphering, or integrity protection of pieces of data, which has not yet been transmitted to the lower layer device, or pieces of data, for which the PDCP discard timer has not expired, based on the header (or data) compression context or security key of the target base station in ascending order of the count value, and then may perform transmission or retransmission thereof. If the reordering timer is running, the UE may interrupt and initialize the reordering timer, and may process received data (PDCP SDU or PDCP PDU) in a sequential manner and transmit the same to the higher layer device. For AM DRB, the UE may not initialize the window state variables, may perform compression, ciphering, or integrity protection of first data (PDCP SDU or PDCP PDU) that has not been successfully transmitted from the lower layer device, based on the header (or data) compression context or security key of the target base station in ascending order of the count value or the PDCP serial number, and then may perform transmission or retransmission thereof. The reason for performing the PDCP re-establishment procedure when the first condition is satisfied rather than performing the PDCP re-establishment procedure when the handover command message is received, for the bearer(s) for which the DAPS handover method is not configured, is that if the handover procedure to the target base station fails, fallback to the source base station may be performed, wherein in the PDCP re-establishment procedure for the bearers, data is compressed based on the header (or data) compression context of the target base station and is ciphered or integrity protected based on the security key of the target base station, and in this case, the data becomes useless and needs to be discarded if data fallback is required. In addition, when fallback is required, pieces of data, for which PDCP re-establishment procedure is performed again and to be transmitted, need to be compressed based on the header (or data) compression context of the source base station, and ciphered or integrity protected again based on the security key of the source base station. Thus, unnecessary processing occurs. Therefore, when the UE performs the DAPS handover method, for a bearer for which the DAPS handover method is not configured, the PDCP re-establishment procedure is not triggered or performed when the handover command message is received, and when the first condition is satisfied, the PDCP re-establishment procedure may be triggered or performed. In addition, the PDCP re-establishment procedure is not performed for the bearer for which the DAPS handover method is configured.

Second method: When a handover command message is received for bearer(s) for which the DAPS handover method is not configured, the higher layer device (for example, RRC layer device) of the UE may trigger or request a PDCP re-establishment procedure. The PDCP layer device, which has received the request for the PDCP re-establishment procedure, may perform different PDCP re-establishment procedures for respective bearers. For example, for UM DRB, the UE may initialize the window state variables, and perform compression, ciphering, or integrity protection of data that has not yet been transmitted to the lower layer device or data for which the PDCP discard timer has not expired, based on the header (or data) compression context or security key of the target base station in ascending order of the count value, and then may perform transmission or retransmission thereof. If the reordering timer is running, the UE may interrupt and initialize the reordering timer, and may process received data (PDCP SDU or PDCP PDU) in a sequential manner and transmit the same to the higher layer device. For AM DRB, the UE may not initialize the window state variables, and perform compression, ciphering, or integrity protection of first data (PDCP SDU or PDCP PDU) that has not been successfully transmitted from the lower layer device, based on the header (or data) compression context or security key of the target base station in ascending order of the count value or the PDCP serial number, and then may perform transmission or retransmission thereof. When a handover command message is received for the bearer(s) for which the DAPS handover method is not configured, the data is compressed based on the header (or data) compression context of the target base station and is ciphered and integrity protected based on the security key of the target base station through the PDCP re-establishment procedure. Accordingly, if the UE fails in the procedure of handover to the target base station (for example, if the first timer expires or wireless connection to the target base station fails), and fallback to the source base station is possible and thus the UE performs fallback, the higher layer device (e.g., RRC layer device) of the UE may: reconfigure, for the bearers for which the DAPS handover method is not indicated, an indication of discarding pieces of data (PDCP PDUs) processed based on configuration information (security key or header (or data) compression context) for the target base station so that pieces of data (e.g., PDCP PDUs), generated or processed for transmission to the target base station, are discarded in the bearers and the data can be processed again based on the header (or data) compression context or security key for the source base station, a PDCP re-establishment procedure, or configuration information (security key or header (or data) compression context) for the source base station; and may request or indicate generation or processing of data again based on the source base station configuration information.

In addition, when the source base station instructs the UE to perform a handover applying the embodiments of the disclosure, the source base station may start data forwarding to the target base station if the following third condition is satisfied. The third condition may denote that one or more of the following conditions are satisfied.

When an indication that the UE has successfully completed handover is received from the target base station When a handover command message is transmitted to the UE When a handover command message is transmitted to the UE and successful transmission (HARQ ACK, NACK, RLC ACK, or NACK) for the handover command message is identified When the source base station receives, from the UE, an indicator (for example, an RRC message (for example, RRCReconfiguration message), MAC CE, or RLC control PDU, or PDCP control PDU) indicating releasing the connection with the source base station When a handover command message is transmitted to the UE, a predetermined timer is driven, and the timer is expired When information indicating identification (HARQ ACK, NACK, RLC ACK, or NACK) about successful transmission of downlink data is not received from the UE for a predetermined time FIG. 10 illustrates a method for applying configuration information for each bearer when a DAPS handover method is configured according to an embodiment of the disclosure.

Figure 11A:
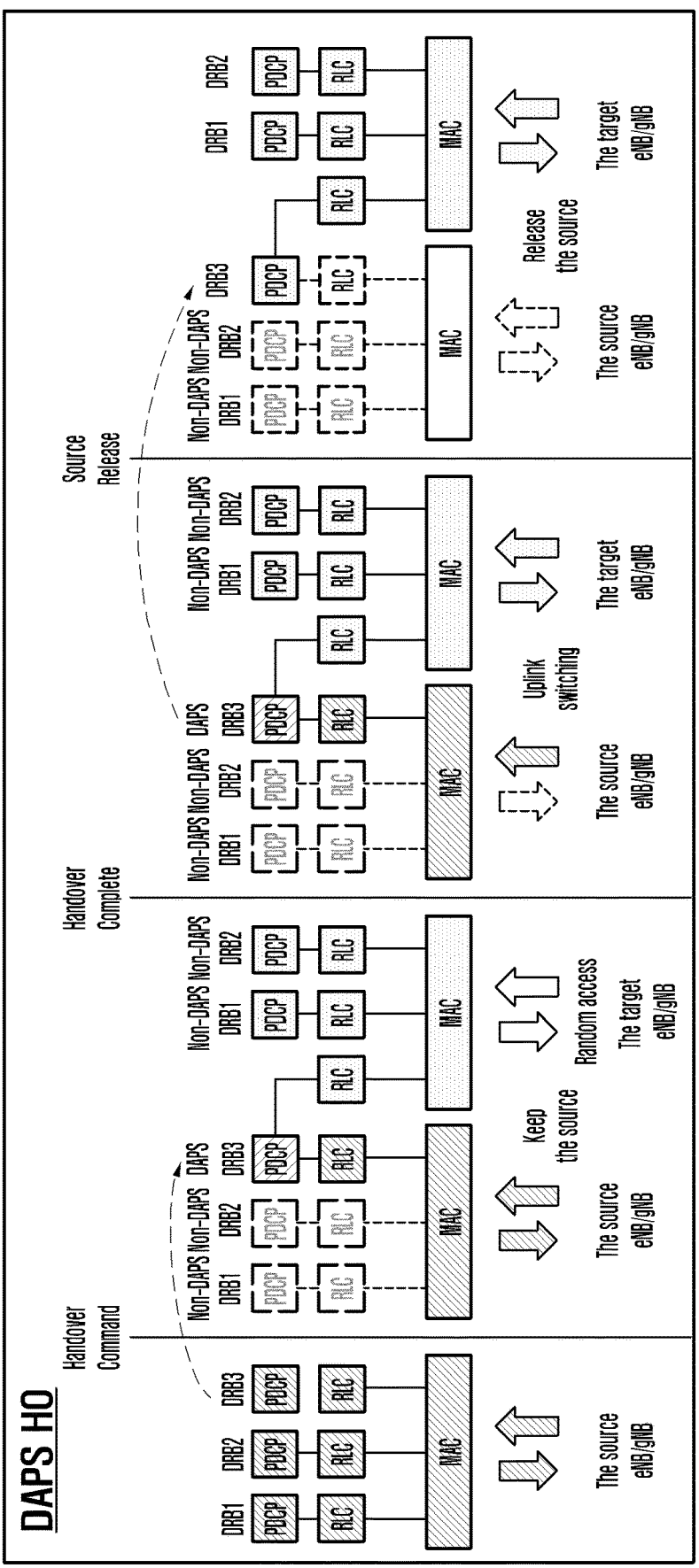
FIGS. 11A and 11B illustrate, when the DAPS handover method is indicated to a UE for each bearer through an RRCReconfiguration message or an RRCConnectionReconfiguration message, a method for driving, by the UE having received the message, different bearer-specific protocol layer devices with respect to a signaling radio bearer (SRB), bearers for which the DAPS handover method is configured, or bearers for which the DAPS handover method is not configured according to various embodiments of the disclosure.
Figure 11B:
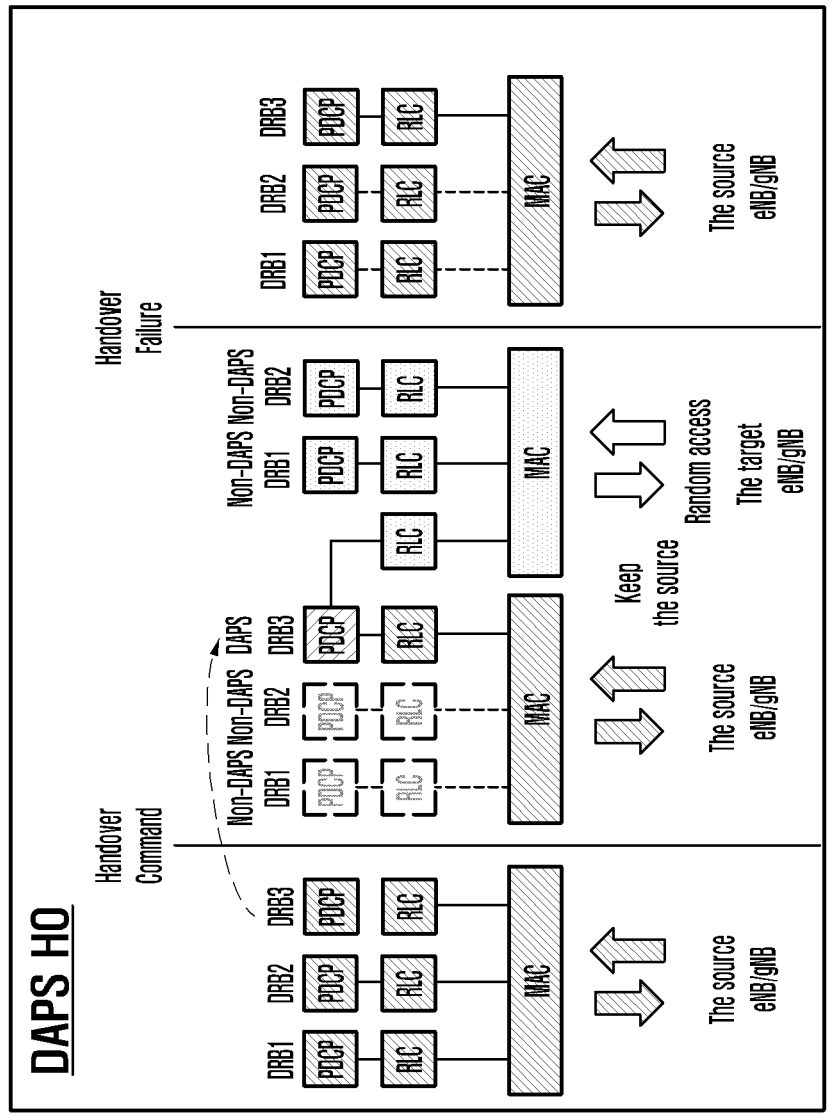
Figure 12A:
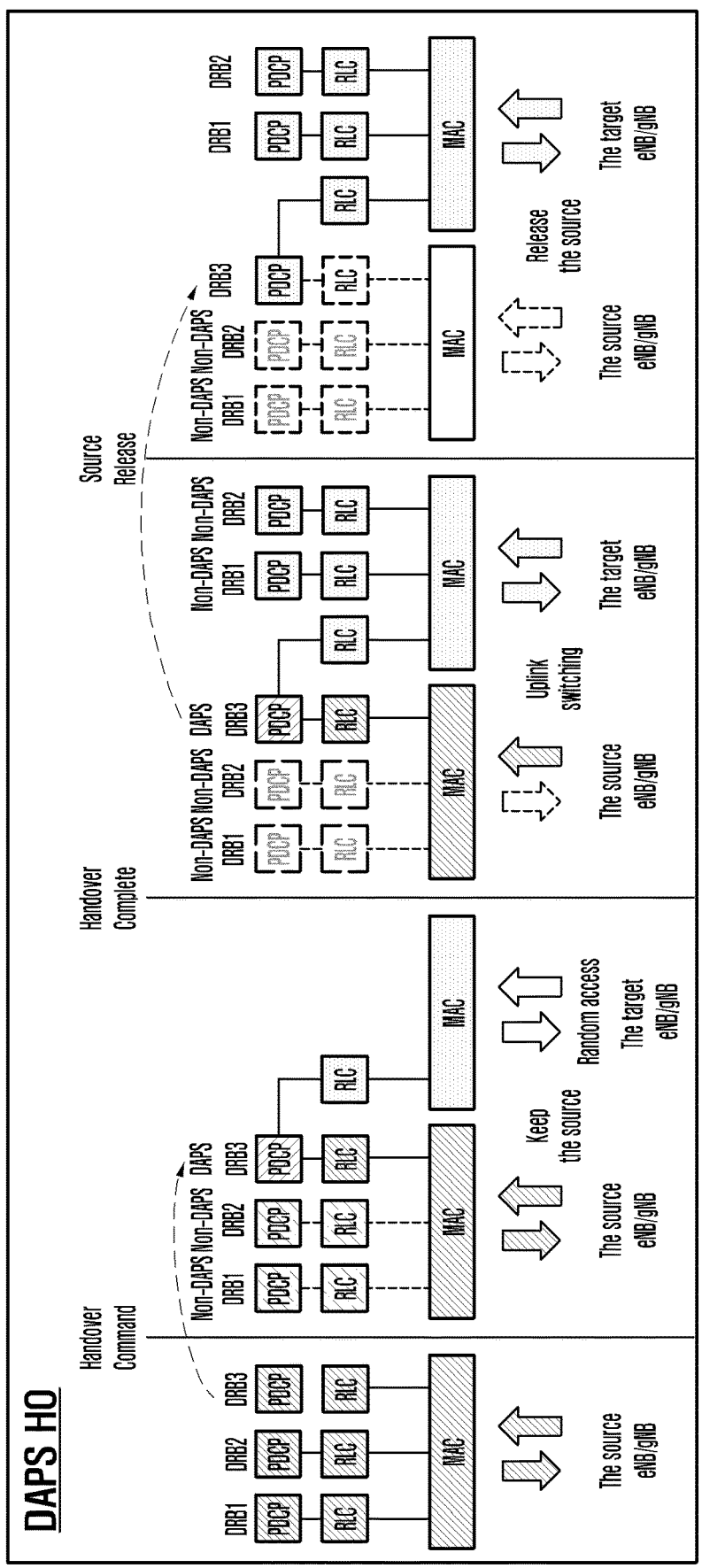
FIGS. 12A, 12B, 13A, 13B, 14A and 14B illustrate, when the DAPS handover method is indicated to a UE is indicated to a UE for each bearer through an RRCReconfiguration message or an RRCConnectionReconfiguration message, a method for driving, by the UE having received the message, different bearer-specific protocol layer devices with respect to a signaling radio bearer (SRB), bearers for which the DAPS handover method is configured, or bearers for which the DAPS handover method is not configured according to various embodiments of the disclosure.
Figure 12B:
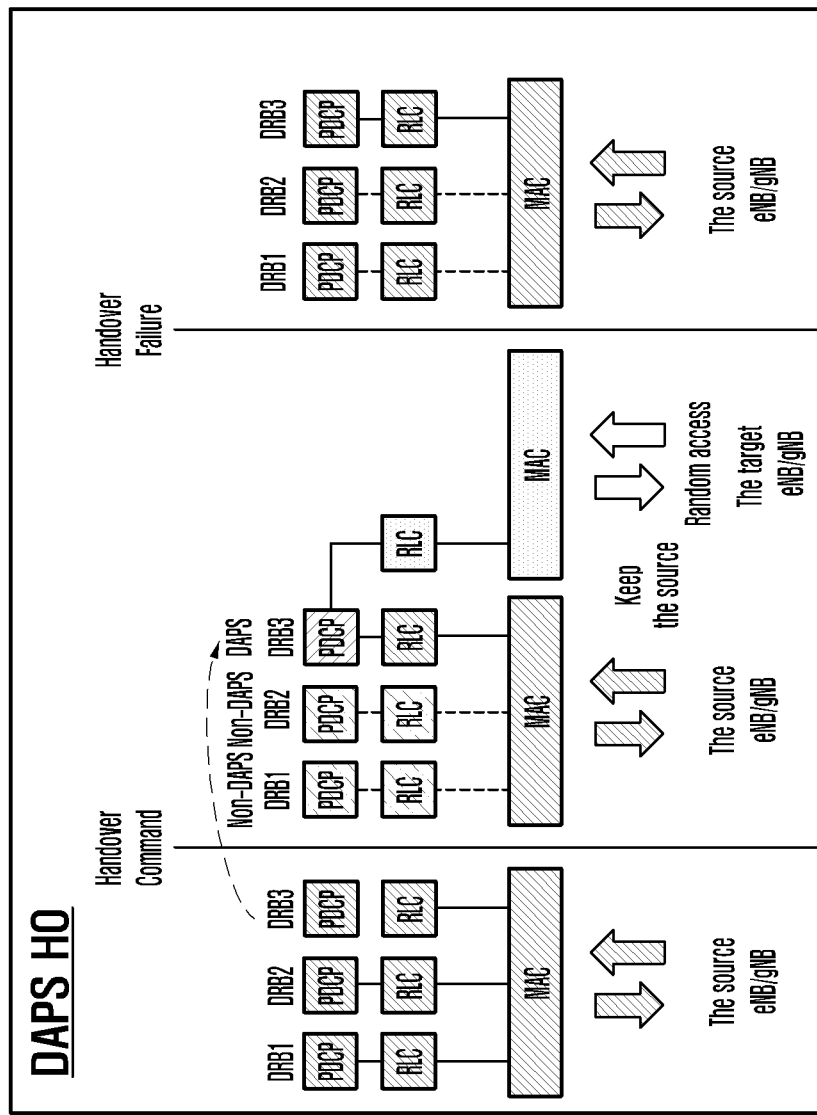
Figure 13A:
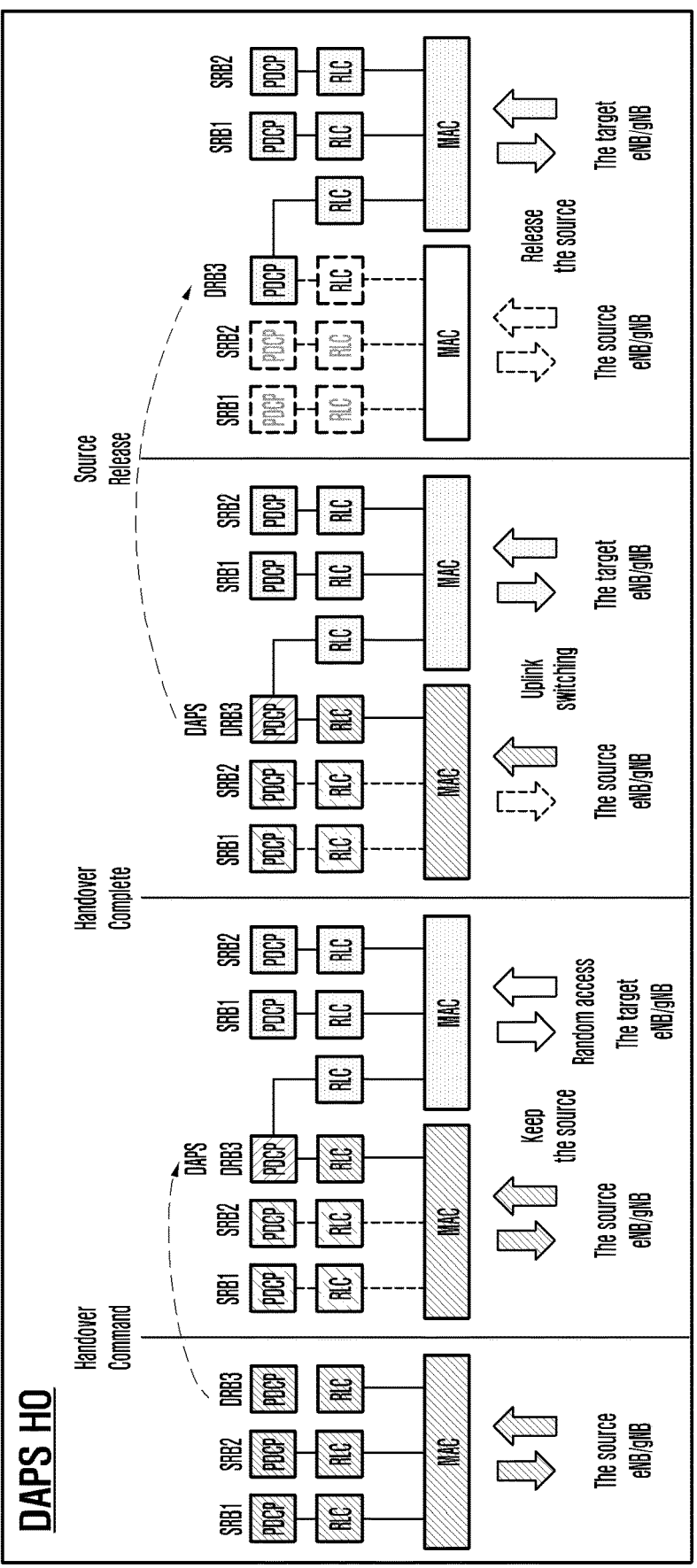
Figure 13B:
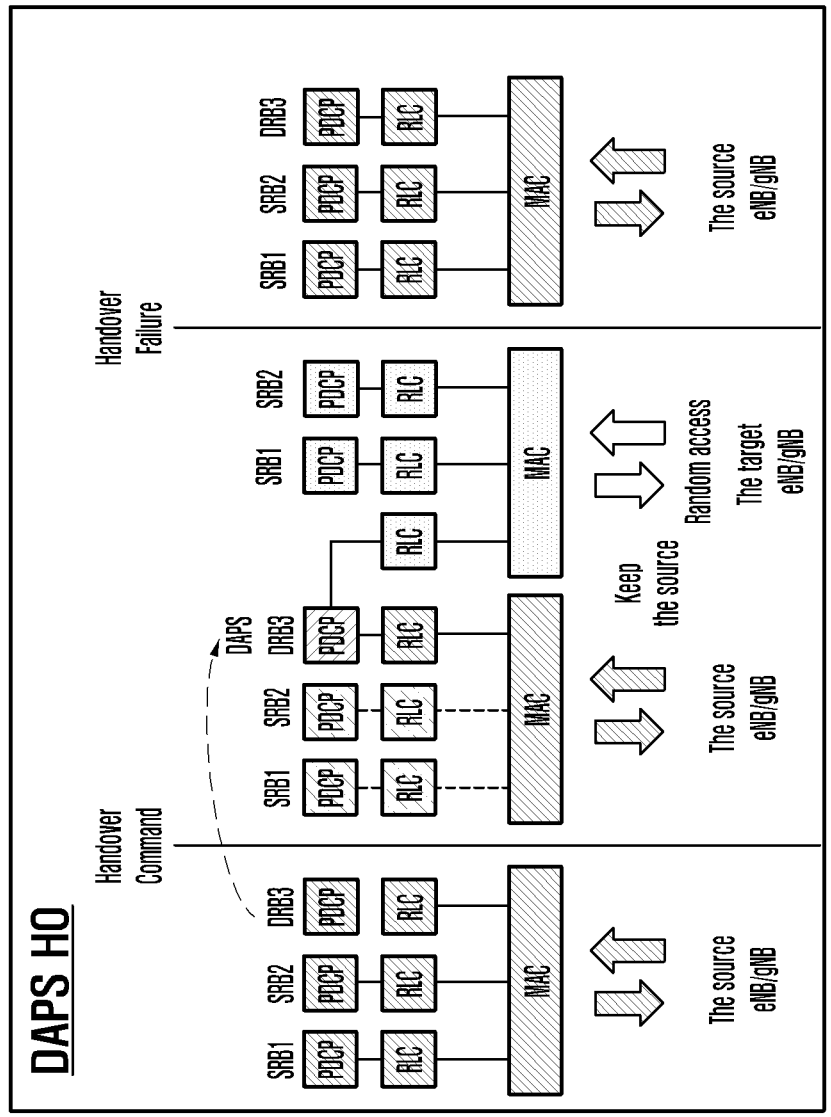
Figure 14A:
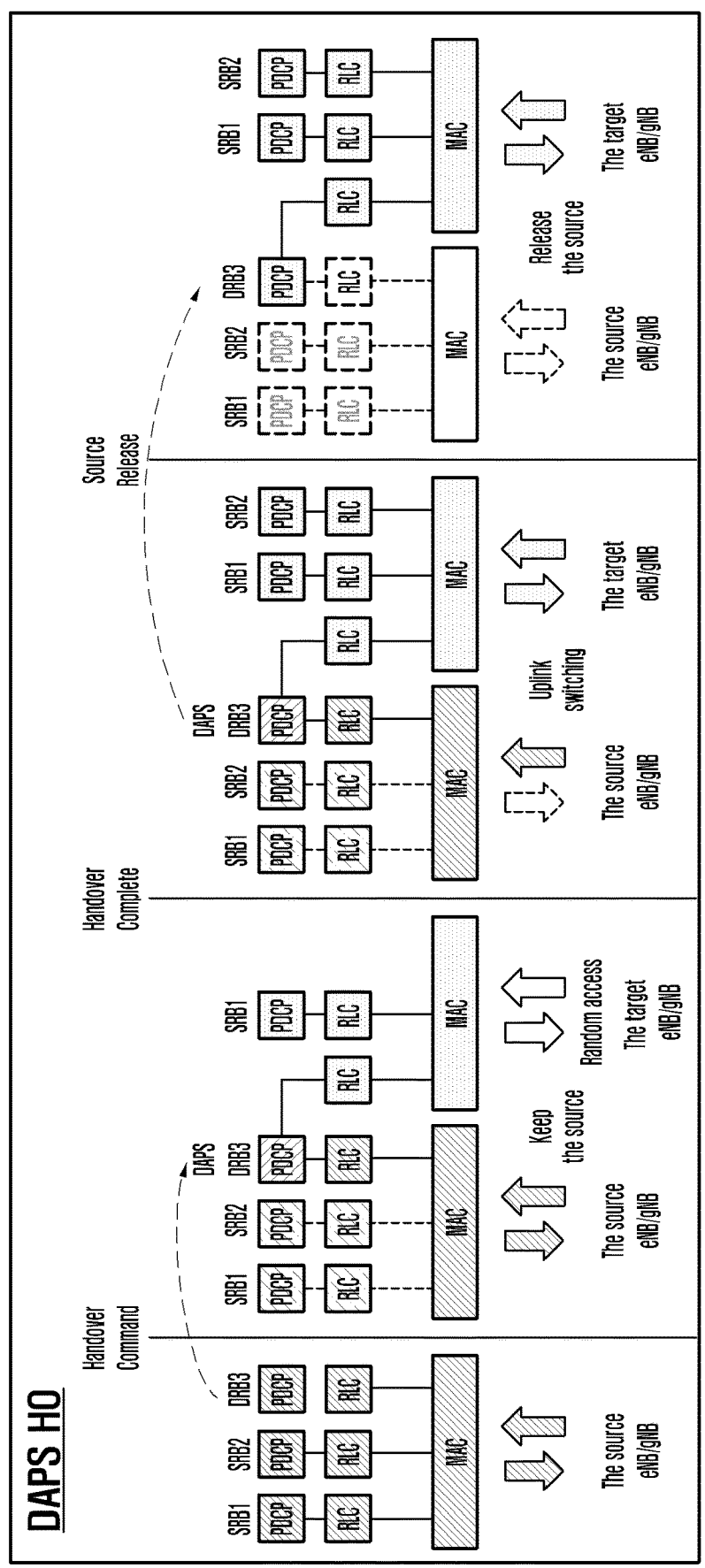
Figure 14B:
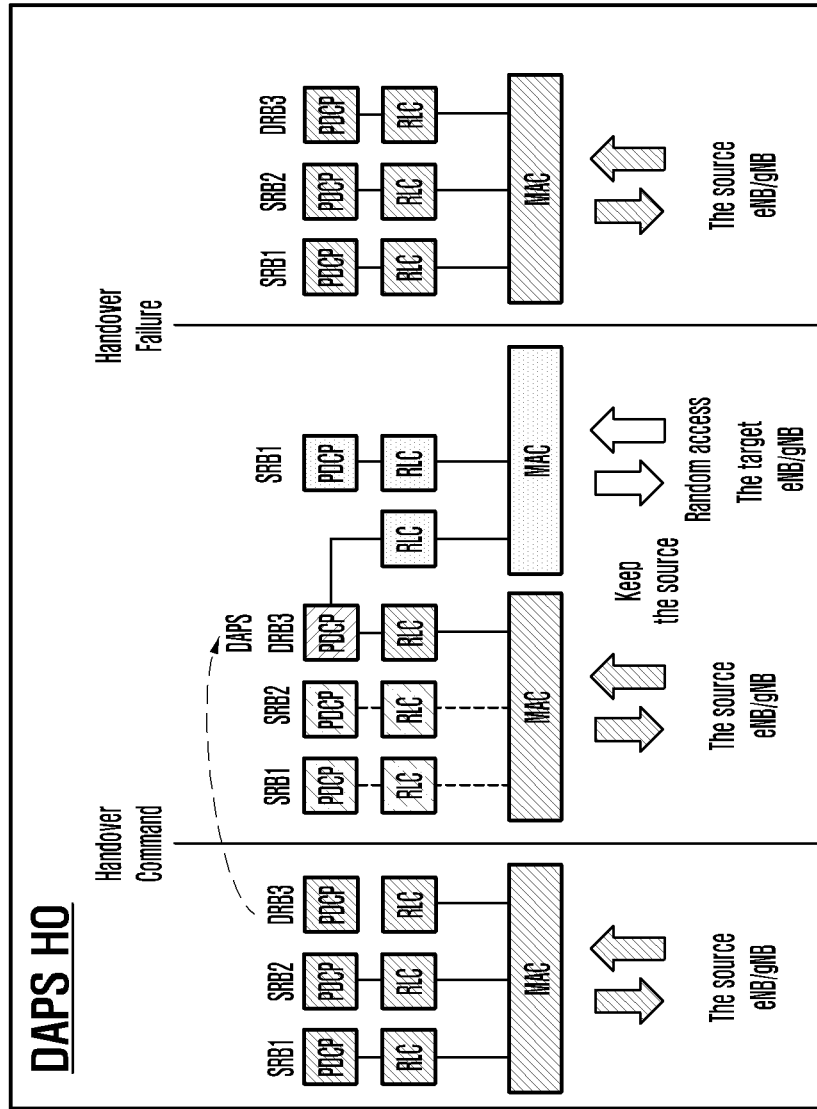

FIGS. 11A and 11B illustrate, when the DAPS handover method is indicated to a UE for each bearer through an RRCReconfiguration message or an RRCConnectionReconfiguration message, a method for driving, by the UE having received the message, different bearer-specific protocol layer devices with respect to a signaling radio bearer (SRB), bearers for which the DAPS handover method is configured, or bearers for which the DAPS handover method is not configured according to various embodiments of the disclosure;

FIGS. 12A, 12B, 13A, 13B, 14A and 14B illustrate, when the DAPS handover method is indicated to a UE is indicated to a UE for each bearer through an RRCReconfiguration message or an RRCConnectionReconfiguration message, a method for driving, by the UE having received the message, different bearer-specific protocol layer devices with respect to a signaling radio bearer (SRB), bearers for which the DAPS handover method is configured, or bearers for which the DAPS handover method is not configured according to various embodiments of the disclosure.

Herein below in the disclosure, a UE operation for specifically performing the techniques described above is provided. Specifically, the disclosure proposes, when the DAPS handover method, which is the second embodiment of the efficient handover method of the disclosure, is indicated to each bearer through an RRCReconfiguration message or an RRCConnectionReconfiguration message, a method for driving, by the UE having received the message, different bearer-specific protocol layer devices with respect to a signaling radio bearer (SRB), bearers for which the DAPS handover method is configured, or bearers for which the DAPS handover method is not configured.

Referring to FIGS. 11A, 11B, 13A, and 13B, they illustrate a detailed first embodiment of the method in which, when the DAPS handover method is indicated to each bearer through an RRC message (e.g., RRCReconfiguration message or an RRCConnectionReconfiguration message), which is received by the UE, the UE drives different bearer-specific protocol layer devices with respect to an SRB, bearers for which the DAPS handover method is configured, or bearers for which the DAPS handover method is not configured, and the detailed first embodiment is as follows.

1> If the UE receives a handover command message (e.g., RRCReconfiguration message) or receives ReconfigWithSync information (in case of NR base station) or MobilityControlInfo information (in case of LTE base station) through the RRCReconfiguration message, if the UE can follow the configuration information of the RRC message, the UE can perform one or more of the following operations.

2> The UE starts the first timer of the disclosure.

2> If the second handover method (for example, the second embodiment of the disclosure or the DAPS handover method) is not indicated above, if the DAPS handover method is not indicated for each bearer identifier or logical channel identifier, if the DAPS handover method is not configured for at least one bearer, or if the DAPS handover method is not configured for a predetermined bearer, 3> the UE may interrupt the second timer if the second timer for the source base station of the disclosure is running 3> the UE may interrupt the third timer if the third timer for the source base station of the disclosure is running.

2> In the above, if the second handover method (for example, the second embodiment of the disclosure or the DAPS handover method) is indicated (or configured), or the DAPS handover method is indicated for each bearer identifier or logical channel identifier, if the DAPS handover method is configured for at least one bearer, or if the DAPS handover method is configured for a predetermined bearer, one or more of the following operations may be performed for a bearer for which the DAPS handover method is configured.

3> Even if the second timer for the source base station of this disclosure is running, the UE does not interrupt the second timer.

3> The UE may generate or establish a MAC layer device for the target base station. For example, the UE may apply the configuration of the target Pcell with the same configuration of the source PCell.

3> The UE may apply a new UE identifier (e.g., C-RNTI) in the MAC or PHY layer device with respect to the target base station or for the target base station.

3> The UE may reconfigure the MAC layer device for the source Pcell. Specifically, the UE may reconfigure the MAC layer device for the source Pcell by using MAC layer device configuration information, obtained by excluding configuration information about a logical channel or a bearer for which a DAPS handover method is not configured. Alternatively, the UE may reconfigure the MAC layer device for the source Pcell by using MAC layer device configuration information including configuration information about a logical channel or a bearer for which the DAPS handover method is configured. In addition, the configuration information may include mapping information between a logical channel and a SCell.

3> The UE may deactivate all SCells configured in the MAC layer device for the source base station. However, the source PCell is maintained as it is and data transmission or reception may be continuously performed.

3> There may be a DRB for which each DAPS handover method is configured, or may be a list of DRBs for DAPS handover. With regard to a DRB having an identifier included in the list of DRBs for which the DAPS handover method is configured, or with regard to all DRBs (there is no list of DRBs for a DAPS handover), 4> An RLC layer device and a dedicated control channel (DCCH) logical channel for a target Pcell may be configured or established. For example, the target Pcell may be applied with the same configuration as that of the source PCell.

4> The first PDCP layer device structure (or a normal PDCP layer device) may be reconfigured to be or switched to the second PDCP layer device structure (or a DAPS PDCP layer device). Alternatively, the received PDCP layer device configuration information may be applied to the second PDCP layer device structure.

3> There is a DRB for which each DAPS handover method is not configured or a list of DRBs for DAPS handover, and for a DRB, the identifier of which is not included in a list of DRBs for which the DAPS handover method is configured
     4> The PDCP layer device may be re-established. As described in the disclosure, a security key or ROHC context for a target Pcell may be applied, or data (e.g., PDCP PDU) is generated based on the applied security key or ROHC context for the target Pcell and transmitted or retransmitted. In addition, when the PDCP layer device is re-established in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.
     4> The RLC layer device may be re-established and the RLC layer device or the connected dedicated traffic channel (DTCH) may be connected to the target Pcell (or the MAC layer device of the target Pcell).
   3> With regard to each SRB,
     4> SRBs for a target Pcell are configured or established. Specifically, a PDCP layer device for the target PCell may be configured or established. In addition, an RLC layer device and a dedicated control channel (DCCH) logical channel for a target Pcell may be configured or established. For example, the configuration of the target Pcell may be applied with the same configuration as the configuration for the source PCell.
     4> SRBs for the source PCell are suspended. Alternatively, if there are data or RRC messages stored in SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted.
  2> Otherwise, or if the second handover method (for example, the second embodiment of the disclosure or the DAPS handover method) is not indicated (or is not configured), if the DAPS handover method is not configured (or is not indicated) for each bearer identifier or logical channel identifier, if the DAPS handover method is not configured for at least one bearer, or if the DAPS handover method is not configured for a predetermined bearer, one or more of the following operations may be performed.
   3> If the DAPS handover method is configured, the MCG MAC layer device or SCG MAC layer device is initialized.
   3> If the DAPS handover method is configured, the configuration or context for the uplink compressed data method is released.
   3> The PDCP layer device may be re-established for all bearers (e.g., DRBs or SRBs) for which the PDCP layer device is established or configured.
   3> MCG RLC or SCG RLC layer device may be re-established for all bearers (e.g., DRBs or SRBs) for which the RLC layer device is established or configured.
 1> If the MAC layer device successfully completes the random access procedure (or the first condition described in this disclosure is satisfied)

1> Alternatively, if an indicator (for example, rach-Skip) indicating skipping of the random access procedure is configured, and the MAC layer device indicates successful reception of the PDCCH transmission corresponding to the UE identifier (C-RNTI),
   2> The first timer (for example, T304) is interrupted.
   2> If the second handover method (for example, the second embodiment of the disclosure or DAPS handover method) is configured as above, if the DAPS handover method is indicated for each bearer identifier or logical channel identifier, if the DAPS handover method is configured for at least one bearer, or if the DAPS handover method is configured for a predetermined bearer
     3> The second timer (for example, T310) is interrupted if the second timer is running.
     3> The third timer (for example, T312) is interrupted if the third timer is running.
     3> Uplink data switching may be triggered or indicated for each bearer for which the second handover method or the DAPS handover method is configured or each bearer (or lower layer device or PDCP layer device) for which a DAPS PDCP layer device is configured. In addition, when the uplink data switching is indicated in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.
     3> MCG configuration information may be released. The MCG configuration information may include configuration information of each bearer or SDAP, PDCP, RLC, MAC, or PHY layer device information, UE identifier information, or security information.
     3> If there is SCG configuration information, the SCG configuration information may be released. The SCG configuration information may include configuration information of each bearer or SDAP, PDCP, RLC, MAC, or PHY layer device information, UE identifier information, or security information.
  2> System information may be read from the target PCell.
 1> If the first timer of this disclosure has expired (for example, if the handover procedure has failed)
  2> If the first timer for handover (for example, T304) has expired or if handover has failed
   3> If random access-related configuration information is configured, designated preamble information is released.
   3> If the second handover method (e.g., the second embodiment of the disclosure or the DAPS handover method) is not configured (or not indicated), the DAPS handover method is not configured (or not indicated) for each bearer identifier or logical channel identifier, if the DAPS handover method is not configured for at least one bearer, or if DAPS handover method is not configured for a predetermined bearer,
   3> Alternatively, if the second handover method (for example, the second embodiment of the disclosure or the DAPS handover method) is configured (or indicated), if the DAPS handover method is indicated for each bearer identifier or logical channel identifier, if the DAPS handover method is configured for at least one bearer, or if the DAPS handover method is configured for a predetermined bearer, and if the wireless connection between the source base station and the UE fails (or radio link failure (RLF) is detected), or if the wireless connection between the source Pcell and the UE has failed (or if the second timer or the third timer has expired), if there is a problem in random access, if the number of retransmissions has reached the maximum number of retransmissions, or if an indication indicating out-of-synchronization is received more than a predetermined number of times), 4> It is possible to perform fall back, return, or recovery by using configuration information used in the source Pcell, excluding physical layer device configuration information, MAC layer device configuration information, or transmission resource information 4> The measured frequency or cell information is configured and prepared to be reported, and the same is reported to a cell or base station to be accessed.

4> RRC connection re-establishment procedure may be performed.

3> In the above, if the second handover method (for example, the second embodiment of the disclosure or the DAPS handover method) is configured (or indicated), if the DAPS handover method is configured (or indicated) for each bearer identifier or logical channel identifier, if the DAPS handover method is configured for at least one bearer, if the DAPS handover method is configured for a predetermined bearer, and if the radio connection between the source base station and the UE has not failed (or if radio link failure (RLF) is not detected (e.g., if the second or third timer has not expired, if a random access problem has not occurred, if the number of retransmissions has not reached the maximum number of retransmissions, or if an indication indicating out-of-synchronization is not received more than a predetermined number of times), or if the wireless connection between the source Pcell and the UE has not failed (or if the second timer or the third timer has not expired), 4> the MAC layer device for the target PCell may be initialized or released.

4> There may be a DRB for which a DAPS handover method is configured, or may be a list of DRBs for which the DAPS handover method is configured. With regard to DRBs included in the list, or with regard to all DRBs (if there is no list of DRBs for which the DAPS handover method is configured), 5> The RLC layer device for the target Pcell may be re-established and released, or an associated DTCH logical channel may be released.

5> The PDCP layer device (e.g., DAPS PDCP layer device or the second PDCP layer device structure) may be reconfigured to be a normal PDCP layer device (e.g., the first PDCP layer device structure). In addition, when the PDCP layer device is reconfigured in the above, the PDCP status report is triggered for the AM DRB or UM DRB, the PDCP status report is enabled to be transmitted to the source base station, and the source base station is enabled to receive the PDCP status report from the UE. As a result, data transmission or reception may be performed continuously without interruption.

4> With regard to a DRB for which the DAPS handover method is not configured, or with regard to DRBs not included in the list (if there is a list for which the DAPS handover method is configured), 5> The PDCP layer device may be re-established. Alternatively, a higher layer device (e.g., an RRC layer device) may indicate a PDCP layer device re-establishment procedure for the bearer. Alternatively, the UE may transmit a message indicating that the DAPS handover has failed through the SRB for the source base station to the source base station, and then may receive an RRC message (e.g., RRCReconfiguration message) from the base station as a response message thereto. In addition, the UE may perform a PDCP re-establishment procedure for each bearer including an indicator indicating re-establishment of the PDCP layer device according to the indication of the message. Alternatively, the UE may receive the RRC message from a higher layer device (e.g., an RRC layer device), identify the indicator, and indicate a PDCP layer device re-establishment procedure for the bearer. As described in the disclosure, a security key or ROHC context for the source Pcell may be applied, or data (for example, PDCP PDU) may be generated based on the applied security key or ROHC context (or data compression context) for the source Pcell to perform transmission or retransmission. In the disclosure, when the UE receives a handover command message or an RRC message indicating a DAPS handover method, the UE performs PDCP layer device re-establishment procedure based on a security key or an ROHC context for a target Pcell, with respect to a bearer for which the DAPS handover method is not configured, so that data for the target base station may be generated for the AM DRB or UM DRB and thus the data generated for the target base station should be discarded. This is because an error occurs when data for the target base station is transmitted when falling back to the source base station. Therefore, when falling back to the source base station, the re-establishment procedure of the PDCP layer device may be performed in order to update the security configuration information, ROHC context, or data compression configuration information for the target PCell with the security configuration information, ROHC context, or data compression configuration information for the source PCell. In addition, when the PDCP layer device is re-established in the above, the PDCP status report is triggered for the AM DRB or UM DRB, to enable the PDCP status report to be transmitted to the source base station, and enable the source base station to receive the PDCP status report from the UE. As a result, data transmission or reception may be continuously performed without interruption.

5> The RLC layer device may be re-established and the RLC layer device or the connected DTCH channel may be connected to the source Pcell (or the MAC layer device of the source Pcell).

4> Suspended SRBs, which are configured in the MAC layer device for the source base station or with respect to the source base station (or source PCell), are resumed.

4> The MAC layer device for the source Pcell may be reconfigured. Specifically, the MAC layer device for the source Pcell may be reconfigured using original MAC layer device configuration information (for example, configuration information before receiving the handover command message) including information on the bearer for which the DAPS handover method is not configured or the logical channel again. In addition, the configuration information may include mapping information between a logical channel and a SCell.

4> The PDCP layer device for the target Pcell may be re-established or released.

4> The RLC layer device for the target PCell may be re-established or released, or an associated DTCH logical channel may be released.

4> When resuming the SRBs for the source Pcell, if there are data or RRC messages stored in the SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted.

4> In order to fall back to the source base station, a procedure of re-acquiring necessary system information from the source PCell may be performed.

4> A handover failure message may be configured through the resumed SRBs and transmitted to the source base station. Alternatively, DRBs may be resumed and data transmission or reception may be resumed. Alternatively, because the handover procedure has failed, SRB1 that has been configured or established for the target Pcell may be released.

1> If the UE detects a wireless connection problem in the physical layer device

2> If the second handover method (for example, the second embodiment of the disclosure or the DAPS handover method) is configured as above, if the DAPS handover method is configured for each bearer identifier or logical channel identifier, if the DAPS handover method is configured for at least one bearer, if the DAPS handover method is configured for a predetermined bearer, and if an indicator (out-of-sync indication) indicating that radio connection signals are out of synchronization is received, from a lower layer device (for example, a MAC layer device or a PHY layer device), a predetermined number of times (for example, the base station may configure the number of times) when predetermined timers (for example, T300 (a timer for RRC connection establishment procedure), T301 (a timer for RRC connection re-establishment procedure), or T311 (a timer for RRC connection re-establishment procedure)) are not running, and a problem in the physical layer device is detected, 3> A second timer (e.g., T310) may be started.

2> If an indicator (out-of-sync indication) indicating that radio connection signals are out of synchronization is received, from a lower layer device (for example, a MAC layer device or a PHY layer device), a predetermined number of times (for example, the base station may configure the number of times) and a problem in the physical layer device is detected, and the first timer or another timer T300, T301, T304, T311, or T319 is not running, 3> A second timer (e.g., T310) may be started. However, if the first timer is running when the DAPS handover method is not configured, the second timer is not started even when a problem in the physical layer detected.

1> If the second handover method (e.g., the second embodiment of the disclosure or DAPS handover method) is configured (or indicated) as above, if the DAPS handover method is configured (or indicated) for each bearer identifier or logical channel identifier, if the DAPS handover method is configured for at least one bearer, or if the DAPS handover method is configured for a predetermined bearer, and the first timer is running (or the handover procedure is in progress), 2> If the wireless connection between the source base station and the UE fails (or if a radio link failure (RLF) is detected (for example, or if the second timer or the third timer has expired, if there is a problem in random access, if the number of times of retransmission reaches the maximum number of retransmissions, or if an out-of-sync indication is received more than a predetermined number of times)), or if the wireless connection between the source Pcell and the UE fails (or if the second timer or the third timer has expired), 3> The MAC layer device for the source PCell may be initialized or the MAC layer device configuration information may be released.

3> There may be a DRB for which each DAPS handover method is configured, or may be a list of DRBs for which the DAPS handover method is configured. With regard to the DRBs included in the list or with regard to all DRBs if there is no list for which the DAPS handover method is configured, 4> The RLC layer device for the source Pcell may be re-established or released, or an associated DTCH logical channel may be released.

4> The PDCP layer device (for example, a DAPS PDCP layer device or a second PDCP layer device structure) may be reconfigured to be a normal PDCP layer device (for example, a first PDCP layer device structure).

3> With regard to each SRB,

4> The PDCP layer device for the source PCell may be re-established or released.

4> The RLC layer device for the source Pcell may be re-established or released, or the associated DTCH logical channel may be released.

3> Physical layer device configuration information for the source Pcell may be released.

3> Alternatively, when security configuration information is activated and SRBs or DRBs are configured, or in another method, all DRBs configured for the source Pcell may be suspended.

1> When receiving a handover command message (e.g., RRCReconfiguration message) or receiving ReconfigWithSync information (in case of NR base station) or MobilityControlInfo information (in case of LTE base station) through the RRCReconfiguration message, or if the random access procedure triggered by the target base station or the MAC layer device of a cell group is successfully completed, the RRC layer device of the UE 2> interrupts the first timer for the source base station, target base station, or cell group.

2> interrupts the second timer if the second timer for the source base station is running (during handover). This is because when the second timer expires, an unnecessary RRC connection re-establishment procedure may be triggered.

2> If the second handover method (for example, the second embodiment of the disclosure or the DAPS handover method) is configured according to another method, or if the DAPS handover method is configured for each bearer identifier or logical channel identifier, 3> the RRC layer device of the UE interrupts the second timer if the second timer for the source base station is running. This is because when the second timer expires, an unnecessary RRC connection re-establishment procedure may be triggered.

2> the RRC layer device of the UE interrupts the third timer for the source base station, target base station, or cell group.

1> When the UE receives an RRCReconfiguration message or RRCConnectionReconfiguration message, if ReconfigWithSync information (in case of NR base station) or MobilityControlInfo information (in case of LTE base station) is not included in the RRC message, if the UE can follow the configuration information of the RRC message, or the second condition described in the disclosure is satisfied, the UE may perform operations as follows.

2> If the RRCReconfiguration message or RRCConnectionReconfiguration message received above includes an indicator indicating releasing of the connection of the source base station (or cell) in the DAPS handover procedure 3> The MAC layer device for the source base station (or cell or PCell) is initialized, and the configuration of the MAC layer device for the source PCell is released.

3> For a bearer for which the DAPS handover method is configured or for each DRB having the second PDCP layer device structure (DAPS PDCP layer device structure)

4> The RLC layer device for the source PCell is re-established.

4> RLC layer device and dedicated traffic channel (DTCH) logical channel for the source PCell are released.

4> The second PDCP layer device structure (or the current PDCP layer device) is reconfigured to be or switched to the first PDCP layer device structure (or a normal PDCP layer device structure) or the third PDCP layer device structure. In addition, when the PDCP layer device is reconfigured in the above, the PDCP status report is triggered for the AM DRB or UM DRB, to enable the PDCP status report to be transmitted to the target base station, and enable the target base station to receive the PDCP status report from the UE. As a result, data transmission or reception may be performed continuously without interruption.

3> With regard to respective SRBs,

4> the PDCP layer device configured for the source PCell is released.

4> the RLC layer device and dedicated traffic channel (DTCH) logical channel for the source PCell are released.

3> Configuration information for the physical channel (or physical layer device) configured for the source PCell is released.

FIGS. 11A, 11B, 13A, and 13B illustrate a detailed second embodiment of the method in which, when the DAPS handover method is configured for each bearer through an RRC message (e.g., RRCReconfiguration message or an RRCConnectionReconfiguration message), which is received by the UE, the UE drives different bearer-specific protocol layer devices with respect to an SRB, bearers for which the DAPS handover method is configured, or bearers for which the DAPS handover method is not configured, and the detailed second embodiment is as follows.

1> If the UE receives a handover command message (e.g., RRCReconfiguration message) or receives ReconfigWith-Sync information (in case of NR base station) or Mobility-ControlInfo information (in case of LTE base station) through the RRCReconfiguration message, if the UE can follow the configuration information of the RRC message, the UE can perform one or more of the following operations.

2> The UE may start the first timer of the disclosure.

2> If the second handover method (for example, the second embodiment of the disclosure or the DAPS handover method) is not indicated above, if the DAPS handover method is not indicated for each bearer identifier or logical channel identifier, if the DAPS handover method is not configured for at least one bearer, or if the DAPS handover method is not configured for a predetermined bearer, 3> The UE may interrupt the second timer if the second timer for the source base station of the disclosure is running.

3> The UE may interrupt the third timer if the third timer for the source base station of the disclosure is running.

2> In the above, if the second handover method (for example, the second embodiment of the disclosure or the DAPS handover method) is indicated (or configured), or the DAPS handover method is indicated for each bearer identifier or logical channel identifier, if the DAPS handover method is configured for at least one bearer, or if the DAPS handover method is configured for a predetermined bearer, one or more of the following operations may be performed for a bearer for which the DAPS handover method is configured.

3> The UE does not interrupt the second timer even if the second timer for the source base station of this disclosure is running.

3> The UE may generate or establish a MAC layer device for the target base station. For example, the target Pcell may be applied with the same configuration as that of the source PCell.

3> The UE may apply a new UE identifier (e.g., C-RNTI) in the MAC or PHY layer device with respect to the target base station or for the target base station.

3> The UE may reconfigure the MAC layer device for the source Pcell. Specifically, the MAC layer device for the source Pcell may be reconfigured using MAC layer device configuration information, obtained by excluding configuration information about a logical channel or a bearer for which a DAPS handover method is not configured. Alternatively, the MAC layer device for the source Pcell may be reconfigured using MAC layer device configuration information including configuration information about a logical channel or a bearer for which the DAPS handover method is configured. In addition, the configuration information may include mapping information between a logical channel and a SCell.

3> The UE may deactivate all SCells configured in the MAC layer device for the source base station. However, the source PCell is maintained as it is and data transmission or reception may be continuously performed.

3> There may be a DRB for which each DAPS handover method is configured, may be a list of DRBs for DAPS handover, or may be no list of DRBs for a DAPS handover. With regard to a DRB having an identifier included in the list of DRBs for which the DAPS handover method is configured, or with regard to all DRBs, 4> An RLC layer device and a dedicated control channel (DCCH) logical channel for a target Pcell may be configured or established. For example, the configuration of the target Pcell may be applied with the same configuration as the configuration for the source PCell.

4> The first PDCP layer device structure (or a normal PDCP layer device) may be reconfigured to be or switched to the second PDCP layer device structure (or a DAPS PDCP layer device). Alternatively, the received PDCP layer device configuration information may be applied to the second PDCP layer device structure.

3> There is a DRB for which each DAPS handover method is not configured or a list of DRBs for DAPS handover, and for a DRB that does not include an identifier in the list of DRBs for which the DAPS handover method is configured, 4> the PDCP layer device may be re-established. As described in the disclosure, a security key or ROHC context for a target Pcell may be applied, or data (e.g., PDCP PDU) is generated based on the applied security key or ROHC context for the target Pcell and transmitted or retransmitted. In addition, when the PDCP layer device is re-established in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.

4> The RLC layer device may be re-established and the RLC layer device or the connected DTCH channel may be connected to the target Pcell (or the MAC layer device of the target Pcell).

3> With regard to each SRB,
4> SRBs for a target Pcell are configured or established. Specifically, a PDCP layer device for the target PCell may be configured or established. In addition, an RLC layer device and a dedicated control channel (DCCH) logical channel for a target Pcell may be configured or established. For example, the configuration of the target Pcell may be applied with the same configuration as the configuration for the source PCell. In another method, a new SRB1 for the target PCell may be configured or established, other SRBs (for example, SRB2, SBR3, or SRB4) may re-establish a PDCP layer device or RLC layer device (used for the source PCell) and the PDCP layer device or RLC layer device may be configured or established for the target PCell.
4> SRBs for the source PCell are suspended. Alternatively, if there are data or RRC messages stored in SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted. As another method, SRB1 for the source PCell may be suspended and other SRBs (e.g., SRB2, SBR3, or SRB4) may be released.
2> Otherwise, or if the second handover method (for example, the second embodiment of the disclosure or the DAPS handover method) is not indicated (or is not configured), if the DAPS handover method is not configured (or is not indicated) for each bearer identifier or logical channel identifier, if the DAPS handover method is not configured for at least one bearer, or if the DAPS handover method is not configured for a predetermined bearer, one or more of the following operations may be performed.
3> If the DAPS handover method is configured, the MCG MAC layer device or SCG MAC layer device is initialized.
3> If the DAPS handover method is configured, the configuration or context for the uplink compressed data method is released.
3> The PDCP layer device may be re-established for all bearers (e.g., DRBs or SRBs) for which the PDCP layer device is established or configured.
3> The MCG RLC or SCG RLC layer device may be re-established for all bearers (e.g., DRBs or SRBs) for which the RLC layer device is established or configured.
1> If the MAC layer device successfully completes the random access procedure (or the first condition described in this disclosure is satisfied)
1> Alternatively, if an indicator (for example, rach-Skip) indicating skipping of the random access procedure is configured, and the MAC layer device indicates successful reception of the PDCCH transmission corresponding to the UE identifier (C-RNTI),
2> the first timer (for example, T304) is interrupted.
2> If the second handover method (for example, the second embodiment of the disclosure or DAPS handover method) is configured as above, if the DAPS handover method is indicated for each bearer identifier or logical channel identifier, if the DAPS handover method is configured for at least one bearer, or if the DAPS handover method is configured for a predetermined bearer
3> the second timer is interrupted if the second timer (for example, T310) is running.
3> the third timer is interrupted if the third timer (for example, T312) is running.

3> Uplink data switching may be triggered or indicated for each bearer for which the second handover method or the DAPS handover method is configured or each bearer (or lower layer device or PDCP layer device) for which a DAPS PDCP layer device is configured. In addition, when the uplink data switching is indicated in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.
3> MCG configuration information may be released. The MCG configuration information may include configuration information of each bearer or SDAP, PDCP, RLC, MAC, or PHY layer device information, UE identifier information, or security information.
3> If there is SCG configuration information, the SCG configuration information may be released. The SCG configuration information may include configuration information of each bearer or SDAP, PDCP, RLC, MAC, or PHY layer device information, UE identifier information, or security information.
2> System information may be read from the target PCell.
1> If the first timer of this disclosure has expired (for example, if the handover procedure has failed)
2> If the first timer for handover (for example, T304) has expired or if handover has failed
3> If random access-related configuration information is configured, designated preamble information is released.
3> If the second handover method (e.g., the second embodiment of the disclosure or the DAPS handover method) is not configured (or is not indicated), the DAPS handover method is not configured for each bearer identifier or logical channel identifier (or not indicated), if DAPS handover method is not configured for at least one bearer, or if DAPS handover method is not configured for a predetermined bearer,
3> Alternatively, if the second handover method (for example, the second embodiment of the disclosure or the DAPS handover method) is configured (or indicated), if the DAPS handover method is indicated for each bearer identifier or logical channel identifier, if the DAPS handover method is configured for at least one bearer, or if the DAPS handover method is configured for a predetermined bearer, and if the wireless connection between the source base station and the UE fails (or radio link failure (RLF) is detected or if the wireless connection between the source Pcell and the UE has failed (or if the second timer or the third timer has expired, if there is a problem in random access, if the number of retransmissions has reached the maximum number of retransmissions, or if an indication indicating out-of-synchronization is received more than a predetermined number of times),
4> It is possible to perform fall back, return, or recovery by using configuration information used in the source Pcell, excluding physical layer device configuration information, MAC layer device configuration information, or transmission resource information
4> the measured frequency or cell information is configured and prepared to be reported, and the same is reported to a cell or base station to be accessed.
4> RRC connection re-establishment procedure may be performed.
3> In the above, if the second handover method (for example, the second embodiment of the disclosure or the DAPS handover method) is configured (or indicated), if the DAPS handover method is configured (or indicated) for each bearer identifier or logical channel identifier, if the DAPS handover method is configured for at least one bearer, if the DAPS handover method is configured for a predetermined bearer, and the radio connection between the source base station and the UE has not failed (or if radio link failure (RLF) is not detected (e.g., if the second or third timer has not expired, if a random access problem has not occurred, if the number of retransmissions has not reached the maximum number of retransmissions, or if an indication indicating out-of-synchronization is not received more than a predetermined number of times)), or if the wireless connection between the source Pcell and the UE has not failed (or if the second timer or the third timer has not expired), 4> the MAC layer device for the target PCell may be initialized or released.

4> With regard to a DRB for which each DAPS handover method is configured, or if there is a list in which the DAPS handover method is configured, with regard to all DRBs included in the list, or with regard to all DRBs if there is no list in which the DAPS handover method is configured, 5> the RLC layer device for the target Pcell may be re-established and released, or an associated DTCH logical channel may be released.

5> The PDCP layer device (e.g., DAPS PDCP layer device or the second PDCP layer device structure) may be reconfigured to be a normal PDCP layer device (e.g., the first PDCP layer device structure). In addition, when the PDCP layer device is reconfigured in the above, the PDCP status report is triggered for the AM DRB or UM DRB, the PDCP status report is enabled to be transmitted to the source base station, and the source base station is enabled to receive the PDCP status report from the UE. As a result, data transmission or reception may be performed continuously without interruption.

4> For each DRB for which the DAPS handover method is not configured, or if there is a list for which the DAPS handover method is configured, for DRBs not included in the list 5> The PDCP layer device may be re-established. Alternatively, a higher layer device (e.g., an RRC layer device) may indicate a PDCP layer device re-establishment procedure for the bearer. Alternatively, the UE may transmit a message indicating that the DAPS handover has failed through the SRB for the source base station to the source base station, and then may receive an RRC message (e.g., RRCReconfiguration message) from the base station as a response message thereto. In addition, the UE may perform a PDCP re-establishment procedure for each bearer including an indicator indicating re-establishment of the PDCP layer device according to the indication of the message. Alternatively, the UE may receive the RRC message from a higher layer device (e.g., an RRC layer device), identify the indicator, and indicate a PDCP layer device re-establishment procedure for the bearer. As described in the disclosure, a security key or ROHC context for the source Pcell may be applied, or data (for example, PDCP PDU) may be generated based on the applied security key or ROHC context (or data compression context) for the source Pcell to perform transmission or retransmission. In the disclosure, when the UE receives a handover command message or an RRC message indicating a DAPS handover method, the UE performs PDCP layer device re-establishment procedure based on a security key or an ROHC context for a target Pcell, with respect to a bearer for which the DAPS handover method is not configured, so that data for the target base station may be generated for the AM DRB or UM DRB and thus the data generated for the target base station should be discarded. This is because an error occurs when data for the target base station is transmitted when falling back to the source base station. Therefore, when falling back to the source base station, the re-establishment procedure of the PDCP layer device may be performed in order to update the security configuration information, ROHC context, or data compression configuration information for the target PCell with the security configuration information, ROHC context, or data compression configuration information for the source PCell. In addition, when the PDCP layer device is re-established in the above, the PDCP status report is triggered for the AM DRB or UM DRB, to enable the PDCP status report to be transmitted to the source base station, and enable the source base station to receive the PDCP status report from the UE. As a result, data transmission or reception may be continuously performed without interruption.

5> The RLC layer device may be re-established and the RLC layer device or the connected DTCH channel may be connected to the source Pcell (or the MAC layer device of the source Pcell).

5> As another method above, for each DRB in which the DAPS handover method is not configured or if there is a list in which the DAPS handover method is configured, the PDCP layer device or the RLC layer devices are released for the DRBs that are not included in the list. This is because it is possible to simply release the PDCP re-establishment procedure without performing the same, and allow the base station to reconfigure the bearers by using the RRC message (for example, RRCReconfiguration message).

4> Suspended SRBs, which are configured in the MAC layer device for the source base station or with respect to the source base station (or source PCell), are resumed.

4> The MAC layer device for the source Pcell may be reconfigured. Specifically, the MAC layer device for the source Pcell may be reconfigured using original MAC layer device configuration information (for example, configuration information before receiving the handover command message) including information on the bearer for which the DAPS handover method is not configured or the logical channel again. In addition, the configuration information may include mapping information between a logical channel and a SCell.

4> The PDCP layer device for the target Pcell may be re-established or released.

4> The RLC layer device for the target PCell may be re-established or released, or an associated DTCH logical channel may be released.

4> When resuming the SRBs for the source Pcell, if there are data or RRC messages stored in the SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted. As another method, the suspended SRB1 for the source PCell may be resumed and other SRBs (e.g., SRB2, SBR3, SRB4) may re-establish the PDCP layer device or RLC layer device (which has been re-established or configured for the target PCell) and the PDCP layer device or RLC layer device may be configured or established for the source PCell. Alternatively, because the handover procedure has failed, SRB1 that has been configured or established for the target Pcell may be released.

4> In order to fall back to the source base station, a procedure of re-acquiring necessary system information from the source PCell may be performed.

4> A handover failure message may be configured through the resumed SRBs and transmitted to the source base station. Alternatively, DRBs may be resumed and data transmission or reception may be resumed.

1> If the UE detects a wireless connection problem in the physical layer device

2> If the second handover method (for example, the second embodiment of the disclosure or the DAPS handover method) is configured, if the DAPS handover method is configured for each bearer identifier or logical channel identifier, if the DAPS handover method is configured for at least one bearer, if the DAPS handover method is configured for a predetermined bearer, and if an indicator (out-of-sync indication) indicating that radio connection signals are out of synchronization is received, from a lower layer device (for example, a MAC layer device or a PHY layer device), a predetermined number of times (for example, the base station may configure the number of times) when predetermined timers (for example, T300 (a timer for RRC connection establishment procedure), T301 (a timer for RRC connection re-establishment procedure), or T311 (a timer for RRC connection re-establishment procedure)) are not running, and a problem in the physical layer device is detected, 3> a second timer (e.g., T310) may be started.

2> If an indicator (out-of-sync indication) indicating that radio connection signals are out of synchronization is received, from a lower layer device (for example, a MAC layer device or a PHY layer device), a predetermined number of times (for example, the base station may configure the number of times) and a problem in the physical layer device is detected, and the first timer or another timer T300, T301, T304, T311, or T319 is not running, 3> A second timer (e.g., T310) may be started. However, if the first timer is running when the DAPS handover method is not configured, the second timer is not started even when a problem in the physical layer detected.

1> If the second handover method (e.g., the second embodiment of the disclosure or DAPS handover method) is configured (or indicated) above, if the DAPS handover method is configured (or indicated) for each bearer identifier or logical channel identifier, if the DAPS handover method is configured for at least one bearer, or if the DAPS handover method is configured for a predetermined bearer, and the first timer is running (or the handover procedure is in progress), 2> If the wireless connection between the source base station and the UE fails (or the radio link failure (RLF) is detected (for example, if the second timer or the third timer has expired, if there is a problem in random access, if the number of times of retransmission reaches the maximum number of retransmissions, or if an out-of-sync indication is received more than a predetermined number of times)), or if the wireless connection between the source Pcell and the UE fails (or if the second timer or the third timer has expired), 3> the MAC layer device for the source PCell may be initialized or the MAC layer device configuration information may be released.

3> There may be a DRB for which each DAPS handover method is configured, or may be a list for which the DAPS handover method is configured. With regard to DRBs included in the list, or with regard to all DRBs if there is no list for which the DAPS handover method is configured, 4> The RLC layer device for the source Pcell may be re-established or released, or an associated DTCH logical channel may be released.

4> The PDCP layer device (for example, a DAPS PDCP layer device or a second PDCP layer device structure) may be reconfigured to be a normal PDCP layer device (for example, a first PDCP layer device structure).

3> With regard to each SRB,

4> The PDCP layer device for the source PCell may be re-established or released.

4> The RLC layer device for the source Pcell may be re-established or released, or the associated DTCH logical channel may be released.

3> Physical layer device configuration information for the source Pcell may be released.

3> Alternatively, when security configuration information is activated and SRBs or DRBs are configured, or in another method, all DRBs configured for the source Pcell may be suspended.

1> When receiving a handover command message (e.g., RRCReconfiguration message) or receiving ReconfigWithSync information (in case of NR base station) or MobilityControlInfo information (in case of LTE base station) through the RRCReconfiguration message, or if the random access procedure triggered by the target base station or the MAC layer device of a cell group is successfully completed, the RRC layer device of the UE 2> interrupts the first timer for the source base station, target base station, or cell group.

2> interrupts the second timer if the second timer for the source base station is running (during handover). This is because when the second timer expires, an unnecessary RRC connection re-establishment procedure may be triggered.

2> If the second handover method (for example, the second embodiment of the disclosure or the DAPS handover method) is configured according to another method, or if the DAPS handover method is configured for each bearer identifier or logical channel identifier, 3> the RRC layer device of the UE interrupts the second timer if the second timer for the source base station is running. This is because when the second timer expires, an unnecessary RRC connection re-establishment procedure may be triggered.

2> The RRC layer device of the UE interrupts the third timer for the source base station, target base station, or cell group.

1> When the UE receives an RRCReconfiguration message or RRCConnectionReconfiguration message, if ReconfigWithSync information (in case of NR base station) or MobilityControlInfo information (in case of LTE base station) is not included in the RRC message, if the UE can follow the configuration information of the RRC message, or the second condition described in the disclosure is satisfied, the UE may perform operations as follows.

2> If the RRCReconfiguration message or RRCConnectionReconfiguration message received above includes an indicator indicating releasing of the connection of the source base station (or cell) in the DAPS handover procedure 3> The MAC layer device for the source base station (or cell or PCell) is initialized, and the configuration of the MAC layer device for the source PCell is released.

3> For a bearer for which the DAPS handover method is configured or for each DRB having the second PDCP layer device structure (DAPS PDCP layer device structure)

4> The RLC layer device for the source PCell is re-established.

4> The RLC layer device and the dedicated traffic channel (DTCH) logical channel for the source PCell are released.

4> The second PDCP layer device structure (or the current PDCP layer device) is reconfigured to be or switched to the first PDCP layer device structure (or a normal PDCP layer device structure) or the third PDCP layer device structure. In addition, when the PDCP layer device is reconfigured in the above, the PDCP status report is triggered for the AM DRB or UM DRB, to enable the PDCP status report to be transmitted to the target base station, and enable the target base station to receive the PDCP status report from the UE. As a result, data transmission or reception may be performed continuously without interruption.

3> With regard to respective SRBs,

4> the PDCP layer device configured for the source PCell is released.

4> RLC layer device and dedicated traffic channel (DTCH) logical channel for the source PCell are released.

3> Configuration information for the physical channel (or physical layer device) configured for the source PCell is released.

Referring to FIGS. 12A, 12B, 14A, and 14B, they illustrate a detailed third embodiment of the method in which, when the DAPS handover method is indicated to each bearer through an RRC message (e.g., RRCReconfiguration message or an RRCConnectionReconfiguration message), which is received by the UE, the UE drives different bearer-specific protocol layer devices with respect to an SRB, bearers for which the DAPS handover method is configured, or bearers for which the DAPS handover method is not configured, and the detailed third embodiment is as follows.

1> If the UE receives a handover command message (e.g., RRCReconfiguration message) or receives ReconfigWithSync information (in case of NR base station) or MobilityControlInfo information (in case of LTE base station) through the RRCReconfiguration message, if the UE can follow the configuration information of the RRC message, the UE can perform one or more of the following operations.

2> The UE may start the first timer of the disclosure.

2> If the second handover method (for example, the second embodiment of the disclosure or the DAPS handover method) is not indicated above, if the DAPS handover method is not indicated for each bearer identifier or logical channel identifier, if the DAPS handover method is not configured for at least one bearer, or if the DAPS handover method is not configured for a predetermined bearer, 3> the UE may interrupt the second timer if the second timer for the source base station of the disclosure is running.

3> the UE may interrupt the third timer if the third timer for the source base station of the disclosure is running.

2> In the above, if the second handover method (for example, the second embodiment of the disclosure or the DAPS handover method) is indicated (or configured), or the DAPS handover method is indicated for each bearer identifier or logical channel identifier, if the DAPS handover method is configured for at least one bearer, or if the DAPS handover method is configured for a predetermined bearer, one or more of the following operations may be performed for a bearer for which the DAPS handover method is configured.

3> Even if the second timer for the source base station of this disclosure is running, the UE does not interrupt the second timer.

3> The UE may generate or establish a MAC layer device for the target base station. For example, the UE may apply the target Pcell with the same configuration as that of the source PCell.

3> The UE may apply a new UE identifier (e.g., C-RNTI) in the MAC or PHY layer device with respect to the target base station or for the target base station.

3> The UE may reconfigure a MAC layer device for the source Pcell. Specifically, the UE may reconfigure the MAC layer device for the source Pcell by using MAC layer device configuration information, obtained by excluding configuration information about a bearer for which a DAPS handover method is not configured or configuration information about a logical channel. Alternatively, the UE may reconfigure the MAC layer device for the source Pcell by using MAC layer device configuration information including configuration information about a bearer for which the DAPS handover method is configured or configuration information about a logical channel. In addition, the configuration information may include mapping information between a logical channel and a SCell.

3> The UE may deactivate all SCells configured in the MAC layer device for the source base station. However, the source PCell is maintained as it is and data transmission or reception may be continuously performed.

3> There may be a DRB for which each DAPS handover method is configured, may be a list of DRBs for DAPS handover, or may be no list of DRBs for a DAPS handover. With regard to a DRB having an identifier included in the list of DRBs for which the DAPS handover method is configured, or with regard to all DRBs, 4> an RLC layer device and a dedicated control channel (DCCH) logical channel for a target Pcell may be configured or established. For example, the configuration of the target Pcell may be applied with the same configuration as the configuration for the source PCell.

4> The first PDCP layer device structure (or a normal PDCP layer device) may be reconfigured to be or switched to the second PDCP layer device structure (or a DAPS PDCP layer device). Alternatively, the received PDCP layer device configuration information may be applied to the second PDCP layer device structure.

3> There is a DRB for which each DAPS handover method is not configured or a list of DRBs for DAPS handover, and for a DRB that does not include an identifier in the list of DRBs for which the DAPS handover method is configured, 4> The DRBs may be suspended. That is, UM DRBs or AM DRBs for which the DAPS handover methods are not indicated may be suspended.

4> Alternatively, for the UM DRBs or AM DRBs, a PDCP layer device suspend procedure (PDCP layer device suspend) may be triggered or indicated for a lower layer device or a PDCP layer device. As another method, only some of the following procedures may be triggered or indicated. As another method, the following procedures or some of the following procedures may be performed on bearers (UM DRB or AM DRB) for which the DAPS handover method is not configured when the DAPS handover procedure fails and the fallback procedure is performed.

5> In the above, the procedures performed in the PDCP layer device of the UM DRB or AM DRB may be embodied as follows, and some or all of the following procedures may be performed.

6> When initializing the count value or the window state variable value, in order to solve a security issue caused by reusing the same count value from the beginning when performing the DAPS handover fallback procedure (when performing the DAPS handover fallback procedure, the risk of exposure of security keys caused by transmitting different data with the same security key and the same count value), the count value, the transmission window state variable (TX_NEXT), or the receiving window state variable (RX_NEXT and RX_DELIV) is not initialized and the existing variable values are continuously used or maintained.

6> In order to discard old data for efficient buffer operation, data stored in the transmitting PDCP layer device (e.g., PDCP PDU or PDCP SDU) may be discarded. As another method, when discarding the stored data above, only the PDCP PDUs are discarded, and the PDCP SDUs, which are original data, are stored or maintained as they are in order to prevent data loss, or the PDCP SDUs may be processed again through a PDCP re-establishment procedure or bearer resumption procedure in the future and transmitted.

6> In order to quickly transmit the stored data (PDCP SDU or PDCP PDU) to a higher layer device while a PDCP reordering timer is running, the PDCP reordering timer is interrupted and initialized if the PDCP reordering timer is running, and the stored data may be decompressed if the stored data is compressed and may be transmitted to the higher layer in ascending order of count values.

6> If the receiving PDCP layer device receives pieces of data from the lower layer device (RLC layer device) through the RLC re-establishment procedure, the received pieces of data are also decoded and integrity verification thereof is performed if necessary. In addition, if necessary, header decompression is performed, the PDCP reordering timer is interrupted and initialized, and thus when transmitting pieces of data to a higher layer, the data may be ordered and transmitted in ascending order of count value (this is a useful operation in a case of EN-DC (connected to the LTE base station and NR base station)) or in a case of using the NR PDCP layer device by the LTE base station, that is, when the NR PDCP layer device is connected to the LTE RLC layer device and the LTE RLC layer device is re-established).

6> As another method, the count value used for the security key is initialized, and the transmission window state variable (TX_NEXT) may be initialized to be the initial value so that variable synchronization with the base station is possible when reconnecting to the network later. In addition, the count value used for the security key is initialized, and the receiving window state variables (RX_NEXT and RX_DELIV) may be initialized to be the initial values so that variable synchronization with the base station is possible when reconnecting to the network later.

4> When an RLC re-establishment procedure is indicated for the UM DRBs or AM DRBs, an RLC layer device re-establishment procedure may be performed. According to the above RLC layer device re-establishment procedure, if there are pieces of received data, when the pieces of data are processed and transmitted to a higher layer device or the transmission or reception window state variables are initialized, or when pieces of transmission data are not yet transmitted, a procedure of discarding stored data (RLC SDU or RLC PDU) may be performed.

3> With regard to each SRB,

4> SRBs for a target Pcell are configured or established. Specifically, a PDCP layer device for the target PCell may be configured or established. In addition, an RLC layer device and a dedicated control channel (DCCH) logical channel for a target Pcell may be configured or established. For example, the target Pcell may be applied with the same configuration as the configuration of the source PCell. As another method, new SRB1 for the target PCell may be configured or established, and other SRBs (e.g., SRB2 or SBR3 or SRB4) may be suspended. As another method, new SRB1 for the target PCell may be configured or established when the first condition described in the disclosure is satisfied.

4> SRBs for the source PCell are suspended. Alternatively, if there are data or RRC messages stored in SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted.

2> Otherwise, or if the second handover method (for example, the second embodiment of the disclosure or the DAPS handover method) is not indicated (or is not configured) above, if the DAPS handover method is not indicated (or is not configured) for each bearer identifier or logical channel identifier, if the DAPS handover method is not configured for at least one bearer, or if the DAPS handover method is not configured for a predetermined bearer, one or more of the following operations may be performed.

3> If the DAPS handover method is configured, the MCG MAC layer device or SCG MAC layer device is initialized.

3> If the DAPS handover method is configured, the configuration or context for the uplink compressed data method is released.

3> The PDCP layer device may be re-established for all bearers (e.g., DRBs or SRBs) for which the PDCP layer device is established or configured.

3> The MCG RLC or SCG RLC layer device may be re-established for all bearers (e.g., DRBs or SRBs) for which the RLC layer device is established or configured.

1> If the MAC layer device successfully completes the random access procedure (or the first condition described in this disclosure is satisfied)

1> Alternatively, if an indicator (for example, rach-Skip) indicating skipping of the random access procedure is configured, and the MAC layer device indicates successful reception of the PDCCH transmission corresponding to the UE identifier (C-RNTI), 2> the first timer (for example, T304) is interrupted.

2> If the second handover method (for example, the second embodiment of the disclosure or DAPS handover method) is configured as above, if the DAPS handover method is indicated for each bearer identifier or logical channel identifier, if the DAPS handover method is configured for at least one bearer, or if the DAPS handover method is configured for a predetermined bearer, 3> the second timer (for example, T310) is interrupted if the second timer is running.

3> the third timer (for example, T312) is interrupted if the third timer is running.

3> Uplink data switching may be triggered or indicated for each bearer for which the second handover method or the DAPS handover method is configured or each bearer (or lower layer device or PDCP layer device) for which a DAPS PDCP layer device is configured. In addition, when the uplink data switching is indicated in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.

3> There is a DRB for which a DAPS handover method is not configured or a list of DRBs for which DAPS handover is configured, and for a DRB, the identifier of which is not included in a list of DRBs for which the DAPS handover method is configured, 4> The PDCP layer device may be re-established. As described in the disclosure, a security key or ROHC context for a target Pcell may be applied, or data (e.g., PDCP PDU) may be generated based on a security key or ROHC context for the applied target Pcell and transmitted or retransmitted. In addition, when the PDCP layer device is re-established in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.

4> The RLC layer device may be re-established, and the RLC layer device or the connected DTCH channel may be connected to the target Pcell (or the MAC layer device of the target Pcell).

3> MCG configuration information may be released. The MCG configuration information may include configuration information of each bearer or SDAP, PDCP, RLC, MAC, or PHY layer device information, UE identifier information, security information, and the like.

3> If there is SCG configuration information, the SCG configuration information may be released. The SCG configuration information may include configuration information of each bearer or SDAP, PDCP, RLC, MAC, or PHY layer device information, UE identifier information, security information, and the like.

3> Other SRBs (for example, SRB2, SBR3, or SRB4) may re-establish a PDCP layer device or RLC layer device (used for the source PCell) and may configure or establish the same for the target PCell. As another method, new SRB1 for the target PCell may be configured or established when the first condition described in the disclosure is satisfied.

2> System information may be read from the target PCell.

1> If the first timer of this disclosure has expired (for example, if the handover procedure has failed)

2> If the first timer (for example, T304) for handover has expired or if handover has failed 3> If random access-related configuration information is configured, designated preamble information is released.

3> If the second handover method (e.g., the second embodiment of the disclosure or the DAPS handover method) is not configured (or is not indicated), if the DAPS handover method is not configured (or not indicated) for each bearer identifier or logical channel identifier, if the DAPS handover method is not configured for at least one bearer, or if the DAPS handover method is not configured for a predetermined bearer, 3> Alternatively, if the second handover method (for example, the second embodiment of the disclosure or the DAPS handover method) is configured (or indicated), if the DAPS handover method is indicated for each bearer identifier or logical channel identifier, if the DAPS handover method is configured for at least one bearer, or if the DAPS handover method is configured for a predetermined bearer and if the wireless connection between the source base station and the UE fails (or radio link failure (RLF) is detected), or if the wireless connection between the source Pcell and the UE has failed (or if the second timer or the third timer has expired, if there is a problem in random access, if the number of retransmissions has reached the maximum number of retransmissions, or if an indication indicating out-of-synchronization is received more than a predetermined number of times), 4> it is possible to perform fall back, return, or recovery by using configuration information used in the source Pcell, excluding physical layer device configuration information, MAC layer device configuration information, or transmission resource information 4> the measured frequency or cell information is configured and prepared to be reported, and the same may be reported to a cell or base station to be accessed.

4> RRC connection re-establishment procedure may be performed.

3> In the above, if the second handover method (for example, the second embodiment of the disclosure or the DAPS handover method) is configured (or indicated), if the DAPS handover method is configured (or indicated) for each bearer identifier or logical channel identifier, if the DAPS handover method is configured for at least one bearer, if the DAPS handover method is configured for a predetermined bearer and the radio connection between the source base station and the UE has not failed (or if the radio link failure (RLF) is not detected (e.g., if the second or third timer has not expired, if a random access problem has not occurred, if the number of retransmissions has not reached the maximum number of retransmissions, or if an indication indicating out-of-synchronization is not received more than a predetermined number of times)), or if the wireless connection between the source Pcell and the UE has not failed (or if the second timer or the third timer has not expired), 4> the MAC layer device for the target PCell may be initialized or released.

4> With regard to a DRB for which each DAPS handover method is configured, if there is a list of DRBs for which the DAPS handover method is configured, with regard to DRBs included in the list, or with regard to all DRBs if there is no list of DRBs for which the DAPS handover method is configured, 5> the RLC layer device for the target Pcell may be re-established and released, or an associated DTCH logical channel may be released.

5> The PDCP layer device (e.g., the DAPS PDCP layer device or the second PDCP layer device structure) may be reconfigured to be a normal PDCP layer device (e.g., the first PDCP layer device structure). In addition, when the PDCP layer device is reconfigured in the above, the PDCP status report is triggered for the AM DRB or UM DRB, the PDCP status report is enabled to be transmitted to the source base station, and the source base station is enabled to receive the PDCP status report from the UE. As a result, data transmission or reception may be performed continuously without interruption.

4> For each DRB for which the DAPS handover method is not configured, or if there is a list of DRBs for which the DAPS handover method is configured, for DRBs not included in the list, 5> The DRBs may be resumed. Alternatively, the suspended DRBs above may be resumed. In addition, the PDCP status report is triggered for the AM DRB or UM DRB, the PDCP status report is enabled to be transmitted to the source base station, and the source base station is enabled to receive the PDCP status report from the UE. As a result, data transmission or reception may be performed continuously without interruption.

4> Suspended SRBs, which are configured in the MAC layer device for the source base station or with respect to the source base station (or source PCell), are resumed.

4> The MAC layer device for the source Pcell may be reconfigured. Specifically, the MAC layer device for the source Pcell may be reconfigured using original MAC layer device configuration information (for example, configuration information before receiving the handover command message) including information on a bearer for which the DAPS handover method is not configured or a logical channel again. In addition, the configuration information may include mapping information between a logical channel and a SCell.

4> The PDCP layer device for the target Pcell may be re-established or released.

4> The RLC layer device for the target PCell may be re-established or released, or an associated DTCH logical channel may be released.

4> When resuming the SRBs for the source Pcell, if there are data or RRC messages stored in the SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted.

4> In order to fall back to the source base station, a procedure of re-acquiring necessary system information from the source PCell may be performed.

4> A handover failure message may be configured through the resumed SRBs and transmitted to the source base station. Alternatively, DRBs may be resumed and data transmission or reception may be resumed. Alternatively, because the handover procedure has failed, SRB1 that has been configured or established for the target Pcell may be released.

1> If the UE detects a problem in wireless connection in a physical layer device, 2> If the second handover method (for example, the second embodiment of the disclosure or the DAPS handover method) is configured, if the DAPS handover method is configured for each bearer identifier or logical channel identifier, if the DAPS handover method is configured for at least one bearer, if the DAPS handover method is configured for a predetermined bearer, and if an indicator (out-of-sync indication) indicating that radio connection signals are out of synchronization is received from a lower layer device (for example, a MAC layer device or a PHY layer device) a predetermined number of times (for example, the base station may configure the number of times) when predetermined timers (for example, T300 (a timer for RRC connection establishment procedure), T301 (a timer for RRC connection re-establishment procedure), or T311 (a timer for RRC connection re-establishment procedure)) are not running, and thus a problem in the physical layer device is detected, 3> A second timer (e.g., T310) may be started.

2> If an indicator (out-of-sync indication) indicating that radio connection signals are out of synchronization is received from a lower layer device (for example, a MAC layer device or a PHY layer device) a predetermined number of times (for example, the base station may configure the number of times) and thus a problem in the physical layer device is detected, and the first timer, T300, T301, T304, T311, or T319 timers are not running, 3> A second timer (e.g., T310) may be started. However, if the first timer is running when the DAPS handover method is not configured, the second timer is not started even when a problem in the physical layer detected.

1> If the second handover method (e.g., the second embodiment of the disclosure or DAPS handover method) is configured (or indicated) above, if the DAPS handover method is configured (or indicated) for each bearer identifier or logical channel identifier, if the DAPS handover method is configured for at least one bearer, if the DAPS handover method is configured for a predetermined bearer, and if the first timer is running (or if the handover procedure is in progress), 2> If the wireless connection between the source base station and the UE fails (or if a radio link failure (RLF) is detected (for example, if the second timer or the third timer has expired, if there is a problem in random access, if the number of times of retransmission reaches the maximum number of retransmissions, or if an out-of-sync indication is received more than a predetermined number of times)), or if the wireless connection between the source Pcell and the UE fails (or if the second timer or the third timer has expired), 3> The MAC layer device for the source PCell may be initialized or the MAC layer device configuration information may be released.

3> With regard to a DRB for which each DAPS handover method is configured, if there is a list of DRBs for which the DAPS handover method is configured, with regard to DRBs included in the list, or with regard to all DRBs if there is no list of DRBs for which the DAPS handover method is configured 4> The RLC layer device for the source Pcell may be re-established or released, or an associated DTCH logical channel may be released.

4> The PDCP layer device (for example, a DAPS PDCP layer device or a second PDCP layer device structure) may be reconfigured to be a normal PDCP layer device (for example, a first PDCP layer device structure).

3> With regard to a DRB for which each DAPS handover method is configured, if there is a list of DRBs for which the DAPS handover method is configured, or with regard to DRBs that are not included in the list, 4> The RLC layer device for the source Pcell may be re-established or released, or an associated DTCH logical channel may be released.

4> The PDCP layer device for the source PCell may be re-established or released.

3> With regard to each SRB,

4> The PDCP layer device for the source PCell may be re-established or released.

4> The RLC layer device for the source Pcell may be re-established or released, or the associated DTCH logical channel may be released.

3> Physical layer device configuration information for the source Pcell may be released.

3> Alternatively, when security configuration information is activated and SRBs or DRBs are configured, or in another method, all DRBs configured for the source Pcell may be suspended.

1> Upon receiving a handover command message (e.g., RRCReconfiguration message), or upon receiving ReconfigWithSync information (in case of NR base station) or MobilityControlInfo information (in case of LTE base station) through the RRCReconfiguration message, or if the random access procedure triggered by the target base station or the MAC layer device of a cell group is successfully completed, the RRC layer device of the UE, 2> interrupts the first timer for the source base station, target base station, or cell group.

2> interrupts the second timer if the second timer for the source base station is running (during handover). This is because when the second timer expires, an unnecessary RRC connection re-establishment procedure may be triggered.

2> If the second handover method (for example, the second embodiment of the disclosure or the DAPS handover method) is configured according to another method, or if the DAPS handover method is configured for each bearer identifier or logical channel identifier, 3> The RRC layer device of the UE interrupts the second timer if the second timer for the source base station is running. This is because when the second timer expires, an unnecessary RRC connection re-establishment procedure may be triggered.

2> the RRC layer device of the UE interrupts the third timer for the source base station, target base station, or cell group.

1> When the UE receives an RRCReconfiguration message or RRCConnectionReconfiguration message, if ReconfigWithSync information (in case of NR base station) or MobilityControlInfo information (in case of LTE base station) is not included in the RRC message, if the UE can follow the configuration information of the RRC message, or the second condition described in the disclosure is satisfied, the UE may perform operations as follows.

2> If the RRCReconfiguration message or RRCConnectionReconfiguration message received above includes an indicator indicating releasing of the connection of the source base station (or cell) in the DAPS handover procedure, 3> the UE initializes the MAC layer device for the source base station (or cell or PCell), and releases the configuration of the MAC layer device for the source PCell.

3> For a bearer for which the DAPS handover method is configured or for each DRB having the second PDCP layer device structure (DAPS PDCP layer device structure)

4> The RLC layer device for the source PCell is re-established.

4> The RLC layer device and dedicated traffic channel (DTCH) logical channel for the source PCell are released.

4> The second PDCP layer device structure (or the current PDCP layer device) is reconfigured to be or switched to the first PDCP layer device structure (or a normal PDCP layer device structure) or the third PDCP layer device structure. In addition, when the PDCP layer device is reconfigured in the above, the PDCP status report is triggered for the AM DRB or UM DRB, to enable the PDCP status report to be transmitted to the target base station, and enable the target base station to receive the PDCP status report from the UE. As a result, data transmission or reception may be performed continuously without interruption.

3> With regard to respective SRBs,

4> the PDCP layer device configured for the source PCell is released.

4> RLC layer device and dedicated traffic channel (DTCH) logical channel for the source PCell are released.

3> Configuration information for the physical channel (or physical layer device) configured for the source PCell is released.

In the disclosure, the base station may denote a cell or a PCell. That is, the source base station denotes a source cell or a source PCell, and the target base station denotes a target cell or a target PCell.

Figure 16:
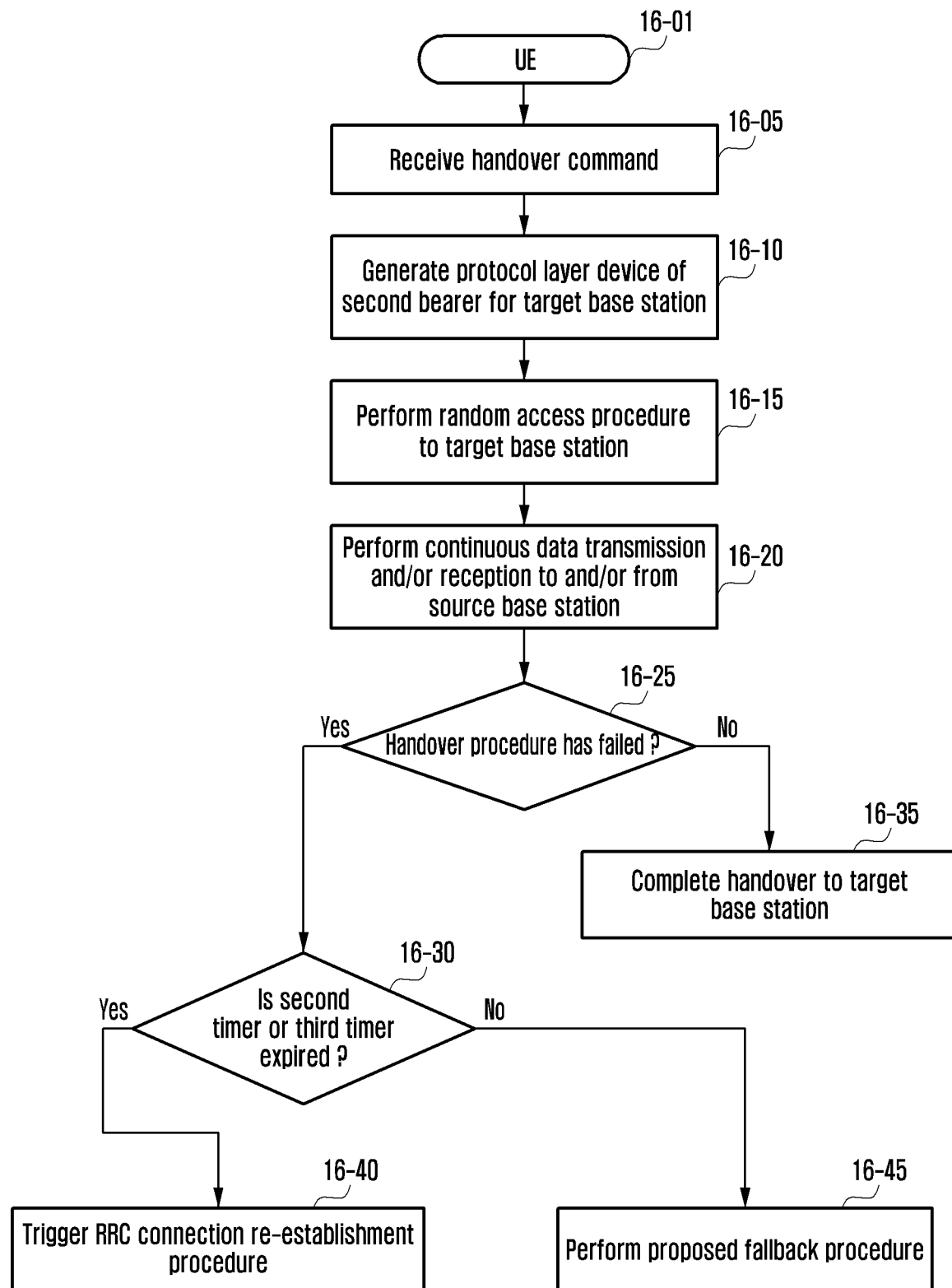
FIG. 16 illustrates a UE operation of performing a fallback procedure when a handover fails in the DAPS handover method according to an embodiment of the disclosure.

FIG. 16 illustrates a UE operation of performing a fallback procedure when a handover fails in the DAPS handover method according to an embodiment of the disclosure.

Referring to FIG. 16, a UE 16-01 may transmit or receive data to or from a source base station through a first PDCP layer device structure for each bearer. However, when a handover command message is received (indicated by reference numeral 16-05) and the DAPS handover method of the second embodiment of the disclosure is indicated through the handover command message, or when a DAPS handover method is indicated for each bearer, the UE switches, a target base station, which is indicated through the message, to the structure of the second PDCP layer device, for each bearer or the bearers for which the DAPS handover methods are indicated, and configures and establishes the protocol layer devices of the second bearer. In addition, even when performing the procedure of random access to the target base station through the established protocol layer devices (indicated by reference numerals 16-10 and 16-15), the UE transmits or receives data (uplink data transmission and downlink data reception) to or from the source base station through protocol layer devices of the first bearer (indicated by reference numeral 16-20).

If the UE successfully completes the handover procedure at operation 16-25, the UE completes the handover procedure according to the second embodiment (DAPS handover method) of the handover method of the disclosure (indicated by reference numeral 16-35).

However, if the UE fails the handover procedure at operation 16-25 (for example, if the first timer above has expired (for example, if the procedure of handover to the target base station fails)); if the number of times of retransmission by the RLC layer device exceeds the maximum number of times of retransmissions; when a handover command message is received in the above, if the UE fails the handover because the configuration information of the handover command message has a value exceeding the UE capability or an error occurs in the application of the configuration information; if a problem in performing random access to the target base station occurs, and the handover procedure fails; when the second timer or the third timer is driven for the target base station above, if the second timer or the third timer expires before the handover procedure is completed (if T304 timer is interrupted or expired and it is determined that the handover procedure has failed); if the second timer or the third timer for the wireless connection between the UE and the source base station in the above has not expired (or if the second timer or the third timer for wireless connection between the UE and the source base station is not started or is running) (indicated by reference numeral 16-30); or if the wireless connection between the UE and the source base station is valid, the UE may determine that the wireless connection between the UE and the source base station is valid, and may perform the fallback procedure of the disclosure (indicated by reference numeral 16-45). If the second timer or the third timer for the wireless connection between the UE and the source base station in the above has expired, or if the wireless connection between the UE and the source base station is not valid (indicated by reference numeral 16-30), the UE performs an RRC connection re-establishment procedure (the connection with the base station is released and the RRC connection procedure is performed again from the beginning, that is, a cell selection or reselection procedure is performed, a random access procedure is performed, and an RRC connection re-establishment request message may be transmitted) (indicated by reference numeral 16-40).

Figure 17:
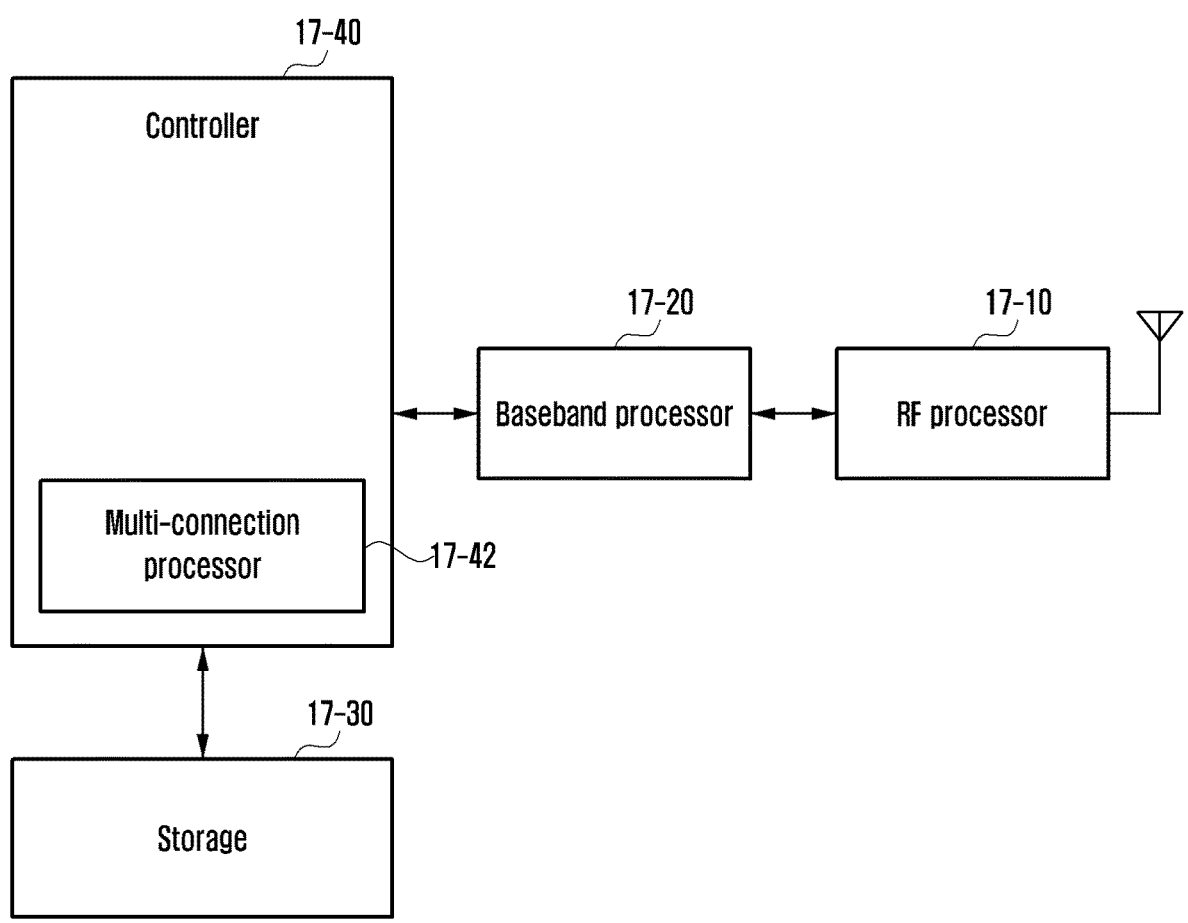
FIG. 17 illustrates the structure of a UE according to an embodiment of the disclosure.

FIG. 17 illustrates the structure of the UE according to an embodiment of the disclosure.

Referring to FIG. 17, the UE includes a radio frequency (RF) processor 17-10, a baseband processor 17-20, a storage 17-30, and a controller 17-40.

The RF processor 17-10 performs a function for transmitting or receiving a signal through a radio channel, such as band conversion and amplification of a signal. That is, the RF processor 17-10 up-converts a baseband signal provided from the baseband processor 17-20 into an RF band signal and transmits the same through an antenna, and down-converts an RF band signal, received through the antenna, to a baseband signal. For example, the RF processor 17-10 may include a transmission filter, a reception filter, an amplifier, a mixer, an oscillator, a digital to analog converter (DAC), an analog to digital converter (ADC), and the like. In FIG. 17, only one antenna is shown, but the UE may include a plurality of antennas. In addition, the RF processor 17-10 may include a plurality of RF chains. Moreover, the RF processor 17-10 may perform beamforming. In order to perform the beamforming, the RF processor 17-10 may control the phase and size of each signal transmitted or received through multiple antennas or antenna elements. In addition, the RF processor may perform MIMO operation, and may receive multiple layers in the case of performing MIMO operation. The RF processor 17-10 may perform reception beam sweeping by appropriately configuring a plurality of antennas or antenna elements under control of the controller, or adjust the direction and beam width of the reception beam so that the reception beam cooperates with the transmission beam.

The baseband processor 17-20 performs a function for conversion between a baseband signal and a bit stream according to the physical layer standard of the system. For example, if data transmission is performed, the baseband processor 17-20 generates complex symbols by encoding and modulating a transmission bit stream. In addition, if data reception is performed, the baseband processor 17-20 reconstructs the received bit string by demodulating and decoding the baseband signal provided from the RF processor 17-10. For example, in an orthogonal frequency division multiplexing (OFDM) scheme, if data transmission is performed, the baseband processor 17-20 generates complex symbols by encoding and modulating a transmission bit stream, maps the complex symbols to subcarriers, and then configures OFDM symbols through an inverse fast Fourier transform (IFFT) operation and a cyclic prefix (CP) insertion. Further, if data reception is performed, the baseband processor 17-20 divides the baseband signal provided from the RF processor 17-10 in units of OFDM symbols, reconstructs the signals mapped to the subcarriers through a fast Fourier transform (FFT) operation, and then reconstructs a reception bit stream through demodulation and decoding.

The baseband processor 17-20 and the RF processor 17-10 transmit and receive signals as described above. Accordingly, each of the baseband processor 17-20 and the RF processor 17-10 may be referred to as a transmitter, a receiver, a transceiver, or a communication unit. Furthermore, at least one of the baseband processor 17-20 and the RF processor 17-10 may include a plurality of communication modules to support different radio access technologies. In addition, at least one of the baseband processor 17-20 and the RF processor 17-10 may include different communication modules to process signals of different frequency bands. For example, the different radio access technologies may include LTE network, NR network, and the like. Further, the different frequency bands may include a super high frequency (SHF) (for example, 2 NRHz and NRhz) band and a millimeter (mm) wave (for example, 60 GHz) band.

The storage 17-30 stores data, such as a basic program, an application, and configuration information for the operation of the UE. The storage 17-30 provides stored data at the request of the controller 17-40.

The controller 17-40 controls the overall operation of the UE. For example, the controller 17-40 transmits or receives a signal through the baseband processor 17-20 and the RF processor 17-10. In addition, the controller 17-40 records and reads data in and from the storage 17-30. To this end, the controller 17-40 may include at least one processor. For example, the controller 17-40 may include a communication processor (CP) for performing control for communication and an application processor (AP) for controlling a higher layer such as an application. The controller 17-40 may further include a multi-connection processor 17-42 supporting multi-connection.

Figure 18:
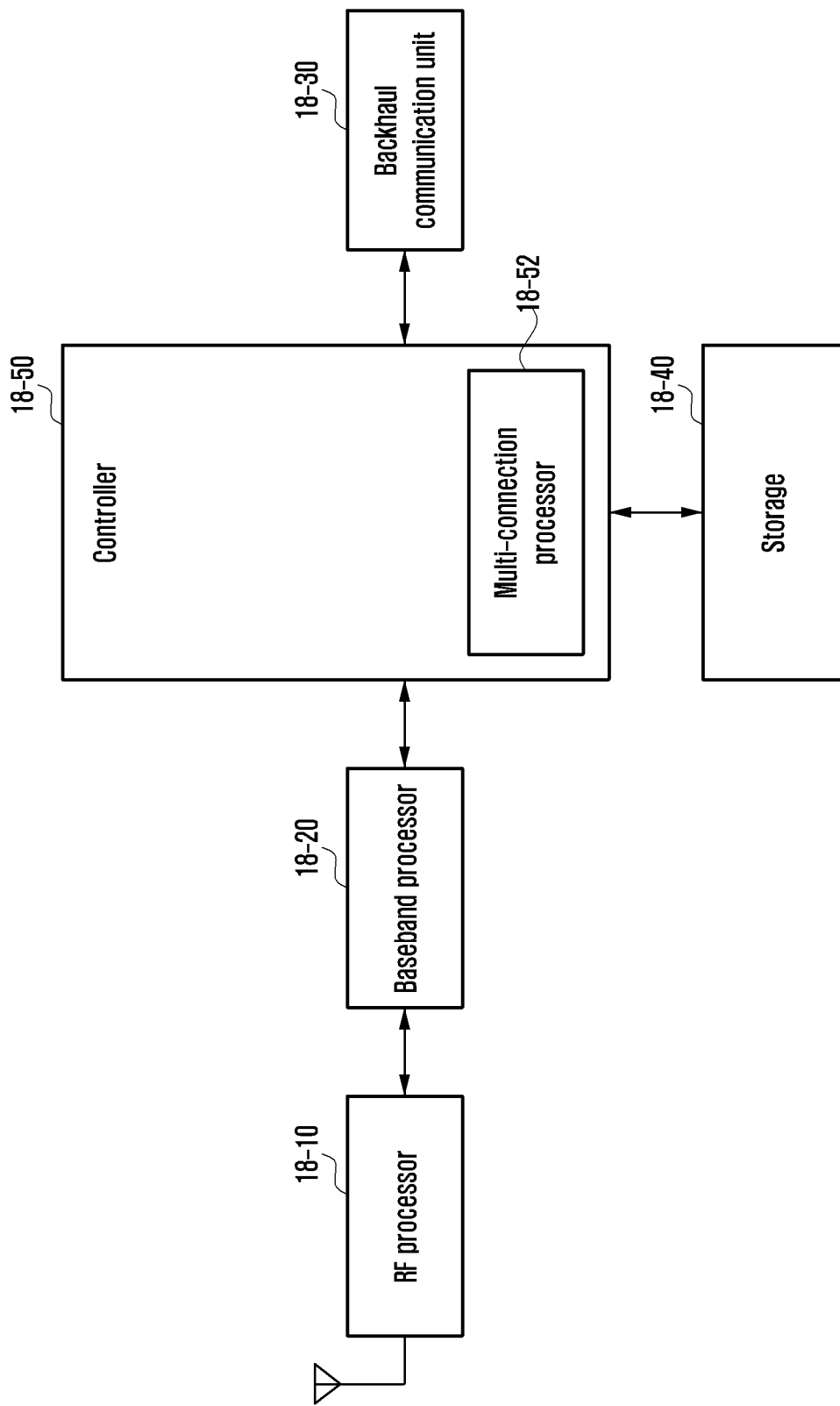
FIG. 18 illustrates a block configuration of a transmission and reception point (TRP) in a wireless communication system according to an embodiment of the disclosure.

FIG. 18 illustrates a block configuration of a TRP in a wireless communication system according to an embodiment of the disclosure.

Referring to FIG. 18, the base station includes an RF processor 18-10, a baseband processor 18-20, a backhaul communication unit 18-30, a storage 18-40, and a controller 18-50.

The RF processor 18-10 performs a function for transmitting or receiving a signal through a radio channel, such as band conversion and amplification of a signal. That is, the RF processor 18-10 up-converts a baseband signal provided from the baseband processor 18-20 into an RF band signal and then transmits the converted signal through an antenna, and down-converts an RF band signal received through the antenna into a baseband signal. For example, the RF processor 18-10 may include a transmission filter, a reception filter, an amplifier, a mixer, an oscillator, a DAC, and an ADC. In FIG. 18, only one antenna is shown, but the first access node may include a plurality of antennas. In addition, the RF processor 18-10 may include a plurality of RF chains. In addition, the RF processor 18-10 may perform beamforming. In order to perform the beamforming, the RF processor 18-10 may control the phase and size of each of the signals transmitted or received through multiple antennas or antenna elements. The RF processor may perform a downlink MIMO operation by transmitting one or more layers.

The baseband processor 18-20 performs a function of conversion between the baseband signal and the bit string according to the physical layer standard of the first radio access technology. For example, if data transmission is performed, the baseband processor 18-20 generates complex symbols by encoding and modulating a transmission bit stream. In addition, if data reception is performed, the baseband processor 18-20 reconstructs the received bit string by demodulating and decoding the baseband signal provided from the RF processor 18-10. For example, in an OFDM scheme, if data transmission is performed, the baseband processor 18-20 may generate complex symbols by encoding and modulating the transmission bit stream, map the complex symbols to subcarriers, and then configure OFDM symbols through an IFFT operation and CP insertion. In addition, if data reception is performed, the baseband processor 18-20 divides the baseband signal provided from the RF processor 18-10 in units of OFDM symbols, reconstructs the signals mapped to the subcarriers through an FFT operation, and then reconstructs a reception bit stream through demodulation and decoding. The baseband processor 18-20 and the RF processor 18-10 transmit and receive signals as described above. Accordingly, each of the baseband processor 18-20 and the RF processor 18-10 may be referred to as a transmitter, a receiver, a transceiver, a communication unit, or a wireless communication unit.

The backhaul communication unit 18-30 provides an interface for communicating with other nodes in the network.

The storage 18-40 stores data, such as a basic program, an application, and configuration information for the operation of a main base station. In particular, the storage 18-40 may store information on a bearer allocated to a connected UE, a measurement result reported from the connected UE, and the like. In addition, the storage 18-40 may store information that is a criterion for determining whether to provide or terminate multiple connections to the UE. The storage 18-40 provides stored data at the request of the controller 18-50.

The controller 18-50 controls the overall operation of the main base station. For example, the controller 18-50 transmits or receives a signal through the baseband processor 18-20 and the RF processor 18-10 or through a backhaul communication unit 18-30. In addition, the controller 18-50 records and reads data in and from the storage 18-40. To this end, the controller 18-50 may include at least one processor. The controller 18-50 may further include a multi-connection processor 18-52 supporting multi-connection.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, information for a reconfiguration with synchronization (sync), the information configuring at least one dual active protocol stack (DAPS) bearer;
   establishing a signaling radio bearer (SRB) for a target cell group with a same configuration for a source cell group based on the information, wherein an SRB for the source cell group is suspended; and
   configuring an initial value of a state variable for a packet data convergence protocol (PDCP) layer device for the target cell group with a value stored in a PDCP layer device for the source cell group, in case that a security key is maintained for the SRB for the target cell group.

2. The method of claim 1, further comprising:
   identifying that the reconfiguration with sync fails and a radio link failure is not detected in the source cell group; and
   configuring an initial value of a state variable for the PDCP layer device for the source cell group with a value stored in the PDCP layer device for the target cell group, in case that the security key is maintained.

3. The method of claim 2, further comprising:
   discarding a PDCP service data unit (SDU) in the PDCP layer device for the source cell group; and
   re-establishing a radio link control (RLC) entity for the source cell group.

4. The method of claim 2, wherein the reconfiguration with sync is identified to have failed based on an expiry of a timer configured by the information.

5. The method of claim 1, wherein the state variable includes at least one of a TX_NEXT indicating a count value of a next PDCP SDU to be transmitted, an RX_NEXT indicating a count value of a next PDCP SDU expected to be received, an RX_DELIV indicating a count value of a first PDCP SDU not delivered to a higher layer, or an RX_REORD indicating a count value following a count value associated with PDCP data protocol data unit (PDU) which triggered a reordering timer.

6. A method performed by a base station in a wireless communication system, the method comprising:
   generating information for a reconfiguration with synchronization (sync) for a terminal, the information configuring at least one dual active protocol stack (DAPS) bearer; and
   transmitting, to the terminal, the information,
   wherein a signaling radio bearer (SRB) for a target cell group is established with a same configuration for a source cell group based on the information, an SRB for the source cell group being suspended, and
   wherein an initial value of a state variable for a packet data convergence protocol (PDCP) layer device for the target cell group is configured with a value of a PDCP layer device for the source cell group, in case that a security key is maintained for the SRB for the target cell group.

7. The method of claim 6, wherein, in case that the reconfiguration with sync fails and a radio link failure is not detected in the source cell group, an initial value of a state variable for the PDCP layer device for the source cell group is configured with a value of the PDCP layer device for the target cell group, in case that the security key is maintained.

8. The method of claim 7,
   wherein a PDCP service data unit (SDU) in the PDCP layer device for the source cell group is discarded, and
   wherein a radio link control (RLC) entity for the source cell group is re-established.

9. The method of claim 7, wherein the reconfiguration with sync is identified to have failed based on an expiry of a timer configured by the information.

10. The method of claim 6, wherein the state variable includes at least one of a TX_NEXT indicating a count value of a next PDCP SDU to be transmitted, an RX_NEXT indicating a count value of a next PDCP SDU expected to be received, an RX_DELIV indicating a count value of first PDCP SDU not delivered to a higher layer, or an RX_REORD indicating a count value following a count value associated with PDCP data protocol data unit (PDU) which triggered a reordering timer.

11. A terminal in a wireless communication system, the terminal comprising:
   a transceiver configured to transmit and receive a signal; and
   a controller configured to:
      receive, from a base station, information for a reconfiguration with synchronization (sync), the information configuring at least one dual active protocol stack (DAPS) bearer,
      establish a signaling radio bearer (SRB) for a target cell group with a same configuration for a source cell group based on the information, wherein SRB for the source cell group is suspended, and
      configure an initial value of a state variable for a packet data convergence protocol (PDCP) layer device for the target cell group with a value stored in a PDCP layer device for the source cell group, in case that a security key is maintained for the SRB for the target cell group.

12. The terminal of claim 11, wherein the controller is further configured to:
identify that the reconfiguration with sync fails and a radio link failure is not detected in the source cell group, and
configure an initial value of a state variable for the PDCP layer device for the source cell group with a value stored in the PDCP layer device for the target cell group, in case that the security key is maintained.

13. The terminal of claim 12, wherein the controller is further configured to:
discard a PDCP service data unit (SDU) in the PDCP layer device for the source cell group; and
re-establish a radio link control (RLC) entity for the source cell group.

14. The terminal of claim 12, wherein the reconfiguration with sync is identified to have failed based on an expiry of a timer configured by the information.

15. The terminal of claim 11, wherein the state variable includes at least one of a TX_NEXT indicating a count value of next PDCP SDU to be transmitted, an RX_NEXT indicating a count value of next PDCP SDU expected to be received, an RX_DELIV indicating a count value of first PDCP SDU not delivered to a higher layer, or an RX_REORD indicating count value following count value associated with PDCP data protocol data unit (PDU) which triggered a reordering timer.

16. A base station in a wireless communication system, the base station comprising:
a transceiver configured to transmit and receive a signal; and
a controller configured to:
generate information for a reconfiguration with synchronization (sync) for a terminal, the information configuring at least one dual active protocol stack (DAPS) bearer, and
transmit, to the terminal, the information,
wherein a signaling radio bearer (SRB) for a target cell group is established with a same configuration for a source cell group based on the information, an SRB for the source cell group being suspended, and
wherein an initial value of a state variable for a packet data convergence protocol (PDCP) layer device for the target cell group is configured with a value of a PDCP layer device for the source cell group, in case that a security key is maintained for the SRB for the target cell group.

17. The base station of claim 16, wherein, in case that the reconfiguration with sync fails and a radio link failure is not detected in the source cell group, an initial value of a state variable for the PDCP layer device for the source cell group is configured with a value of the PDCP layer device for the target cell group, in case that the security key is maintained.

18. The base station of claim 17,
wherein a PDCP service data unit (SDU) in the PDCP layer device for the source cell group is discarded, and
wherein a radio link control (RLC) entity for the source cell group is re-established.

19. The base station of claim 17, wherein the reconfiguration with sync is identified to have failed based on an expiry of a timer configured by the information.

20. The base station of claim 16, wherein the state variable includes at least one of a TX_NEXT indicating a count value of next PDCP SDU to be transmitted, an RX_NEXT indicating a count value of next PDCP SDU expected to be received, an RX_DELIV indicating a count value of first PDCP SDU not delivered to a higher layer, or an RX_REORD indicating count value following count value associated with PDCP data protocol data unit (PDU) which triggered a reordering timer.

* * * * *